(12) United States Patent
Higurashi et al.

(10) Patent No.: US 6,582,309 B2
(45) Date of Patent: *Jun. 24, 2003

(54) GAME SYSTEM AND COMPUTER-READABLE RECORDING MEDIUM

(75) Inventors: Seiji Higurashi, Zama (JP); Kiyoshi Mizuki, Zama (JP); Shintaro Mukai, Yokohama (JP); Masato Akiyama, Yokohama (JP); Hiroshi Takeyasu, Sagamihara (JP); Ryo Komatsu, Sagamihara (JP); Hiroshi Naraoka, Tama (JP)

(73) Assignee: Konami Co., Ltd., Hyogo-ken (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/326,947

(22) Filed: Jun. 7, 1999

(65) Prior Publication Data

US 2002/0002411 A1 Jan. 3, 2002

(30) Foreign Application Priority Data

Jul. 14, 1998 (JP) .............................. 10-199292
Nov. 26, 1998 (JP) .............................. 10-354012
Feb. 16, 1999 (JP) .............................. 11-37529

(51) Int. Cl.⁷ .............................................. A63F 13/00
(52) U.S. Cl. ................................ 463/31; 463/43; 463/7
(58) Field of Search ....................... 463/1, 7, 23, 30, 463/31, 35, 43, 44, 45; 273/445, 459, 460, 461, 148 B; 700/91

(56) References Cited

U.S. PATENT DOCUMENTS

| 1,473,495 A | 1/1923 | Miller |
| 4,643,421 A | * 2/1987 | Meyer et al. ............... 273/1 E |
| 4,694,723 A | 9/1987 | Shinohara et al. |
| 4,752,069 A | * 6/1988 | Okada ..................... 273/1 GC |
| 5,231,239 A | 7/1993 | Tsumura et al. |
| 5,233,521 A | 8/1993 | Kimpara |
| 5,355,762 A | 10/1994 | Tabata |
| 5,393,926 A | 2/1995 | Johnson |
| 5,491,297 A | 2/1996 | Johnson et al. |
| 5,512,704 A | 4/1996 | Adachi |
| 5,513,129 A | 4/1996 | Bolas et al. |

(List continued on next page.)

FOREIGN PATENT DOCUMENTS

| DE | 29703145 U | 6/1997 |
| JP | 48-93298 | 12/1973 |
| JP | 50-77031 | 6/1975 |
| JP | 59030169 | 2/1984 |

(List continued on next page.)

OTHER PUBLICATIONS

"Parappa The Rapper" www.scea/games/categories/strat-puzzle/parappa/story.html. Nov. 1997, Sony Computer Entertainment America, Inc., all pages.*
Partial English Translation of "GAMEST" (Reference 1 and Reference 2).

(List continued on next page.)

*Primary Examiner*—Michael O'Neill
*Assistant Examiner*—Julie Brocketti
(74) *Attorney, Agent, or Firm*—Jordan and Hamburg LLP

(57) ABSTRACT

A game system has a display monitor for displaying a game image, a plurality of control buttons manually operable by a game player, and a memory for storing data representing timings to operate the control buttons, respectively. The game system has a control operation indicating function for displaying in the game image an image for indicating the timings to operate the control buttons based on the data stored in the memory, and an obstructing function for generating an obstructive effect in the image for indicating the timings to operate the control buttons, to obstruct an attempt of the game player to grasp the timings to operate the control buttons.

61 Claims, 32 Drawing Sheets

U.S. PATENT DOCUMENTS

| | | | |
|---|---|---|---|
| 5,574,238 A | | 11/1996 | Mencher |
| 5,649,861 A | | 7/1997 | Okano et al. |
| 5,714,703 A | | 2/1998 | Wachi et al. |
| 5,739,457 A | * | 4/1998 | Devecka ............ 84/743 |
| 5,746,656 A | | 5/1998 | Bewick et al. |
| 5,782,692 A | * | 7/1998 | Stelovsky ............ 463/1 |
| 5,824,933 A | | 10/1998 | Gabriel |
| 5,886,273 A | | 3/1999 | Haruyama |
| 5,925,843 A | | 7/1999 | Miller et al. |
| 6,001,013 A | | 12/1999 | Ota |
| RE36,675 E | * | 4/2000 | Yamamoto et al. ........ 463/10 |
| 6,379,244 B1 | | 4/2002 | Sagawa et al. |

FOREIGN PATENT DOCUMENTS

| | | |
|---|---|---|
| JP | 59-144983 | 9/1984 |
| JP | 59-144984 | 9/1984 |
| JP | 59-169177 | 11/1984 |
| JP | 60-55177 | 4/1985 |
| JP | 60-83097 | 5/1985 |
| JP | 60-87397 | 5/1985 |
| JP | 60-260093 | 12/1985 |
| JP | 61-99200 | 6/1986 |
| JP | 62-2600 | 2/1987 |
| JP | 63-52377 | 3/1988 |
| JP | 1-68074 | 5/1989 |
| JP | 2-100300 | 8/1990 |
| JP | 3-84599 | 4/1991 |
| JP | 03198890 | 8/1991 |
| JP | 03198891 | 8/1991 |
| JP | 04093982 | 3/1992 |
| JP | 5-80693 | 4/1993 |
| JP | 5-158480 | 6/1993 |
| JP | 5-158481 | 6/1993 |
| JP | 5-216476 | 8/1993 |
| JP | 0566662 | 9/1993 |
| JP | 6-84421 | 3/1994 |
| JP | 6-62431 | 9/1994 |
| JP | 6-282287 | 10/1994 |
| JP | 6-295193 | 10/1994 |
| JP | 7-204353 | 8/1995 |
| JP | 8-23597 | 1/1996 |
| JP | 8-54884 | 2/1996 |
| JP | 8-166780 | 6/1996 |
| JP | 8305356 | 11/1996 |
| JP | 8-323044 | 12/1996 |
| JP | 9-160574 | 6/1997 |
| JP | 9-212107 | 8/1997 |
| JP | 9-305171 | 11/1997 |
| JP | 10118336 | 5/1998 |
| JP | 11-151380 | 6/1999 |

OTHER PUBLICATIONS (1) Compact disc product entitled "PaRappaTheRapper" © 1996 Sony Computer Entertainment Inc.
(2) Compact disc product entitled "Quest For Fame" © 1993, 1994, 1995, 1996, 1997 Virtual Music Entertainment, Inc. (Sony Computer Entertainment).
(3) Compact disc product entitled "Digital Dance Mix" © Sega Enterprises, Ltd. 1997.
(4) Document relating to items (1)—(3) dated Sep. 7, 1999.
(5) Statement submitted by Japanese Patent Office by the plaintiff of the invalidation trial against the original Japanese application on which the priority of US application is based. (4 sheets of written statement of 7 reference evidences in Japanese). English translation of the statement.
(6) Copy of purchase slip of Yamaha CLAVINOVA CVP-96.
(7) Sankei Shimbun article dated Jul. 17, 1997.
(8) MONO Magazine No. 355 (published Dec. 16, 1997).
(9) Instruction manual, elementary course with music, of Yamaha CLAVINOVA CVP-98/CVP-96.
(10) Instruction manual, main course, of Yamaha CLAVINOVA CVP-98/CVP-96.
Yamaha News Release, dated Jul. 1997, in Japanese with English Abstract.
Notice of opposition filed by SEGA Enterprises, Ltd. (31 pages).
Game screen of home game "Mr. BONES" (4 pages).
Report for the screen movement of "Mr. BONES" (2 pages).
Front page of game magazine "Sega Satan Magazine" vol. 23–1997 published by SOFTBANK on Jul. 11, 1997 (1 page).
Back page of game magazine "Sega Satan Magazine" vol. 23–1997 published by SOFTBANK on Jul. 11, 1997 (1 page).
Contents (including p178–181) of game magazine "Sega Satan Magazine" vol. 23–1997 published by SOFTBANK on Jul. 11, 1997 (3 pages).
Front page of game magazine "Sega Satan Magazine" vol. 14–1997 published by SOFTBANK on May 2, 1997 (1 page).
Back page of game magazine "Sega Satan Magazine" vol. 14–1997 published by SOFTBANK on May 2, 1997 (1 page).
Contents (including p104–105) of game magazine "Sega Satan Magazine" vol. 14–1997 published by SOFTBANK on May 2, 1997 (1 page).
Order slip of CD ROM for "Mr. BONES" to Victor Media Products issued by SEGA Enterprises., Ltd.
Sales of CD ROM for "Mr. BONES" to SEGA United issued by SEGA Enterprises., Ltd (1 page).
Back label of CD ROM for "Mr. BONES".
Front label of CD ROM for "Mr. BONES".
Back label of videotape having the actual screen image for "Mr. BONES" (1 page).
Side label of videotape having the actual screen image for "Mr. BONES" (1 page).
Front page of game magazine for Konami "Players are Jammin' for Konami" "hiphopmania" (2 pages) (c) 1997.
www.bemani.konami.com Nevada Tournament Announcement—Aug. 29, 1999—Buffalo Bill's in Primm Nevada are holding a "hiphopmania" tournament on Sunday, Aug. 29, 1999 (6 pages).

* cited by examiner

DATA OF MUSIC PIECE X

WAVEFORM DATA

WAVEFORM TABLE DATA

GAME SYSTEM AND COMPUTER-READABLE RECORDING MEDIUM

BACKGROUND OF THE INVENTION

1. Field of the Invention

The present invention relates to a game system for allowing a game player to enjoy control button operations or pressings in time to music, sound effects, or other audible information, and a computer-readable recording medium which stores a computer program to realize such a game system.

2. Description of the Related Art

There are commercially available game systems which can be played by a game layer to add sound effects such as DJ (Disc Jockey) sounds or an ad lib musical performance to music that is performed as BGM (background music), so that the game player can enjoy directing the performance of the music. For example, reference should be made to the music simulation game "Hiphopmania" manufactured and sold by Konami Co., Ltd. Those game systems have a plurality of control members or buttons to be operated in time to music by the game player and a display screen for displaying an indicator which indicates the timings to operate the control members.

In the known game systems, the indicator is displayed only for the purpose of accurately indicating the timings to operate the control members to the game player. However, no attempts have heretofore been made to employ the displayed indicator so as to make the game more fun and introduce an unexpected element into the game.

SUMMARY OF THE INVENTION

It is therefore an object of the present invention to provide a game system which employs an image for indicating control member operation timings to make the game more fun and introduce an unexpected element into the game.

Another object of the present invention is to provide a computer-readable recording medium which stores a computer program to realize such a game system.

According to an aspect of the present invention, there is provided a game system comprising a display unit for displaying a game image, control means for being manually operable by a game player, a memory for storing data representing a timing to operate the control means while a game is being played, control operation indicating means for displaying in the game image an image for indicating the timing to operate the control means based on the data stored in the memory, and obstructing means for generating an obstructive effect in the image for indicating the timing to operate the control means, to obstruct an attempt of the game player to grasp the timing to operate the control means.

When the obstructing means generates an obstructive effect, it obstructs an attempt of the game player to grasp the timing to operate the control means, and hence tends to blind the game player. Consequently, the game player finds the game to be fun, and an unexpected element is introduced into the game.

The control operation indicating means may comprise means for displaying as the image a mark for indicating the timing to operate the control means, so as to be movable in the game image when the game is in process such that when the mark reaches a predetermined position in the game image, the timing to operate the control means arrives.

The control means may comprise a plurality of control members, and the control operation indicating means may comprise means for displaying as the image a plurality of marks distinguishably associated with the control members, respectively, for indicating the timings to operate the control members, respectively, the marks being movable in the game image as the game proceeds such that when the marks reach a predetermined position in the game image, the timings to operate the control members arrive.

The obstructing means may comprise means for concealing the mark while the mark is moving in the game image, as the obstructive effect. Alternatively, the obstructing means may comprise means for changing the length of the mark while the mark is moving in the game image, as the obstructive effect. Alternatively, the obstructing means may comprise means for changing the manner in which the marks are distinguishably associated with the control members, while the mark is moving in the game image, as the obstructive effect. Further alternatively, the obstructing means comprises means for generating a mark indicative of an erroneous timing, as the obstructive effect. The game image may include an area for displaying the marks, the area being divided into a plurality of parallel tracks associated respectively with the control members, the marks being movable along the tracks, respectively, the obstructing means comprising means for moving at least one of the marks to another one of the tracks while the marks are moving in the game image, as the obstructive effect.

The game system may further comprise means for inhibiting the obstructive effect in a predetermined range in the game image which extends away from the predetermined position in a direction which is opposite to the direction in which the mark is movable. While an obstructive effect generated by the obstructing means is effective to blind the game player, the game player is allowed to grasp the timing to operate the control means in the predetermined range in the game image which extends away from the predetermined position.

The game system may further comprise decision means for deciding whether a condition for generating the obstructive effect is satisfied or not while the game is in process, and obstructive effect control means for controlling the obstructing means to generate the obstructive effect when the condition is satisfied as decided by the decision means, and to inhibit the obstructive effect from being produced when the condition is not satisfied as decided by the decision means. Because the obstructive effect is allowed to be generated or inhibited from being generated depending on whether the condition is satisfied or not, the game player can enjoy variations in the game.

The game system may further comprise evaluating means for evaluating a game player's achievement by comparing an operation by the game player of the control means with the timing to operate the control means while the game is in progress, and obstructive effect control means for controlling the obstructing means to generate the obstructive effect when the game player's achievement evaluated by the evaluating means is higher than a predetermined reference level, and to inhibit the obstructive effect from being produced when the game player's achievement evaluated by the evaluating means is lower than the predetermined reference level. The obstructive effect is generated when the game player is accustomed to the game and game player's achievement evaluated by the evaluating means becomes higher than the predetermined reference level. Thus, the game player will not be bored with the game.

The game system may further comprise mode selecting means for selecting, according to a command from the game player, either a first mode in the game for instructing the game player via the control operation indicating means to operate the control means according to a predetermined control operation procedure based on the data representing the timing to operate the control means, or a second mode in the game for indicating to, the game player via the control operation indicating means, a control operation procedure contained in a practice range which is established in the predetermined control operation procedure in the first mode, obstructive effect setting means for establishing, according to a command from the game player, whether the obstructing means is allowed to generate the obstructive effect, as a condition in the second mode in the game, control operation indication control means for controlling the control operation indicating means to indicate the predetermined control operation procedure to the game player through the image for indicating the timing to operate the control means, when the first mode is selected, or to indicate the control operation procedure contained in the practice range to the game player through the image for indicating the timing to operate the control means, when the second mode is selected, and obstructive effect control means for controlling the obstructing means to generate the obstructive effect when the first mode is selected, to generate the obstructive effect if the obstructing means is allowed to generate the obstructive effect by the obstructive effect setting means when the second mode is selected, and to inhibit the obstructive effect from being produced if the obstructing means is inhibited to generate the obstructive effect by the obstructive effect setting means when the second mode is selected.

When the first mode is selected, the obstructive effect is added to the image for indicating the timing to operate the control means. When the second mode is selected, whether the obstructing means is allowed to generate the obstructive effect is established according to a command from the game player, and the obstructive effect is controlled depending on the established detail while the game player is playing the practice range. Therefore, the game player may either inhibit the obstructive effect from being added and dedicate its effort to mastering control operations in the practice range, or allow the obstructive effect to be added and practice control operations against the obstructive effect. The second mode can thus be effectively utilized as a mode for providing practicing opportunities for the first mode.

The game system may further comprise practice range setting means for establishing the practice range according to a command from the game player when the second mode is selected. The second mode can thus be effectively utilized when the game player wants to practice control operations which the game player is not skillful enough to perform properly.

The obstructive effect setting means may comprise means for establishing a difficulty level of the obstructive effect according to a command from the game player if the obstructing means is allowed to generate the obstructive effect, and the obstructive effect control means comprises means for controlling the obstructing means to generate the obstructive effect in the difficulty level established by the obstructive effect setting means while the game is being played in the second mode if the obstructing means is allowed to generate the obstructive effect. The game player is therefore given practicing opportunities for various difficulty levels of the obstructive effect.

The game system may further comprise decision means for deciding whether a condition for generating the obstructive effect is satisfied or not while the game is in process in the first mode and the second mode, the obstructive effect control means comprising means for controlling the obstructing means to generate the obstructive effect when the condition is satisfied as decided by the decision means when the game is played in the first mode, to generate the obstructive effect when the obstructing means is allowed to generate the obstructive effect by the obstructive effect setting means and also when the condition is satisfied as decided by the decision means when the game is played in the second mode, and to inhibit the obstructive effect from being produced when the obstructing means is inhibited from generating the obstructive effect by the obstructive effect setting means or when the condition is not satisfied as decided by the decision means when the game is played in the second mode. Even when the game player selects the second mode and is practicing control operations, the obstructive effect may be generated or not generated, giving the game player variations in the game. The second mode can be made valuable as a practicing opportunity for the first mode. The condition for generating the obstructive effect in the first mode may be determined arbitrarily. The condition for generating the obstructive effect in the second mode may be identical to the condition for generating the obstructive effect in the first mode. Therefore, if the addition of the obstructive effect in the second mode is allowed, then the obstructive effect is added under the same condition as in the first mode. Consequently, the practicing environment provided in the second mode is close to the game playing environment in the first mode.

The game system may further comprise evaluating means for evaluating a game player's achievement by comparing an operation by the game player of the control means with the timing to operate the control means while the game is in progress in the second mode, the obstructive effect control means comprising means for controlling the obstructing means to generate the obstructive effect when the obstructing means is allowed to generate the obstructive effect by the obstructive effect setting means and the game player's achievement evaluated by the evaluating means is higher than a predetermined reference level, and to inhibit the obstructive effect from being produced when the obstructing means is inhibited from generating the obstructive effect by the obstructive effect setting means or the game player's achievement evaluated by the evaluating means is lower than the predetermined reference level. Even when the game player selects the second mode and is practicing control operations, the obstructive effect may be generated or not generated depending on the game player's achievement in the game. Therefore, the second mode can be made valuable as a practicing opportunity for the first mode.

The game system may further comprise sound outputting means for playing music when the game is in progress, and outputting sound effects in addition to the music depending on an operation of the control means when the control means is operated by the game player according to the timing indicated by the control operation indicating means while the music is being played. Consequently, the game player is able to gain a feeling to operate the control means in time to the music, and hence finds the game to be much fun.

According to another aspect of the present invention, there is provided a recording medium readable by a computer and storing data representing a timing to operate control means in a game system while a game is being played, and a program for displaying on a display unit in the game system an image for indicating the timing to operate the control means based on the stored data while the game is in progress, the program being arranged to cause the computer to function as obstructing means for generating an obstructive effect in the image for indicating the timing to operate the control means, to obstruct an attempt of the game player to grasp the timing to operate the control means. The recording medium which stores the above data allows the game system according to the foregoing aspect of the invention to be realized.

In the above recording medium, the program is arranged to cause the computer to function as mode selecting means for selecting, according to a command from the game player, either a first mode in the game for instructing the game player via the control operation indicating means to operate the control means according to a predetermined control operation procedure based on the data representing the timing to operate the control means, or a second mode in the game for indicating to, the game player via the control operation indicating means, a control operation procedure contained in a practice range which is established in the predetermined control operation procedure in the first mode, obstructive effect setting means for establishing, according to a command from the game player, whether the obstructing means is allowed to generate the obstructive effect, as a condition in the second mode in the game, control operation indication control means for controlling the control operation indicating means to indicate the predetermined control operation procedure to the game player through the image for indicating the timing to operate the control means, when the first mode is selected, or to indicate the control operation procedure contained in the practice range to the game player through the image for indicating the timing to operate the control means, when the second mode is selected, and obstructive effect control means for controlling the obstructing means to generate the obstructive effect when the first mode is selected, to generate the obstructive effect if the obstructing means is allowed to generate the obstructive effect by the obstructive effect setting means when the second mode is selected, and to inhibit the obstructive effect from being produced if the obstructing means is inhibited to generate the obstructive effect by the obstructive effect setting means when the second mode is selected. When the computer reads and runs the program stored in the above recording medium, the above game system can be realized.

According to still another aspect of the present invention, there is provided a game system comprising a display unit for displaying a game image, a plurality of control members for being manually operable by a game player, a memory for storing data representing a control operation procedure of the control members which is established in time to a predetermined music piece, mode selecting means for selecting, according to a command from the game player, a first mode in a game playable by the game player to play the music piece from the beginning to the last thereof, and a second mode in the game to play a practice range established in at least a portion of the music, control operation procedure presenting means for displaying an image presenting the control operation procedure on the display unit based on the data representing the control operation procedure, obstructing means for generating an obstructive effect in the image presenting the control operation procedure to obstruct an attempt of the game player to grasp the control operation procedure, obstructive effect setting means for establishing, according to a command from the game player, whether the obstructing means is allowed to generate the obstructive effect when the game is played in the second mode, display control means for controlling the control operation procedure presenting means to display the control operation procedure from the beginning to the last of the music piece on the display unit when the game is played in the first mode, and to display the control operation procedure from the beginning to the last of the practice range when the game is played in the second mode, and obstructive effect control means for controlling the obstructing means to generate the obstructive effect when the game is played in the first mode, to generate the obstructive effect if the obstructing means is allowed to generate the obstructive effect by obstructive effect setting means when the game is played in the second mode, and to inhibit the obstructive effect from being produced if the obstructing means is inhibited from generating the obstructive effect by obstructive effect setting means when the game is played in the second mode.

When the first mode is selected, the obstructive effect is added to the image for indicating the timing to operate the control means to obstruct an effort of the game player to grasp the timing to operate the control means, for thereby blinding the game player. Therefore, the game player finds the game to be much fun because of an unexpected element introduced into the game. When the second mode is selected, whether the obstructing means is allowed to generate the obstructive effect is established according to a command from the game player, and the obstructive effect is controlled depending on the established detail while the game player is playing the practice range. Therefore, the game player may either inhibit the obstructive effect from being added and dedicate its effort to mastering control operations in the practice range, or allow the obstructive effect to be added and practice control operations against the obstructive effect. The second mode can thus be effectively utilized as a mode for providing practicing opportunities for the first mode.

The obstructing means may comprise means for changing the speed at which the mark moves, as the obstructive effect. Alternatively, the obstructing means may comprise means for reducing the time required until the mark reaches the predetermined position, as the obstructive effect. Further alternatively, the obstructing means may comprise means for interrupting the displaying of the mark for a predetermined time, as the obstructive effect.

According to yet another aspect of the present invention, there is provided a game system comprising a display unit for displaying a game image, control means for being manually operable by a game player, first memory means for storing data representing a timing to operate the control means while a game is being played, first control operation indicating means for displaying in the game image an image for indicating the timing to operate the control means when the game is in progress based on the data stored in the first memory means, obstructing means for generating an obstructive effect in the image for indicating the timing to operate the control means, to obstruct an attempt of the game player to grasp the timing to operate the control means, and obstructive effect generation control means for controlling the obstructing means to generate the obstructive effect depending on an operation by the game player of the control means while the game is in progress.

The obstructive effect is added to the image for indicating the timing to operate the control means to obstruct an effort of the game player to grasp the timing to operate the control means, for thereby blinding the game player. Therefore, the game player finds the game to be much fun because an unexpected element is introduced into the game. Since the obstructive effect is generated in response to an operation of the control means, when the game is played by a plurality of game players, one of the game players may be able to obstruct another game player with the obstructive effect. Therefore, the game players find the game interesting as a competition game.

The first control operation indicating means may comprise means for displaying in the game image a first mark for indicating an operation of the control means, as the image for indicating the timing to operate the control means, and moving the first mark in the game image when the game is in process such that when the first mark reaches a predetermined position in the game image, the timing to operate the control means associated with the first mark arrives.

The game system may further comprise second memory means for storing data representing a timing to operate the control means while a game is being played, and second control operation indicating means for displaying in the game image an image for indicating the timing to operate the control means when the game is in progress based on the data stored in the second memory means, the obstructive effect generation control means comprising means for controlling the obstructing means to generate the obstructive effect when the control means is operated by the game player at the timing to operate the control means based on the data stored in the second memory means.

Since the obstructive effect is generated at the timing of an actual operation of the control means, the game is made more fun and an unexpected element is introduced into the game.

The second control operation indicating means may comprise means for displaying in the game image a second mark to indicate an operation of the control means, as the image for indicating the timing to operate the control means based on the data stored in the second memory means, and moving the second mark in the game image when the game is in process such that when the second mark reaches a predetermined position in the game image, the timing to operate the control means associated with the second mark arrives.

The control means may comprise a plurality of control members, the second control operation indicating means comprising means for displaying, as the image for indicating the timings to operate the control members based on the data stored in the second memory means, a plurality of second marks distinguishably associated with the control members, respectively, for indicating the timings to operate the control members, respectively, the second marks being movable in the game image as the game proceeds such that when the second marks reach a predetermined position in the game image, the timings to operate the control members associated with the second marks arrive.

The game system may further comprise control operation timing setting means for randomly establishing timings to operate the control members to be stored in the second memory means, for each game to be played.

Inasmuch as timings to operate the control members are randomly established for each game to be played, the game player will not be bored with the game when repeatedly playing the game.

The obstructive effect generation control means may comprise means for generating an obstructive effect to obstruct an attempt of the game player to grasp the timing to operate one of the control members in response to an operation of another one of the control members when the game is in progress.

If the control members are assigned to a plurality of game players, then one of the game players may be able to obstruct another game player with the obstructive effect. Therefore, the game players find the game interesting as a competition game.

According to yet still another aspect of the present invention, there is provided a game system comprising a display unit for displaying a game image, control means for being manually operable by a game player, first memory means for storing data representing a timing to operate the control means while a game is being played, first control operation indicating means for displaying in the game image an image for indicating the timing to operate the control means when the game is in progress based on the data stored in the first memory means, a plurality of obstructing means for generating obstructive effects to obstruct an attempt of the game player to grasp the timing to operate the control means, in image for indicating the timing to operate the control means, and obstructive effect generation control means for controlling the plurality of obstructing means to select one of the obstructing means and generating the obstructive effect from the selected one of the obstructing means, in response to an operation by the game player of the control means while the game is in progress.

In response to an operation of the control means, the obstructive effect is added to the image for indicating the timing to operate the control means to obstruct an effort of the game player to grasp the timing to operate the control means, for thereby blinding the game player. Therefore, the game player finds the game to be much fun because of an unexpected element introduced into the game. The plurality of obstructing means is effective to introduce further unexpected elements into the game.

The game system may further comprise second memory means for storing data representing timings to operate the control members, respectively, while a game is being played, allocating means for allocating the control members to the timings represented by the data stored in the second memory means, and second control operation indicating means for displaying in the game image an image for indicating the timings to operate the control members when the game is in progress based on the association between the timings represented by the data stored in the second memory means and the control members allocated by the allocating means, the obstructive effect generation control means comprising means for, when the control means is operated according to the timing represented by the data stored in the second memory means, for selecting one of the obstructing means associated with the operated control means according to the association, and generating the obstructive effect from the selected one of the obstructing means.

The game system may further comprise allocation changing means for changing the association depending on the operation by the game player of the control means.

Because the obstructing means associated with the control means is changed depending on an operation of the control means, the game may be developed with an increased level of unexpectedness. If the control means comprises a plurality of control members assigned to a plurality of game players, then one of the game players can operate one of the control members to change the association to obstruct another game player, or can associate a desired one of the obstructing means with its own control member. The game players will thus find the game interesting as a competition game.

According to a further aspect of the present invention, there is provided a game system comprising a display unit for displaying a game image, a plurality of control members for being manually operable by a game player, memory means for storing data representing timings to operate the control members while a game is being played, first control operation indicating means for displaying in the game image an image for indicating the timings to operate the control members when the game is in progress based on the data stored in the memory means, and evaluating means for evaluating operations by the game player of the control members, respectively, by comparing the timings at which the control members are actually operated by the game player with the timings stored in the memory means to operate the control members.

Each of the control members is evaluated for its operation. Therefore, if the control members are assigned to a plurality of game players for playing the game, then each of the game players can be evaluated for the operation of the assigned control member. Even if the game is played by one game player, the game player can know the positions of control members which the game player is not skillful enough to operate adequately.

The game system may further comprise evaluation display means for displaying evaluations produced by the evaluating means distinguishably among the control members in the game image. The game player can know the evaluations by viewing the game image.

According to a still further aspect of the present invention, there is provided a recording medium readable by a computer and storing data representing a timing to operate control means in a game system while a game is being played, and a program for controlling the computer to execute a procedure to display on a display unit in the game system an image for indicating the timing to operate the control means based on the stored data while the game is in progress, and a procedure to generate an obstructive effect in the image to obstruct an attempt of the game player to grasp the timing to operate the control means, in response to an operation by the game player of the control means when the game is in progress.

According to a yet further aspect of the present invention, there is provided a recording medium readable by a computer and storing data representing timings to operate a plurality of respective control members in a game system while a game is being played, and a program for controlling the computer to execute a procedure to display on a display unit in the game system an image for indicating the timings to operate the control members based on the stored data while the game is in progress, and a procedure to evaluate operations by the game player of the control members, respectively, by comparing the timings at which the control members are actually operated by the game player with the timings represented by the stored data.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 28(*b*) is a diagram showing the data structure of event data in the music piece shown in FIG. 28(*a*);

DETAILED DESCRIPTION OF THE PREFERRED EMBODIMENTS

1st Embodiment

Figure 1:
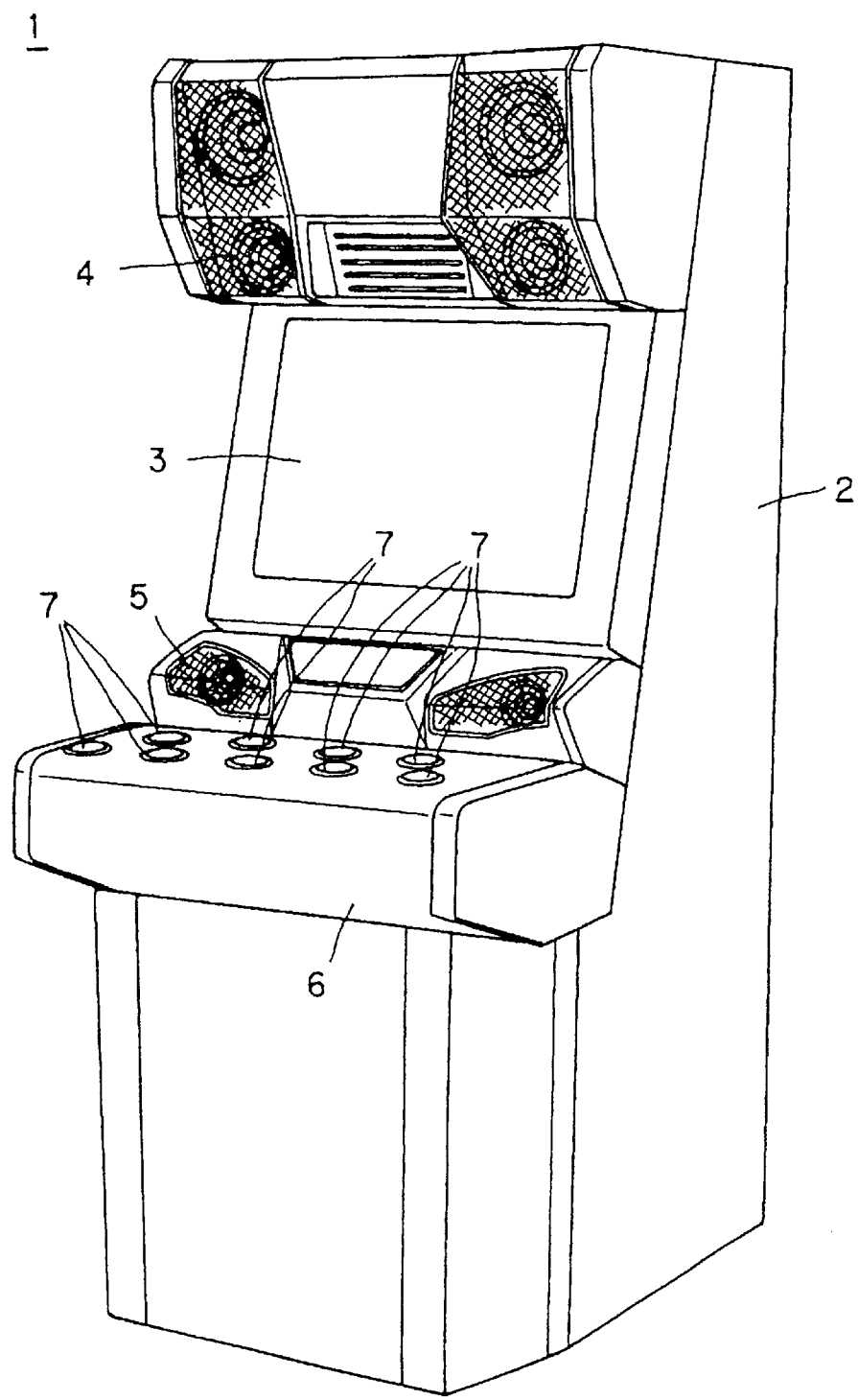
FIG. 1 is a perspective view of an arcade video game machine according to a first embodiment of the present invention.

FIG. 1 shows an arcade video game machine installed in an arcade or the like as a game system according to a first embodiment of the present invention. As shown in FIG. 1, the arcade video game machine, generally designated by the reference numeral 1, comprises a vertically elongate housing 2, a display monitor 3 mounted on an upper portion of the housing 2 and facing forward, a cluster of upper speaker units 4 mounted on a portion of the housing 2 above the display monitor 3, a pair of lower speaker units 5 mounted on a portion of the housing 2 underneath the display monitor 3, and nine control buttons 7 as control members mounted on a control panel 6 projecting forward from a portion of the housing 2 underneath the lower speaker units 5. Each of the control buttons 7 comprises a push-button switch which outputs a signal when pressed.

The control buttons 7 are arranged in two front and rear rows as viewed from a game player who stands in front of the housing 2. Each of the control buttons 7 in the rear row is positioned substantially intermediate between adjacent two of the control buttons 7 in the front row laterally across the control panel 6 as viewed from the game player. The control buttons 7 are colored in respective different hues so that they can visually be distinguished from each other. However, the control buttons 7 may not necessarily be colored in respective nine colors, but instead some of the control buttons 7 may be colored in one hue insofar as adjacent ones of the control buttons 7 should not be colored in one hue. The arcade video game machine 1 is coin-operated, and has a coin insertion slot (not shown) defined in the housing 2 or preferably in the control panel 6.

Figure 2:
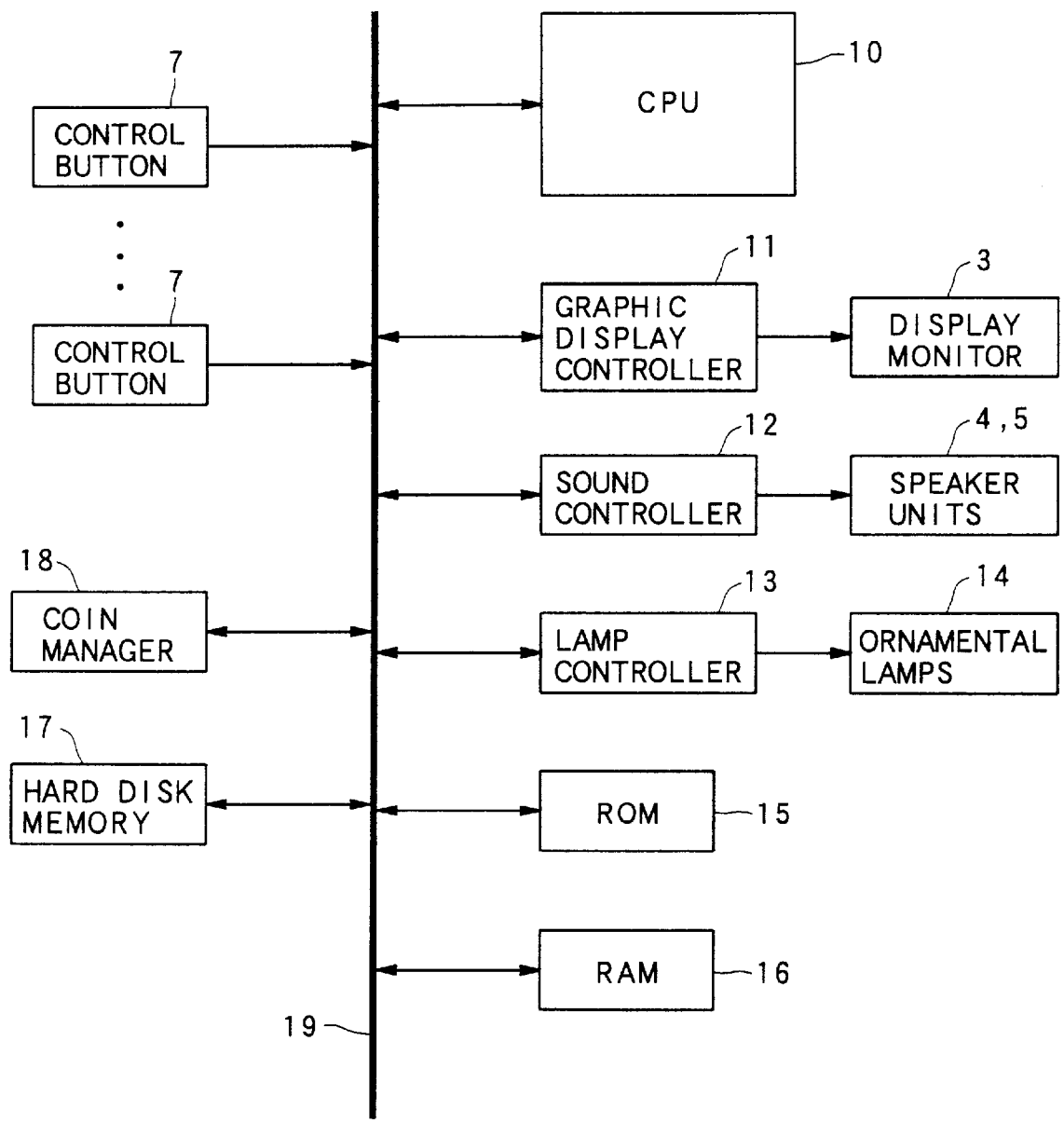
FIG. 2 is a block diagram of a control system of the arcade video game machine shown in FIG. 1.

FIG. 2 shows in block form a control system of the arcade video game machine 1 shown in FIG. 1. As shown in FIG. 2, the control system comprises a CPU 10 for carrying out various arithmetic and processing operations and control operations which are required to play the game on the arcade video game machine 1, a graphic display controller 11 for displaying desired images on the display monitor 3 according to instructions from the CPU 10, a sound controller 12 for reproducing stereophonic sounds from the speaker units 4, 5 according to instructions from the CPU 10, a lamp controller 13 for changing energized patterns of ornamental lamps 14 on the arcade video game machine 1, a RAM 15, a ROM 16, a hard disk memory 17 which serve as memory means, and a coin manager 18 for determining a coin inserted through the coin insertion slot is acceptable or not, keeping a coin which has been determined as acceptable, and returning a coin which has been determined as unacceptable. The sound controller 12 reads PCM data or ADPCM data stored in the hard disk memory 17 according to instructions from the CPU 10, and drives the speaker units 4, 5 to output music and sound effects based on the PCM data and ADPCM data.

The graphic display controller 11, the sound controller 12, the lamp controller 13, the RAM 15, the ROM 16, the hard disk memory 17, and the coin manager 18 are connected to the CPU 10 via a bus 19. The control buttons 7 are also connected to the CPU 10 via the bus 19. The bus 19 are connected to the above components via input and output interfaces (not shown).

The ROM 16 stores programs and data which are necessary to control basic operations when the arcade video game machine 1 starts to operate. The hard disk memory 17 stores a game program and various data needed to execute the game program. When a certain initializing action is taken, e.g., a power supply switch is turned on or a reset switch is turned on, the CPU 10 executes a predetermined initializing process according to a program stored in the ROM 16, then reads the game program and data from the hard disk memory 17 into the RAM 15, and begins a process inherent in the game on the arcade video game machine 1. When the coin manager 18 outputs a signal indicative of an inserted coin required to start the game, the CPU 10 starts a predetermined game playing process. The game playing process is basically such that while the CPU 10 is playing back given BGM from the speaker units 4, 5, the CPU prompts the game player via the display monitor 3 to operate the control buttons 7 in a sequence depending on the BGM, outputs sound effects depending on the operation of the control buttons 7 and added to the BGM from the speaker units 4, 5, and determines the operation of the control buttons 7 and displays the determined operation on the display monitor 3.

Figure 3:
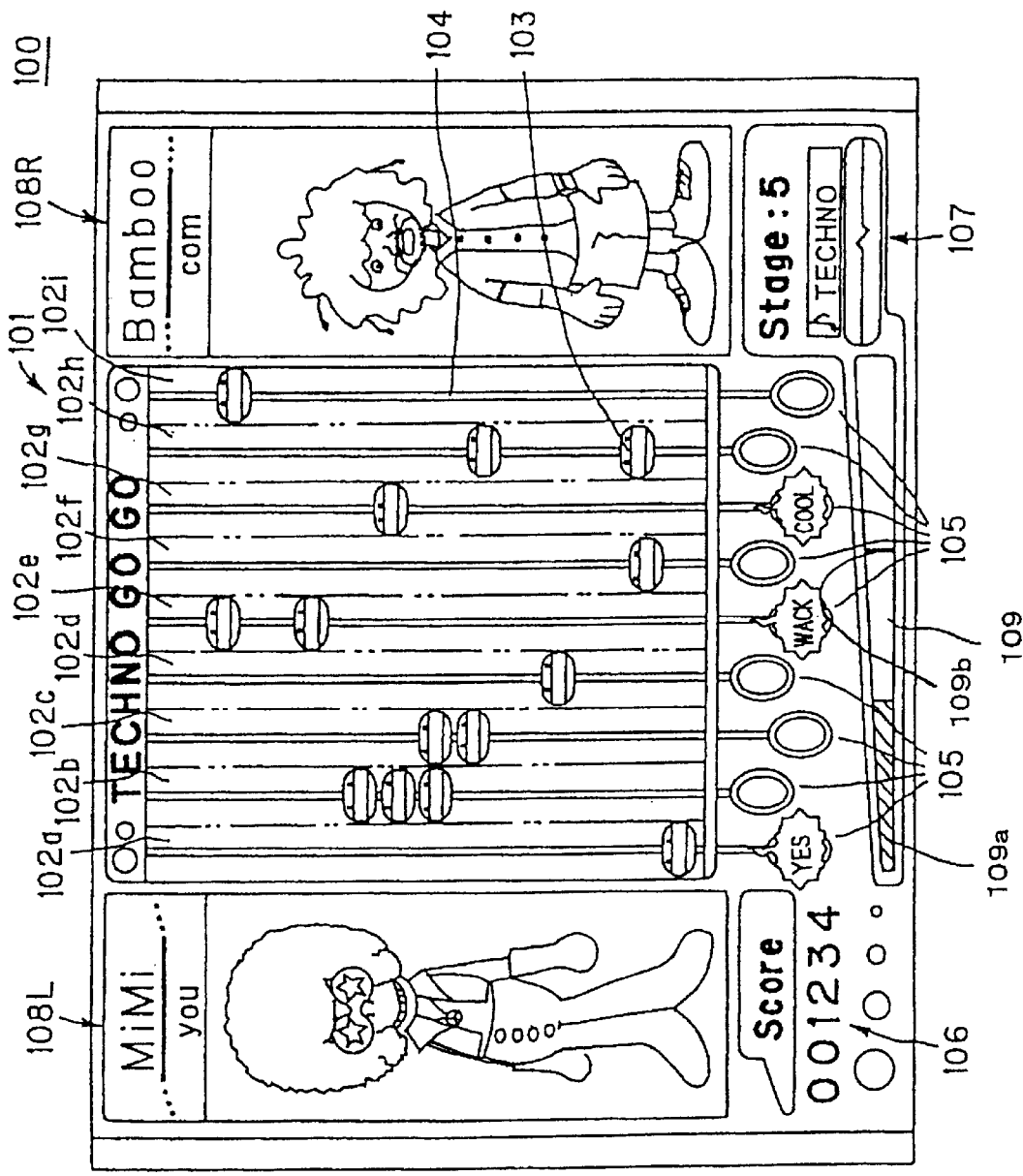
FIG. 3 is a view of a basic game image displayed on a display monitor in the control system shown in FIG. 2.

FIG. 3 shows a basic game image 100 displayed on the display monitor 3 when the game is executed by the game program stored in the hard disk memory 17. The game image 100 contains, substantially in its central area, an indicator 101 for indicating the timings to operate the control buttons 7 to the game player. The indicator 101 is divided into as many (nine) vertical tracks 102*a*–102*i* as the number of the control buttons 7, with timing marks 103 displayed on the tracks 102*a*–102*i*. Imaginary boundary lines shown between the vertical tracks 102*a*–102*i* are not displayed in the actual game image. Vertical lines 104 are displayed in the respective tracks 102*a*–102*i*. However, these vertical lines 104 may be omitted (see FIGS. 4 and 5).

Figure 4:
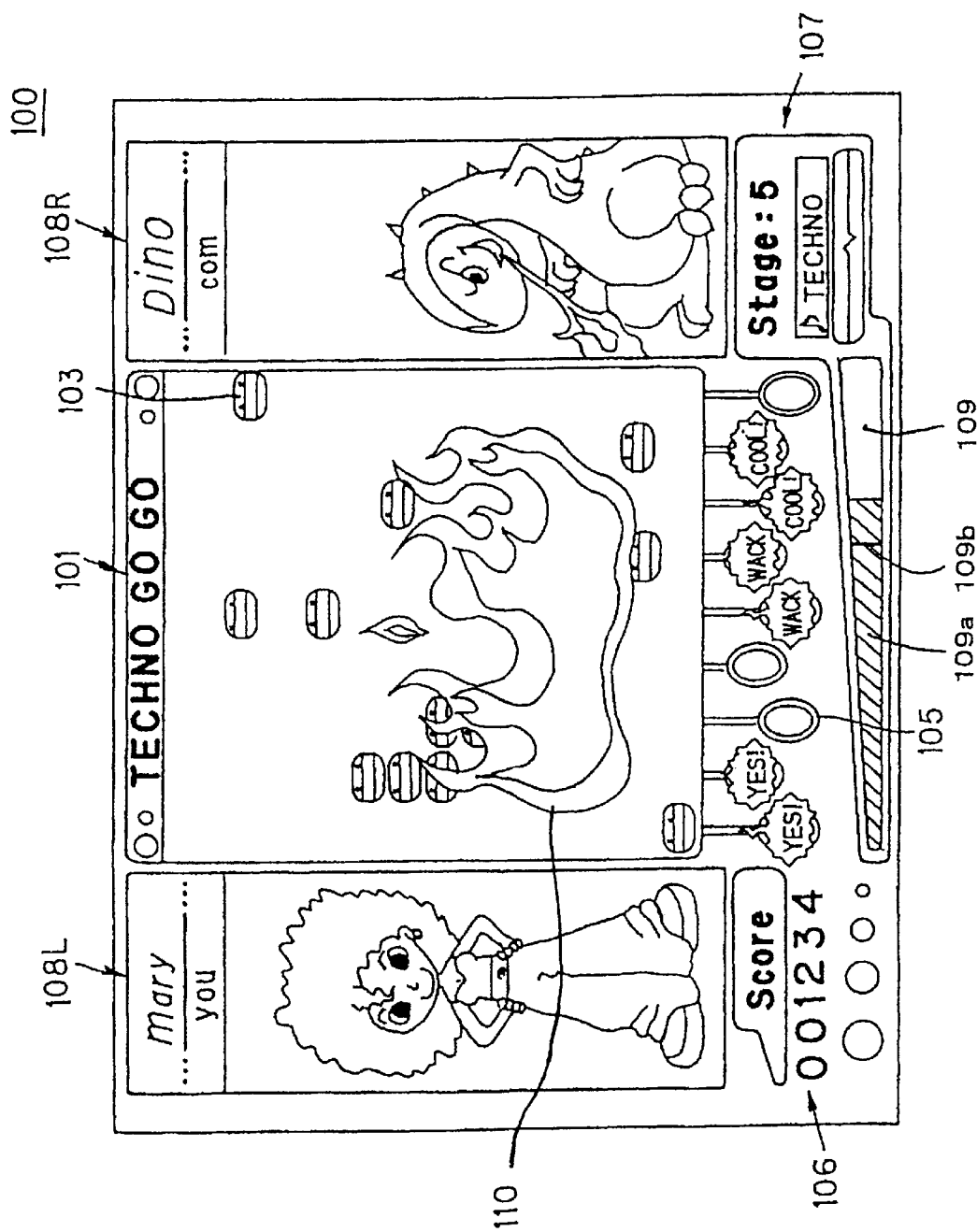
FIG. 4 is a view of a displayed game image with an image pattern added to an indicator in the game image shown in FIG. 3 for obstructing the teaching of control button operation timing.
Figure 5:
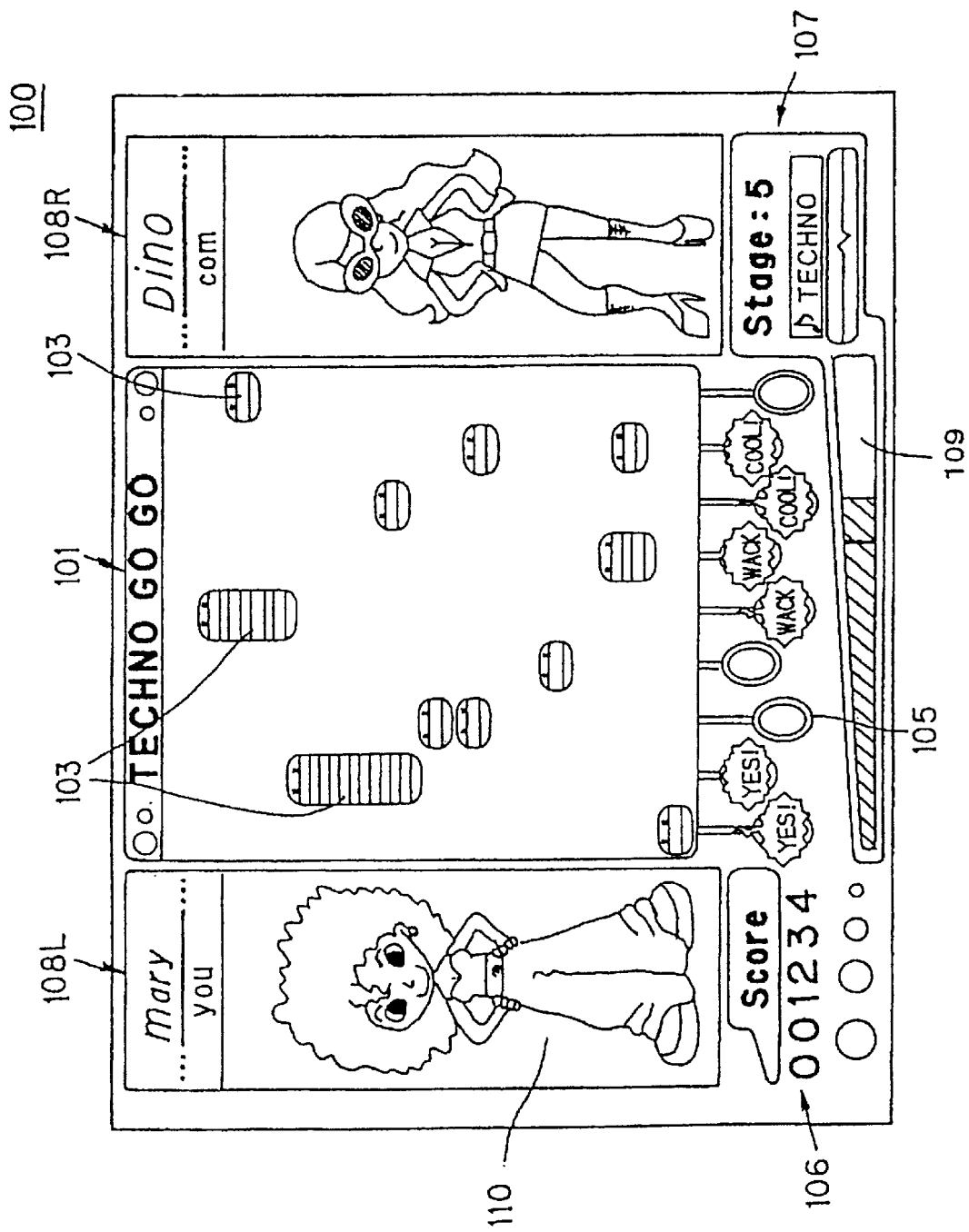
FIG. 5 is a view of a displayed game image with another image pattern added to the indicator in the game image shown in FIG. 3 for obstructing the teaching of control button operation timing.

While the game is being played, the tracks 102*a*–102*i* in its lateral sequence are associated with the respective control buttons 7 in one-to-one correspondence. Specifically, the track 102*a* in the leftmost end of the indicator 101 is associated with the control button 7 in the leftmost end of the front row on the control panel 6. The track 102*b*, second from the left, is associated with the control button 7 in the leftmost end of the rear row on the control panel 6. Similarly, the remaining tracks 102*c*–102*i* are associated with the remaining control buttons 7. To clearly indicate the association between the tracks 102*a*–102*i* and the control buttons 7, the tracks 102*a*–102*i* have respective portions rendered in the same colors as the corresponding control buttons 7. Specifically, if the control button 7 in the leftmost end of the front row on the control panel 6 is colored in green, for example, then the line 14 of the track 102*a* in the leftmost end of the indicator 101 is rendered in green. In this manner, the lines 14 of the tracks 102a–102i are rendered in the same colors as the corresponding control buttons 7. If the lines 104 are omitted as shown in FIGS. 4 and 5, then the timing marks 103 are rendered in the same colors as the corresponding control buttons 7.

When the game begins, the timing marks 103 gradually descend along the tracks 102a–102i under the control of the CPU 10. The instant the timing marks 103 reach the lower ends of the tracks 102a–102i, the timings to operate the control buttons 7 corresponding to the tracks 102a–102i arrive. If the game player presses one of the control buttons 7 in view of the control button operation timing, the CPU 10 decides whether the pressing of the control button 7 is good or not based on the time difference between the control button operation timing indicated by the corresponding timing mark 103 and the timing at which the control button 7 is actually pressed, and displays an expression based on the result of the decision on a corresponding one of decision display areas 105 that are disposed beneath the lower ends of the tracks 102a–102i. The decision display areas 105 are arranged in two rows in a pattern similar to the control buttons 7. The decision display areas 105 display letters such as "COOL", "YES!", "WACK", etc. depending on the result of the decision. Alternatively, the expression based on the result of the decision may be displayed within the indicator 101.

The game image 100 includes a score display area 106 for displaying a score (1234 points in FIG. 3) of the game in a lower left corner thereof. The score is of a value calculated on the basis of the result of the decision produced at each control button operation timing. The game image 100 also includes a title display area 107 for displaying stage contents and a BGM title in a lower right corner thereof. The game image 100 further includes a pair of character display areas 108L, 108R for displaying respective animated game characters one on each side of the indicator 101. The displayed animated game characters change depending on the BGM, and details of the animation change depending on the result of the decision produced at each control button operation timing. The game image 100 also includes a score gage 109 disposed below the decision display areas 105. The score gage 109 displays a highlighted bar 109a that extends or contracts horizontally depending on the score while the game is being played, the highlighted bar 109a having a left-hand end fixed to the left-hand end of the score gage 109.

Figure 6:
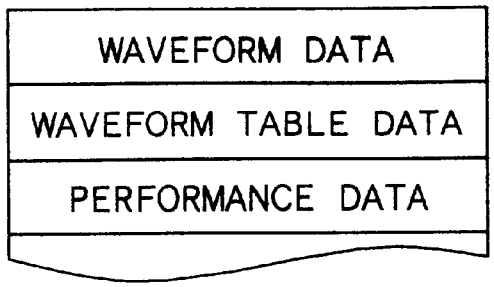
FIGS. 6(a), 6(b), and 6(c) are diagrams showing data of a music piece X recorded in a hard disk memory in the control system shown in FIG. 2.
Figure 6:
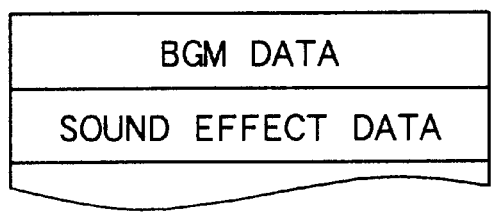
Figure 6:
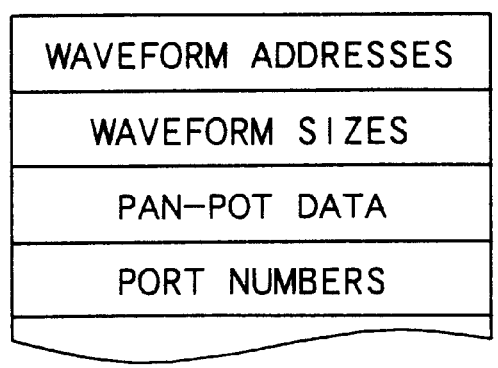

FIGS. 6(a), 6(b), and 6(c) and FIG. 7 show data relative to the playback of BGM and the display of the indicator 101, among the data stored in the hard disk memory 17. In the arcade video game machine 1, a plurality of music pieces are prepared as the BGM for use in the game. Data shown in FIG. 6(a) are generated for each of the music pieces and stored in the hard disk memory 17. The data of a music piece X includes waveform data, waveform table data, and performance data.

As shown in FIG. 6(b), the waveform data include BGM data and sound effect data. The BGM data are data for playing back the music piece X. The sound effect data are data of sounds to be produced when the control buttons 7 are operated. These data are generated and stored as PCM data or ADPCM data, for example. The sound effect data are included in the data of each music piece in order to generate appropriate sound effects depending on the type of BGM.

As shown in FIG. 6(c), the waveform table data include data tables relative to waveform addresses, waveform sizes, pan-pot data, and port numbers. The data tables relative to waveform addresses and waveform sizes contain information necessary to read desired BGM data and sound effect data from the waveform data described above. The data table relative to the pan-pot data contains information for indicating one or both of the left and right channels provided by the speaker units 4, 5 from which BGM data and sound effect data are to be outputted. The data table relative to the port numbers contain information for indicating port numbers to output BGM data and sound effect data. Specifically, the sound controller 12 has a plurality of (e.g., eight) channels for generating sounds, and port numbers are used to indicate which of those channels are to be used to reproduce waveform data. The information for selecting port numbers is contained in the data table relative to the port numbers.

Figure 7:
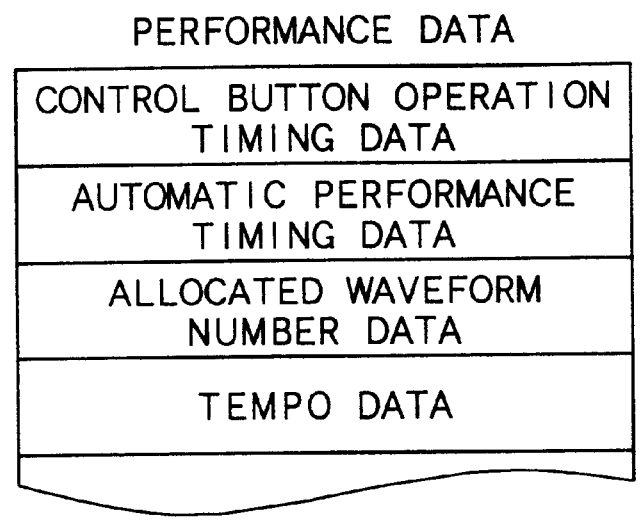
FIG. 7 is a diagram showing a structure of performance data shown in FIG. 6(a)

As shown in FIG. 7, the performance data include control button operation timing data, automatic performance timing data, allocated waveform number data, and tempo data. The control button operation timing data are data for indicating operation timing of each of the control buttons 7 with respect to the music piece X in association with the time that elapses from the start of the performance of the music piece X. Stated otherwise, the control button operation timing data are data defining which of the control buttons 7 should be pressed upon elapse of periods of time from the start of the performance of the music piece X. The control button operation timing data serve as a basis for making a decision with respect to the display of the indicator 101 and the operation of the control buttons 7. If the music piece X has a plurality of phrases, then information indicative of the times corresponding to divisions between the phrases is also contained in the control button operation timing data.

The automatic performance timing data are provided for generating sound effects even when the control buttons 7 are not operated. The automatic performance timing data are data defining which of sound effects are to be produced upon elapse of periods of time from the start of the performance of the music piece X. While the game is being played, the CPU 10 instructs the sound controller 12 to produce sound effects at a time indicated by the automatic performance timing data. The automatic performance timing data may not necessarily be required for the execution of the game, and may be omitted.

The allocated waveform number data are data indicating sound effects to be generated when the control buttons 7. The relationship between the control buttons 7 and the sound effects may be constant throughout the music piece X, or may be changed at each of suitable divisions of the music piece X, e.g., for each of the phrases of the music piece X. If sound effects are to be changed in the middle of the music piece X, then the relationship between the control buttons 7 and the sound effects is recorded in association with the elapse of time from the start of the performance of the music piece X.

The tempo data are data representing the tempo of the performance of the music piece X. If the tempo is to be in the middle of the music piece X, then the temp is recorded in association with the elapse of time from the start of the performance of the music piece X. In the arcade video game machine 1, the indicator 101 has a displayed range controlled by referring to the tempo data.

Figure 8:
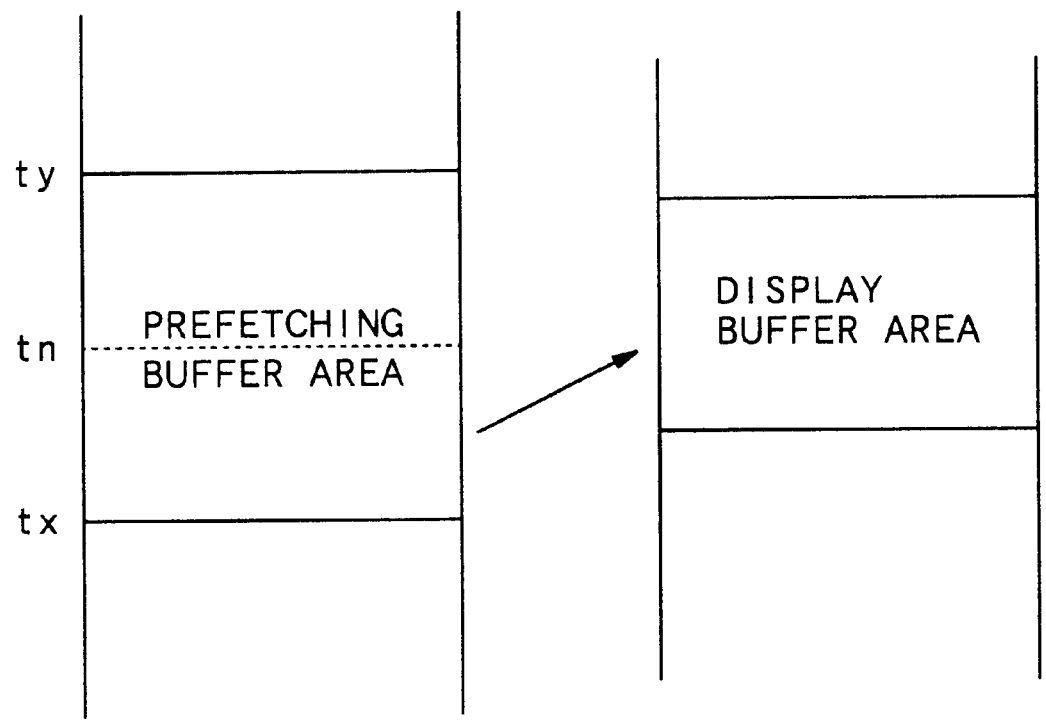
FIG. 8 is a diagram showing the manner in which control button operation timing data of the performance data shown in FIG. 7 is read into a RAM.

FIG. 8 shows the relationship between a read range of the control button timing data and a displayed range of the indicator 101 while the game is being played. While the game is being played, the RAM 15 (see FIG. 2) includes a prefetching buffer area for prefetching control button operation timing data. The prefetching buffer area prefetches or reads control button operation timing data ranging from a present time tx to a time ty as measured from the performance starting time. Of the data read into the buffer area, control button operation timing data ranging from the present time tx to a time tn (<ty) is further read into a display buffer area of the RAM 15. The period from the time tx to the time tn is equal to two measures of the music piece X, but changes depending on the tempo of the performance of the music piece X. By referring to the tempo data, therefore, the CPU 10 determines the time tn which is two measures after the present time tx, and reads the control button operation timing data from the time tx to the time tn as the displayed range of the indicator 101 into the display buffer area. The CPU 10 then calculates positions of the timing marks 103 in the indicator 101 according to the control button operation timing data thus read into the display buffer area, and generates image data for displaying the indicator 101 based on the calculated positions. Based on the generated image data, the graphic display controller 11 updates the game image 100 to display the indicator 101 suitable for the present time tx. The time ty corresponding to an end of the prefetching buffer area may be varied depending on the tempo of the music piece X. The amount of control button operation timing data to be read into the display buffer area is not limited to two measures, but may be changed as desired.

Figure 9:
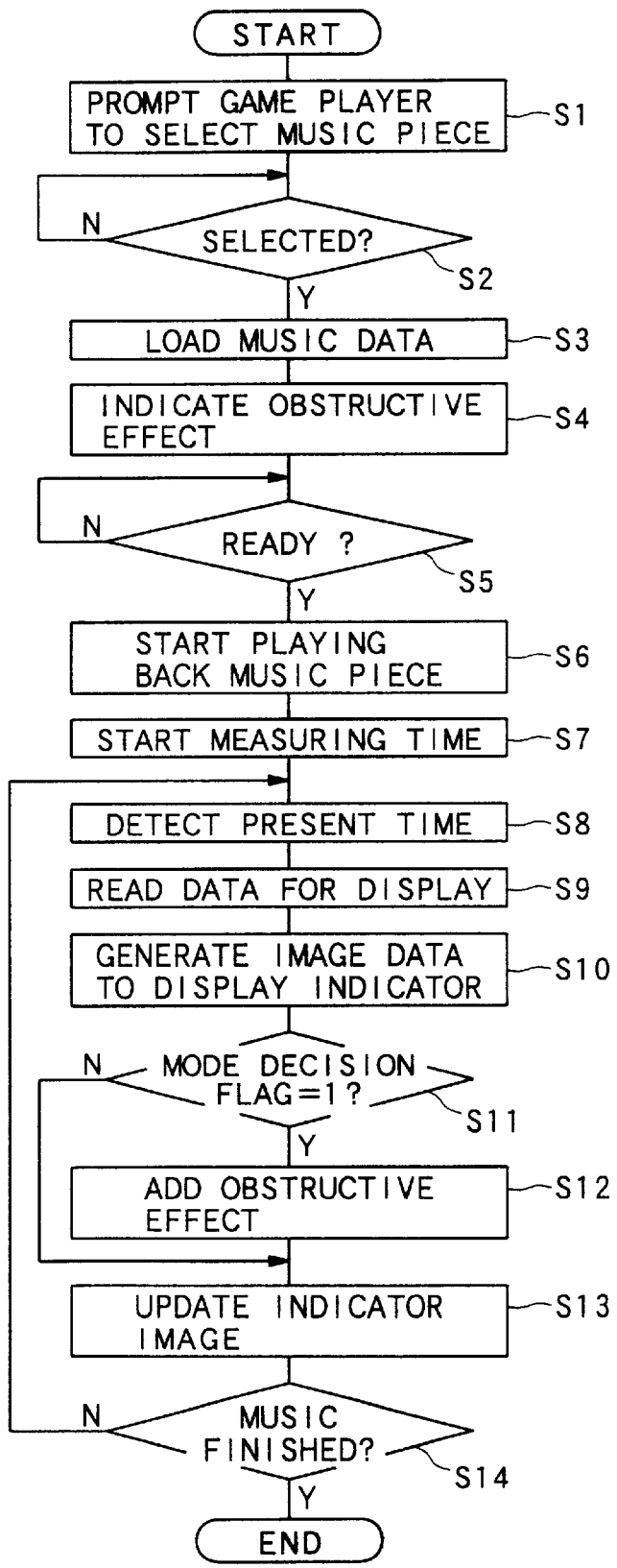
FIG. 9 is a flowchart of the sequence of a game playing process executed by a CPU in the control system shown in FIG. 2.

FIG. 9 shows the sequence of a game playing process executed by the CPU 10 when the coin manager 18 outputs a signal indicative of an inserted coin required to start the game. First, the CPU 10 prompts the game player to select a music piece to be performed as BGM on the display monitor 3 in step S1, and then decides whether BGM is selected or not in step S2. The game player may use the control buttons 7 to select a music piece as BGM. If the game player selects a music piece, then the CPU 10 reads the data of the selected music piece (see FIG. 6(*a*)) into the RAM 15 in step S3, and indicates an obstructive effect with respect to the read music piece in step S4. The obstructive effect means an image pattern added to the indicator 101 for the purpose of blinding the game player, such as an image pattern 110 (see FIG. 4) overlapping some of the timing marks 103 to conceal them, or changes in length of some of the timing marks 103 (see FIG. 5). The ROM 16 stores a table of music genres and obstructive effects associated therewith, and a obstructive effect is determined from the table depending on the genre of the selected music piece. Some of the timing marks 3 may be concealed by adding noise such as image blurring to them, rather than adding the image pattern 110.

In step S5, the CPU 10 decides whether the game has been readied or not. If the game has been readied, then the CPU 10 supplies the waveform data of the music piece to the sound controller 12 to start playing back the music piece in step S6. Thereafter, the CPU 10 starts measuring time to grasp a period of time that has elapsed from the start of the performance of the music piece in step S7.

In step S8, the CPU 10 detects the present time tx. In step S9, the CPU 10 reads the control button operation timing data from the present time tx to the time ty into the prefetching buffer area shown in FIG. 8, and then reads the control button operation timing data of two measures from the present time tx into the display buffer area. In step S10, the CPU 10 generates image data to display the indicator 101 based on the control button operation timing data stored in the display buffer area. In step S11, the CPU 10 decides whether a mode decision flag indicative of whether an obstructive effect is to be generated or not is set to "1" or not.

If the mode decision flag is set to "1", then the CPU 10 processes the image data of the indicator 101 generated in step S10 to add the obstructive effect indicated in step S4 to the indicator 101 in step S12. For example, if the obstructive image pattern 110 is to be added as shown in FIG. 4, the CPU 10 generates display data of the image pattern 110 and adds the generated display data in overlapping relation to the image data of the indicator 101. If the length of some of the timing marks 103 is to be changed as shown in FIG. 5, then the CPU 10 modifies the image data of the indicator 101 itself. Specifically, the image data are processed such that the obstructive effect appears in an area of the indicator 101 which is higher than about one-third, for example, of the entire vertical length of the indicator 101 from the lower end thereof. Since no obstructive effect appears in a lower end portion of the indicator 101, the game player can grasp exact control button operation timing without being blinded by the obstructive effect by carefully viewing the lower end portion of the indicator 101. In FIG. 5, the length of some of the timing marks 103 is changed so as to be greater than an ordinary length. However, those longer timing marks 103 are not limited to creating an obstructive effect, but may be displayed as indicating an actual operation of the control buttons 7, e.g., a succession of button depressions. Furthermore, when longer timing marks 103 are displayed, they may be displayed so as to be shorter than an actual length by an obstructive effect.

If the mode decision flag is not set to "1" in step S11, then control skips step S12. In step S13, the CPU 10 supplies image data of the indicator 101 to the graphic display controller 11, updating the existing image of the indicator 101. Thereafter, the CPU 10 decides whether the performance of the music piece is finished or not in step S14. If the performance of the music piece is finished, then the game playing process shown in FIG. 10 comes to an end.

Figure 10:
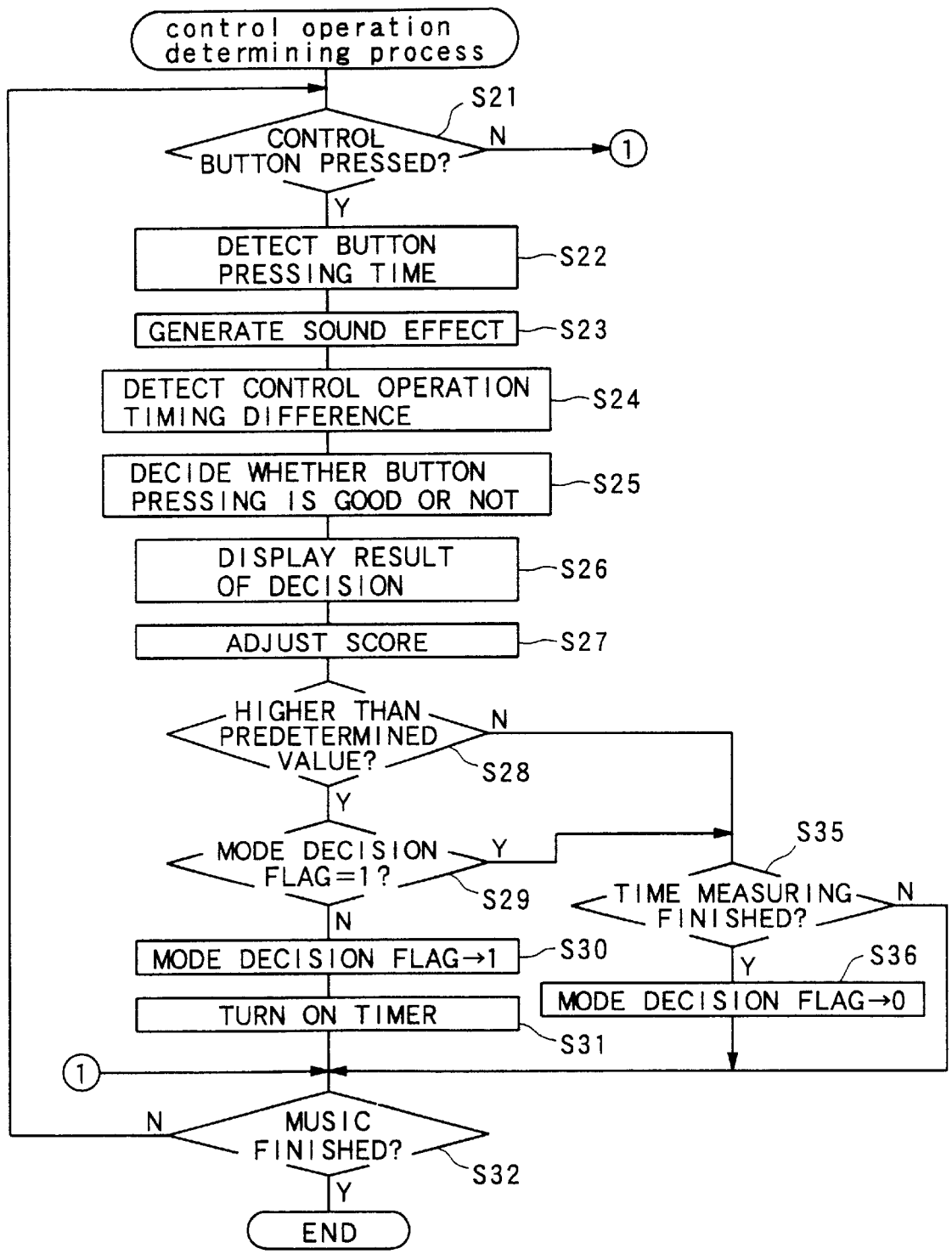
FIG. 10 is a flowchart of the sequence of a control operation determining process which is executed by the CPU while BGM is being played back by the game playing process shown in FIG. 9.

FIG. 10 shows the sequence of a control operation determining process which is executed by the CPU 10 while steps S8–S14 of the game playing process shown in FIG. 9 are being executed. In the control operation determining process shown in FIG. 10, the CPU 10 decides whether the game player has pressed either one of the control buttons 7 or not in step S21. If the game player has pressed either one of the control buttons 7, then the CPU 10 detects the time when the game player has pressed the control button 7 in step S22. Thereafter, the CPU 10 generates sound effects assigned to the pressed control button 7 from the speaker units 4, 5 in step S23. Specifically, the CPU 10 determines sound effects allocated to the presently pressed control button 7 from the allocated waveform number data shown in FIG. 7, identifies the position where the data of allocated sound effects is recorded from the waveform table data shown in FIG. 6(*c*), and supplies sound effect data at the identified position to the sound controller 12 to output corresponding sound effects together with the BGM.

In step S24, the CPU 10 detects a time difference between the time when the game player has pressed the control button 7 as detected in step S22 and control button operation timing (which is limited to control button operation timing relative to the actually operated control button 7) closest to the present time tx among the control button operation timing data shown in FIG. 7. Based on the detected time difference, the CPU 10 decides whether the pressing of the control button 7 is good or not, as one of several levels, in step S25. In step S26, the CPU 10 displays the result of the decision on one of decision display areas 105 which is contiguous to the track corresponding to the control button 7 that has been decided as being pressed in step S21.

In step S27, the CPU 10 calculates a score from the start of the performance up to the present time based on the result of the decision in step S25. For example, a reference level is established for the result of the decision, and the score is adjusted so as to be higher if an individual pressing of the control button 7 is better than the reference level and lower if it is worse than the reference level. The CPU 10 then decides whether or not the adjusted score is equal to or higher than a predetermined value in step S28. If the adjusted score is equal to or higher than the predetermined value, then the CPU 10 decides whether the mode decision flag is set to "1" in step S29. If the mode decision flag is not set to "1", then the CPU 10 sets the mode decision flag to "1" in step S30. Now, an obstructive effect appears in the indicator 101. Therefore, when the game player becomes accustomed to the game and the evaluation of the skill of the game player increases to a certain level, then an obstructive effect suddenly appears in the indicator 101, making the game more difficult to play. As a result, an unexpected element is introduced into the game, letting the game player find the game to be more fun and interesting. The score displayed in the score display area 106 and the length of the highlighted bar 109a in the score gage 109 are updated according to the score adjusted in step S27. When the score is equal to or higher than the predetermined value in step S28, the highlighted bar 109a in the score gage 109 extends rightward to or beyond a given position 109b (see FIG. 4) in the score gage 109. Consequently, when the highlighted bar 109a extends rightward from the given position 109b, an obstructive effect is generated. The game player is thus able to predict the generation of an obstructive effect by observing the score gage 109.

In step S31, the CPU 10 turns on a timer to limit the obstructive effect to a preset period of time. Thereafter, the CPU 10 decides whether the performance of the music piece, which has started to be played back in step S6, has been finished or not in step S32. If the performance of the music piece has been finished, then control returns to step S21, waiting for a next control button pressing. If no control button pressing is decided in step S21, control jumps to step S32.

If the score is less than the predetermined value in step S28, or if the mode decision flag is set to "1", then control goes to step S35 in which the CPU 10 decides whether the timer has finished measuring the period of time in which an obstructive effect continues or not. If the timer has finished measuring the period of time, then the CPU 10 sets the mode decision flag to "0" in step S36, after which control goes to step S32. If the timer has not finished measuring the period of time, then control skips step S36 and goes to step S32. If the performance of the music piece is finished in step S32, then the control operation determining process shown in FIG. 10 comes to an end.

FIGS. 11(a) through 11(e) show other obstructive effects that can be added to the indicator 101 in the game image shown in FIG. 3.

Figure 11A:
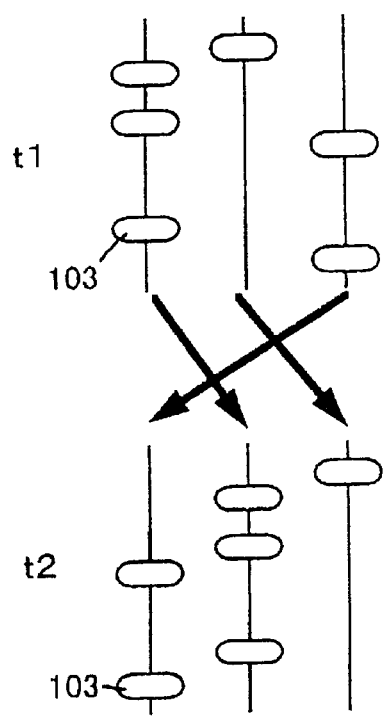
FIGS. 11(a) through 11(e) are diagrams showing other obstructive effects that can be added to the indicator in the game image shown in FIG. 3.
Figure 11B:
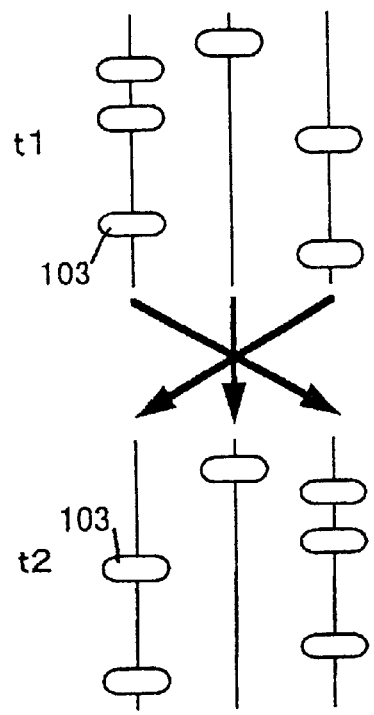
Figure 11C:
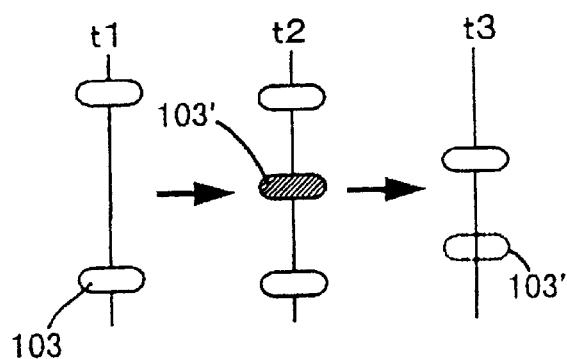
Figure 11D:
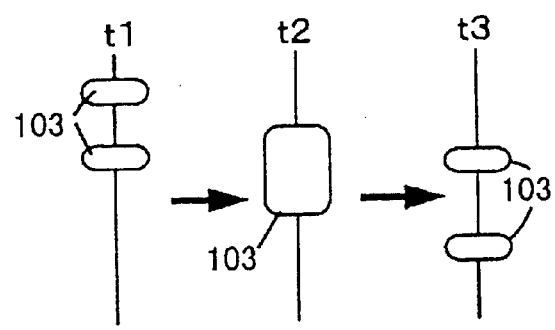
Figure 11E:
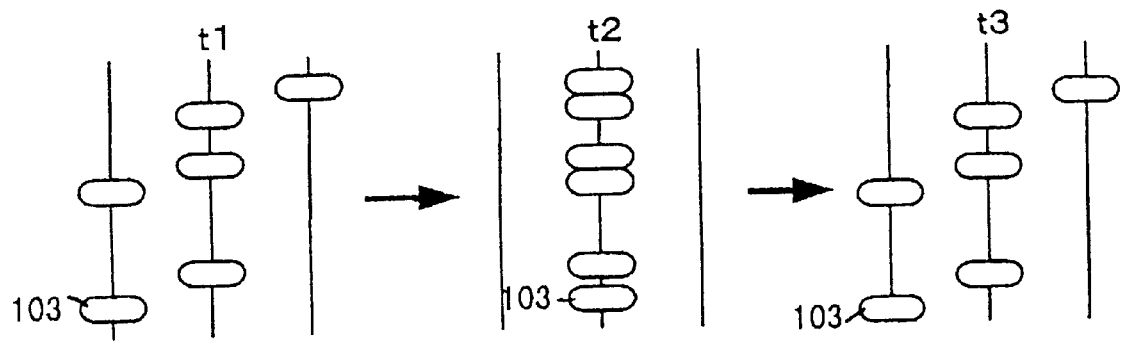

In FIG. 11(a), the display positions of timing marks 103 are laterally shifted upon passage from a time t1 to a time t2. In FIG. 11(b), the display positions of timing marks 103 are laterally switched around upon passage from a time t1 to a time t2. In FIG. 11(c), a dummy timing mark 103' which is not represented by the control button operation timing data is added upon passage from a time t1 to a time t2, and thereafter eliminated at a time t3. In FIG. 11(d), timing marks 103 are combined with each other upon passage from a time t1 to a time t2, and thereafter separated from each other at a time t3. In FIG. 11(e), timing marks 103 on a plurality of tracks are combined onto one track upon passage from a time t1 to a time t2, and thereafter returned onto the tracks at a time t3. The obstructive effects shown in FIGS. 11(a) through 11(e) can be created by rewriting a portion of the control button operation timing data read into the display buffer area or combining image data generated according to the control button operation timing data with other image data.

In the first embodiment described above, the CPU 10 and the software or game program are combined to realize a control operation indicating means, an obstructing means, a decision means, an evaluating means, and an obstructive effect control means. Specifically, the CPU 10 operates as a control operation indicating means when it executes step S13 shown in FIG. 9. The CPU operates as an obstructing means when it executes step S12 shown in FIG. 9. The CPU operates as a decision means and an evaluating means when it executes steps S24–S28 shown in FIG. 10. The CPU operates as an obstructive effect control means when it executes steps S29–S31, S35, S36 shown in FIG. 10 and step S11 shown in FIG. 9. However, some or all of the above means may be implemented by a logic circuit comprising a combination of ICs and LSI circuits. The control members are not limited to the control buttons 7, but may comprise control levers or rotatable members.

The above first embodiment of the present invention is not limited to a game system in which an obstructive effect appears depending on whether the achievement of the game player during the game exceeds a predetermined level or not. Instead, various modifications may be made as follows: When the game begins, the game player is allowed to select either one of a plurality of modes having different difficulty levels, and those modes may be distinguished from each other such that an obstructive effect is generated in modes having higher difficulty levels and not in modes having lower difficulty levels. The modes may be distinguished from each other by other than difficulty levels. A plurality of stages may be prepared for one mode, and distinguished from each other such that an obstructive effect is generated in certain stages and not in other stages. In this modification, the genre of music performed as BGM in each of the stages may be changed, and the obstructive effect may also be changed accordingly. A clock function may be added to the game system to cause an obstructive effect to appear in a certain time zone (e.g., an evening zone) or to change obstructive effects depending on the time zone. Furthermore, an obstructive effect may be created as a hidden command such that the presence of the obstructive effect is hidden from the game player and the obstructive effect emerges when the control buttons 7 or the like are operated in a certain sequence.

2nd Embodiment

A game system according to a second embodiment of the present invention will be described below with reference to FIGS. 12 through 22. According to the second embodiment, the game system is constructed as a video game machine for home use.

Figure 12:
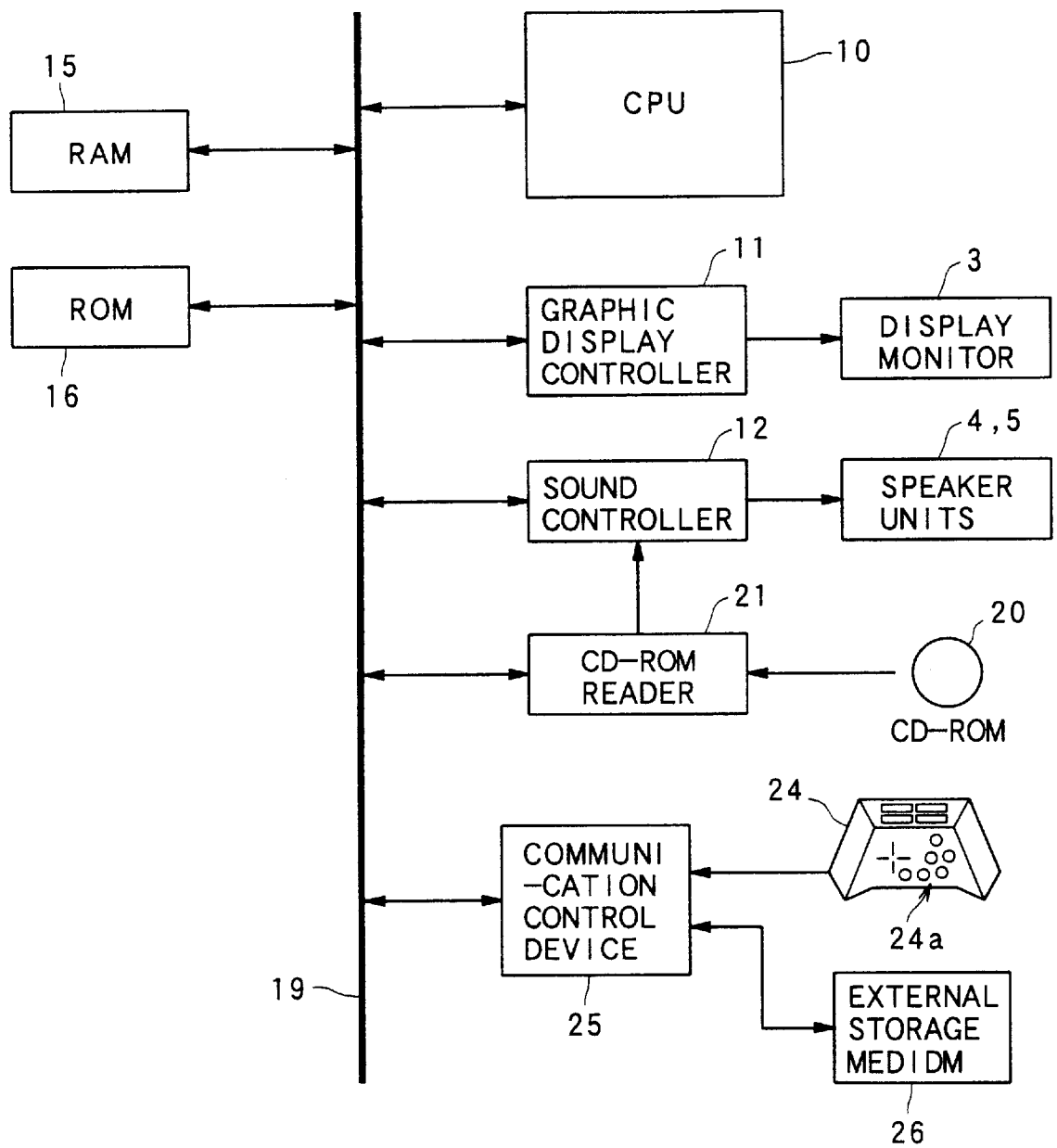
FIG. 12 is a block diagram of a control system of a game machine for home use according to a second embodiment of the present invention.

FIG. 12 shows in block diagram of the game system according to the second embodiment of the present invention. Those parts of the game system shown in FIG. 12 which are identical to those of the game system shown in FIG. 2 are represented by identical reference numerals. In the video game machine for home use shown in FIG. 12, a game program and data are recorded in a CD-ROM 20, rather than the hard disk memory 17 shown in FIG. 2. A CD-ROM reader 21 for reading the game program and data from the CD-ROM 20 is connected to the bus 19.

The data recorded in the CD-ROM 20 include waveform data, waveform table data, and performance data as shown in FIG. 6(a), whose details have been described above with respect to the game system according to the first embodiment of the present invention. BGM data included in the waveform data are recorded in the CD-ROM 20 according to a CD-DA or CD-ROM XA format, for example. According to the CD-DA or CD-ROM XA format, the data of one music piece are recorded as a plurality of small data segments each having a suitable data length. The small data segments contain respective items of information indicative of performance times of the data segments, e.g., time information of the channel Q according to the CD standards, as measured from the start of the music piece (the time base origin). The video game machine shown in FIG. 12 uses the information indicative of performance times to be able to specify a period of time that has elapsed from the start of the performance of a certain music piece for playing back BGM from the data corresponding to the specified time. When instructed by the CPU 10 to playback the BGM data, the CD-ROM reader 21 decodes the corresponding data recorded in the CD-ROM 20 and supplies the decoded data directly to the sound controller 12 without passing through the bus 19. The sound controller 12 converts the data supplied from the CD-ROM reader 21 into analog data, and supplies the analog data to the speaker units 4, 5.

The video game machine shown in FIG. 12 is devoid of the coin manager 18 and the lamp controller 13 shown in FIG. 2. A manual controller 24 that can be operated by the game player is detachably connected to the video game machine. The manual controller 24 has a plurality of control members 24a including direction keys and pushbutton switches. The control members 24a correspond to the control buttons 7 of the arcade video game machine shown in FIG. 2. The manual controller 24 is connected to the bus 12 by a communication control device 25. The manual controller 24 outputs signals indicative of operated states of the control members 24a at certain cyclic periods, e.g., 60 times per second. The output signals from the manual controller 24 are transmitted via the communication control device 25 and the bus 19 to the CPU 10.

To the communication control device 25, there is also connected an external storage medium 26 which comprises a rewritable semiconductor memory capable of holding stored data. The external storage medium 26 can record information representing an interim status of the game for each of game players who play the game on the video game machine. While only one pair of the manual controller 24 and the external storage medium 26 is shown in FIG. 12, a plurality of pairs of the manual controller 24 and the external storage medium 26 may be connected to the communication control device 25. The manual controller 24 shown in FIG. 12 is of a general-purpose type for use with various different games. However, the manual controller 24 may be replaced with a dedicated manual controller designed exclusively for use with the game played on the video game machine shown in FIG. 12. The display monitor 3 may comprise a television set for home use, and the speaker units 4, 5 may comprise speaker units installed in such a television set for home use.

When the CD-ROM 20 is inserted into the CD-ROM reader 21 and a certain initializing action is taken, e.g., a power supply switch is turned on or a reset switch is turned on, the CPU 10 starts executing a predetermined process according to the game program stored in the CD-ROM 20, and displays a game startup image on the display monitor 3. When the game player operates the manual controller 24 for starting the game in the game startup image, the CPU 10 starts executing a game playing process shown in FIG. 13. If the game player does not operate the manual controller 24 for starting the game within a predetermined period of time, then the CPU 10 displays a given game demonstration image on the display monitor 3.

Figure 13:
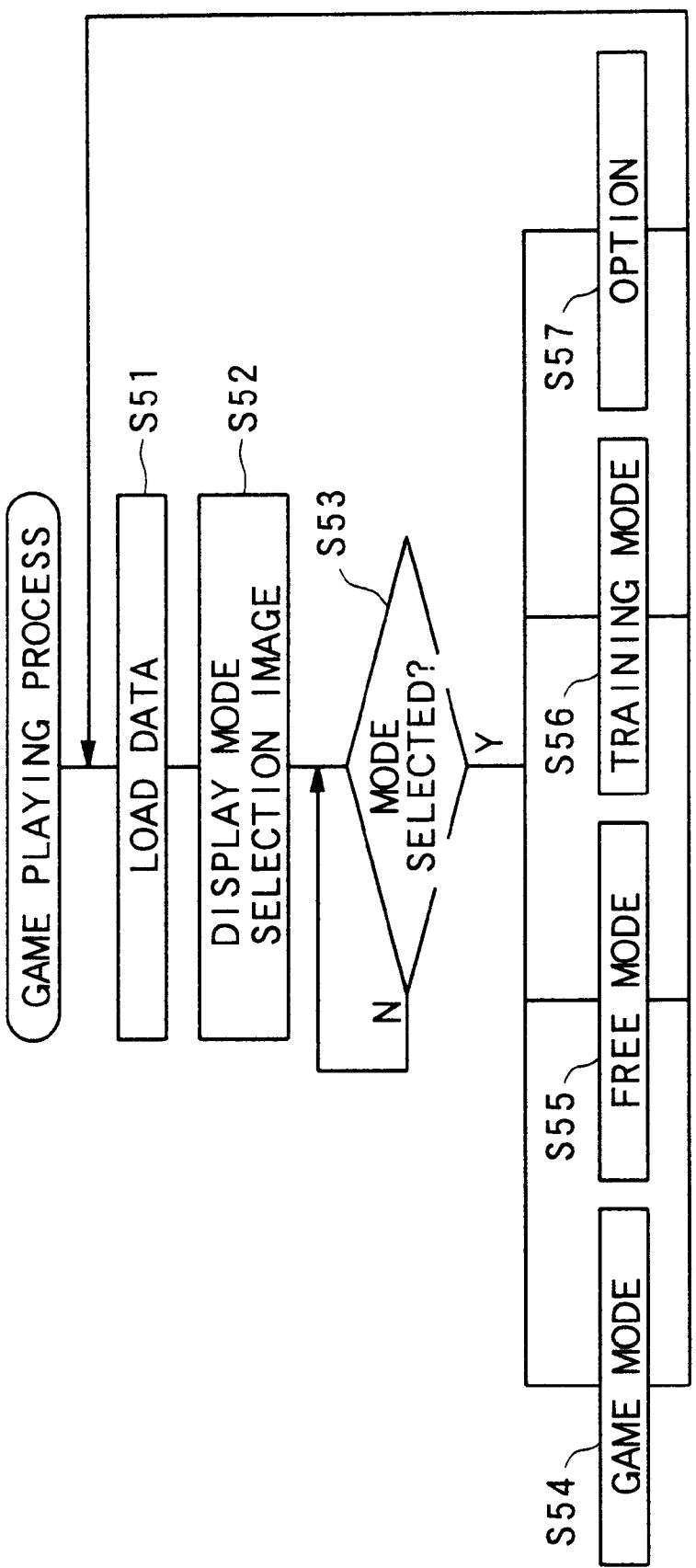
FIG. 13 is a flowchart of the sequence of a game playing process executed by a CPU in the control system shown in FIG. 12.
Figure 14:
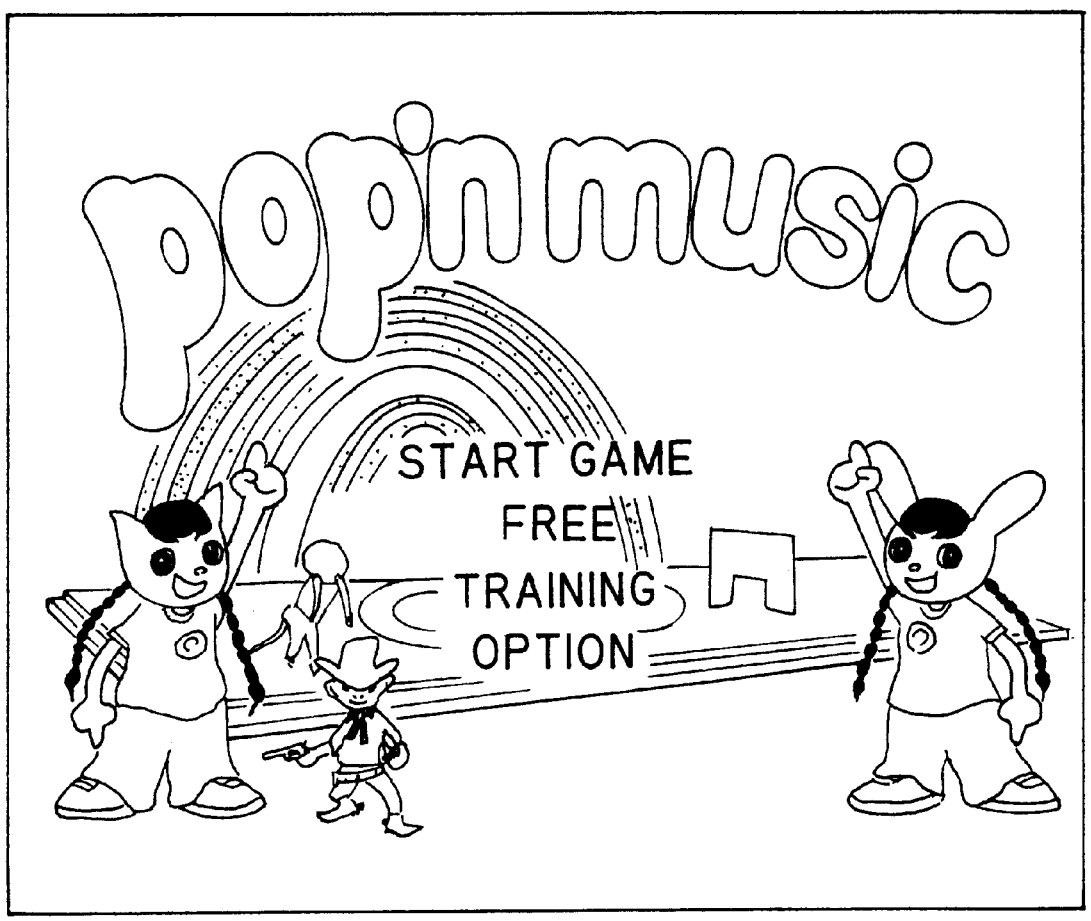
FIG. 14 is a view of a mode selection image displayed on a display monitor when the game playing process shown in FIG. 13 starts being executed.

The game playing process shown in FIG. 13 will be described below. The CPU 10 loads data necessary to start the game from the CD-ROM 20 in step S51, and displays a mode selection image 200 shown in FIG. 14 on the display monitor 3 in step S52. The mode selection image 200 includes four displayed alternative items named "START GAME", "FREE", "TRAINING", and "OPTION" for the game player to choose from. The item "START GAME" represents a mode in which after the game player clears one music piece (BGM), the game proceeds to a next music piece. The item "FREE" represents a mode in which the game player plays back a preferred music piece. The item "TRAINING" represents a mode in which the game player practices a desired music piece. This training mode is added in view of the nature of the video game machine for home use which allows the game player to play the game repeatedly without concern over other people. The training mode will be described in detail later on. The item "OPTION" represents a mode in which the game player can enter preferred settings about how to proceed with the game, etc.

After the mode selection image 200 is displayed, the CPU 10 decides whether the game player has selected one of the modes or not in step S53. When the game player has selected one of the modes, the CPU 10 starts executing a process according to the selected mode in step S54, S55, S56, or S57. Specifically, if the game player has selected "START GAME", then the CPU 10 executes a game mode process in step S54. If the game player has selected "FREE", then the CPU 10 executes a free mode process in step S55. If the game player has selected "TRAINING", then the CPU 10 executes a training mode process in step S56. If the game player has selected "OPTION", then the CPU 10 executes an option process in step S57. When the process according to the selected mode is finished, control goes back to step S51. In the game mode process and the free mode process, the display monitor 3 displays game images similar to those shown in FIGS. 3 through 5 though the procedure for selecting BGM is different, and the game is executed according to processes similar to the processes shown in FIGS. 9 and 10. Therefore, details of the game mode process and the free mode process will not be described below.

Figure 15:
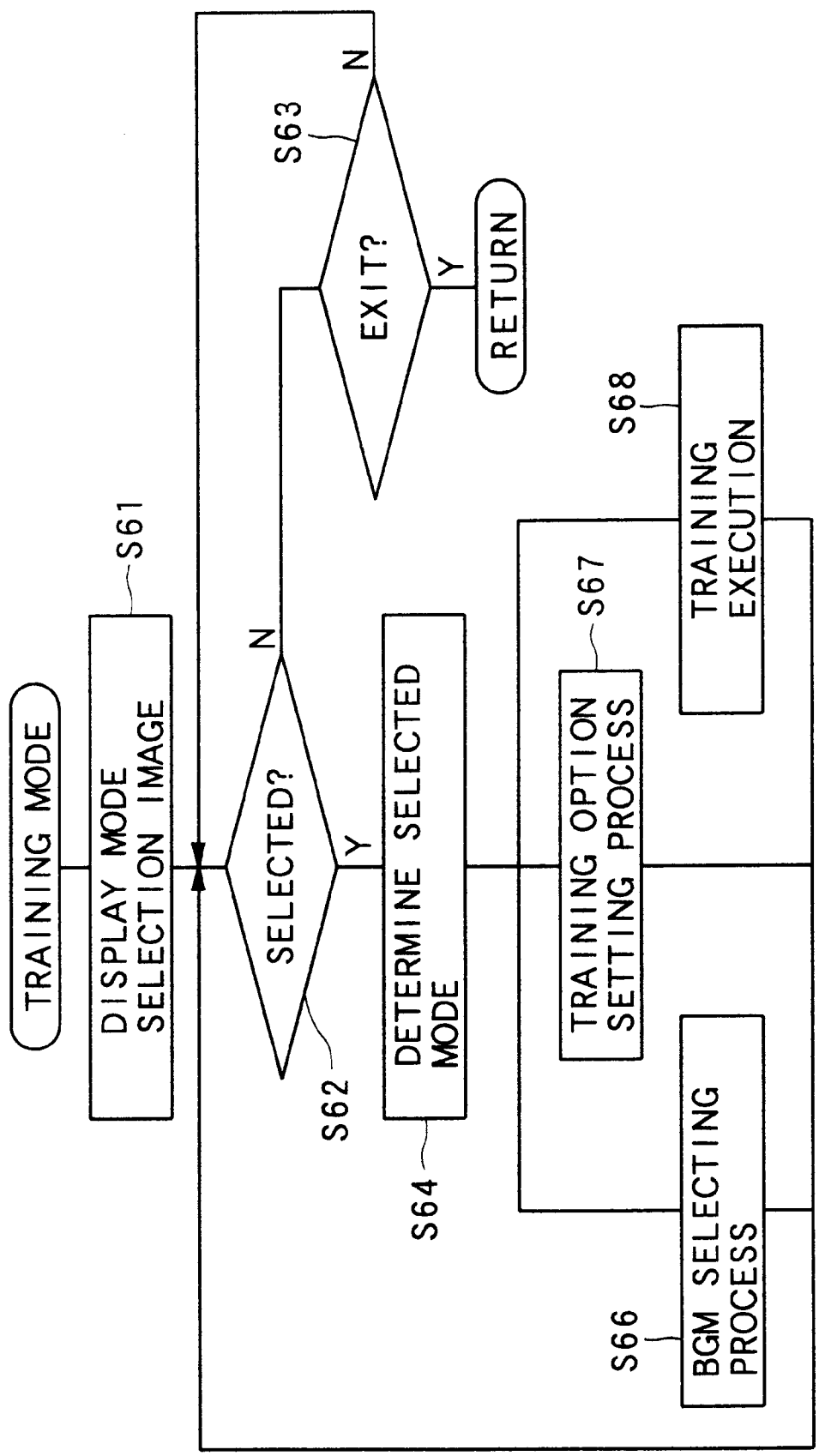
FIG. 15 is a flowchart of the sequence of a training mode process executed by the CPU in FIG. 12 when "TRAINING" is selected in the mode selection image shown in FIG. 14.

In the training mode process, the game is executed according to a process shown in FIG. 15. The CPU 10 displays a mode selection image containing displayed alternative items representing modes to choose from in the training mode on the display monitor 3 in step S61. Then, the CPU 10 decides whether the game player has operated the manual controller 24 to select one of the modes or not in step S62. If the game player has not operated the manual controller 24 to select one of the modes, then the CPU 10 decides whether the game player has operated the manual controller 24 to return to the mode selection image 200 shown in FIG. 14 or not in step S63. If the game player has operated the manual controller 24 to return to the mode selection image 200, then the CPU 10 finishes the training mode process, and control goes back to the game playing process shown in FIG. 13. If the game player has not operated the manual controller 24 to return to the mode selection image 200, then the CPU 10 repeats the processing of step S62. If the game player has operated the manual controller 24 to select one of the modes, then the CPU 10 determines the selected mode in step S64, and thereafter executes a process depending on the selected mode. The process executed depending on the selected mode is a BGM selecting process in step S66, a training option setting process in step S67, or a training execution in step S68.

The BGM selecting process in step S66 is a process for selecting BGM to be practiced in the training mode based on instructions from the game player. The training option setting process is a process for selecting details of a training process based on instructions from the game player. Selections made in the BGM selecting process and the training option setting process are recorded as training conditions in a given area of the RAM 15.

Figure 16:
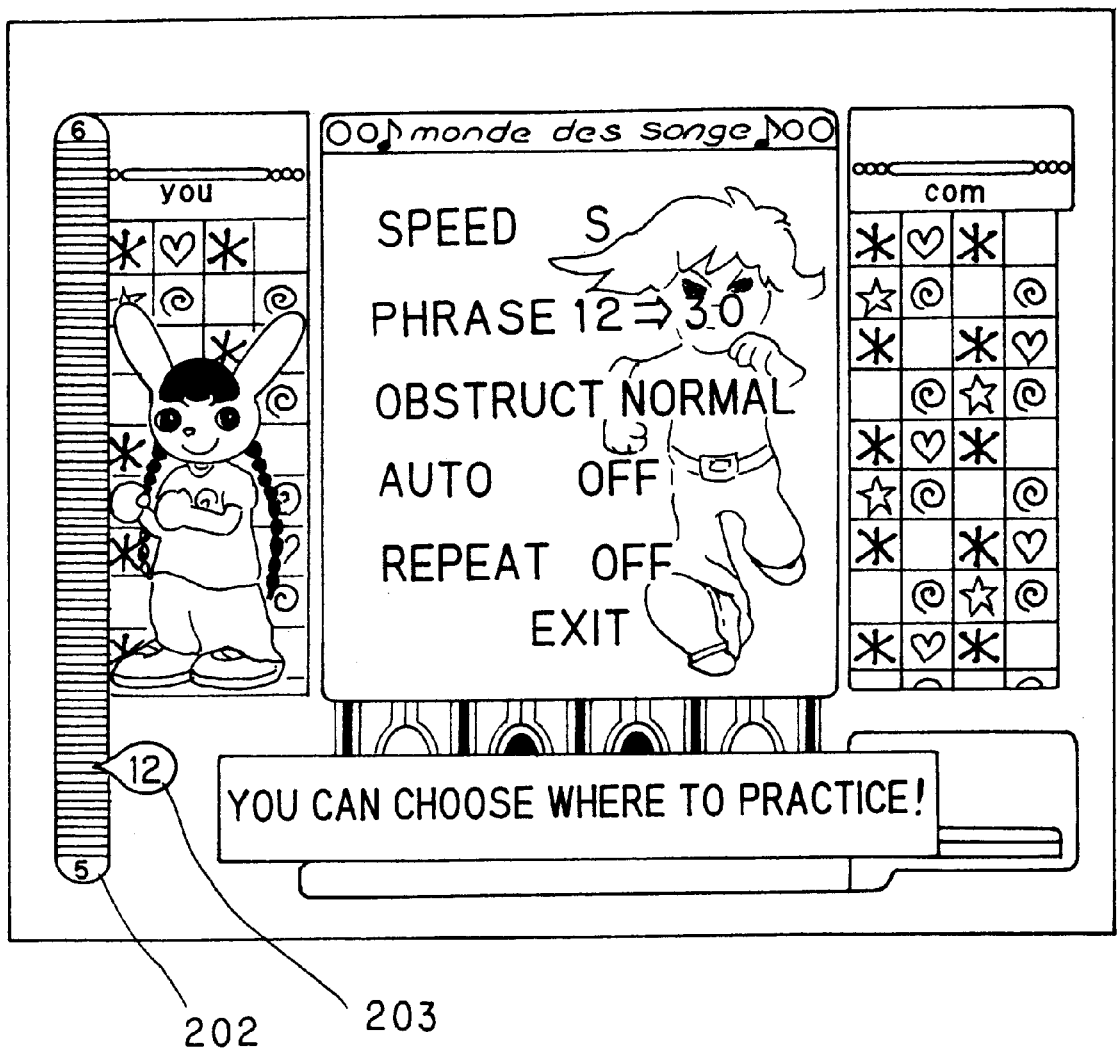
FIG. 16 is a view of an image displayed in a training option setting process in the training mode process shown in FIG. 15.

FIG. 16 shows an image 201 displayed on the display monitor 3 when the training option setting process is executed. The image 201 includes five displayed alternative items "SPEED", "PHRASE", "OBSTRUCT", "AUTO", and "REPEAT". When the game player operates the manual controller 24 to select one of the items, the selected item is highlighted. When the game player effects a certain action on the manual controller 24, settings relative to the selected item can be changed.

The item "SPEED" serves to select a speed at which to play back BGM. If the game player selects "SPEED", then the game player can select a playback speed lower or higher than a standard speed which is the speed of BGM played back in the game mode in step S54 shown in FIG. 13. If the game player selects "AUTO", then the game player can select the turning on or off of an automatic performance mode for the CPU 10 to carry out the exemplary performance of BGM. If the game player selects "REPEAT", then the game player can select the turning on or off of repetitive practicing.

If the game player selects "PHRASE", then the game player can select a BGM practicing range in terms of BGM phases. When "PHRASE" is selected, a music gage 202 is displayed at the left-hand end of the image 201 shown in FIG. 16. The music gage 202 is divided into a vertical array of as many bars as the number of phases of BGM. The lowermost bar corresponds to the first phrase of BGM, and the uppermost bar corresponds to the final phrase of BGM. In the illustrated embodiment, the presently selected BGM practicing range from phase number "12" to phrase number "30" is highlighted. A balloon 203 indicating a phrase number ("12" in FIG. 16) is also displayed in combination with the music gage 202.

Figure 17:
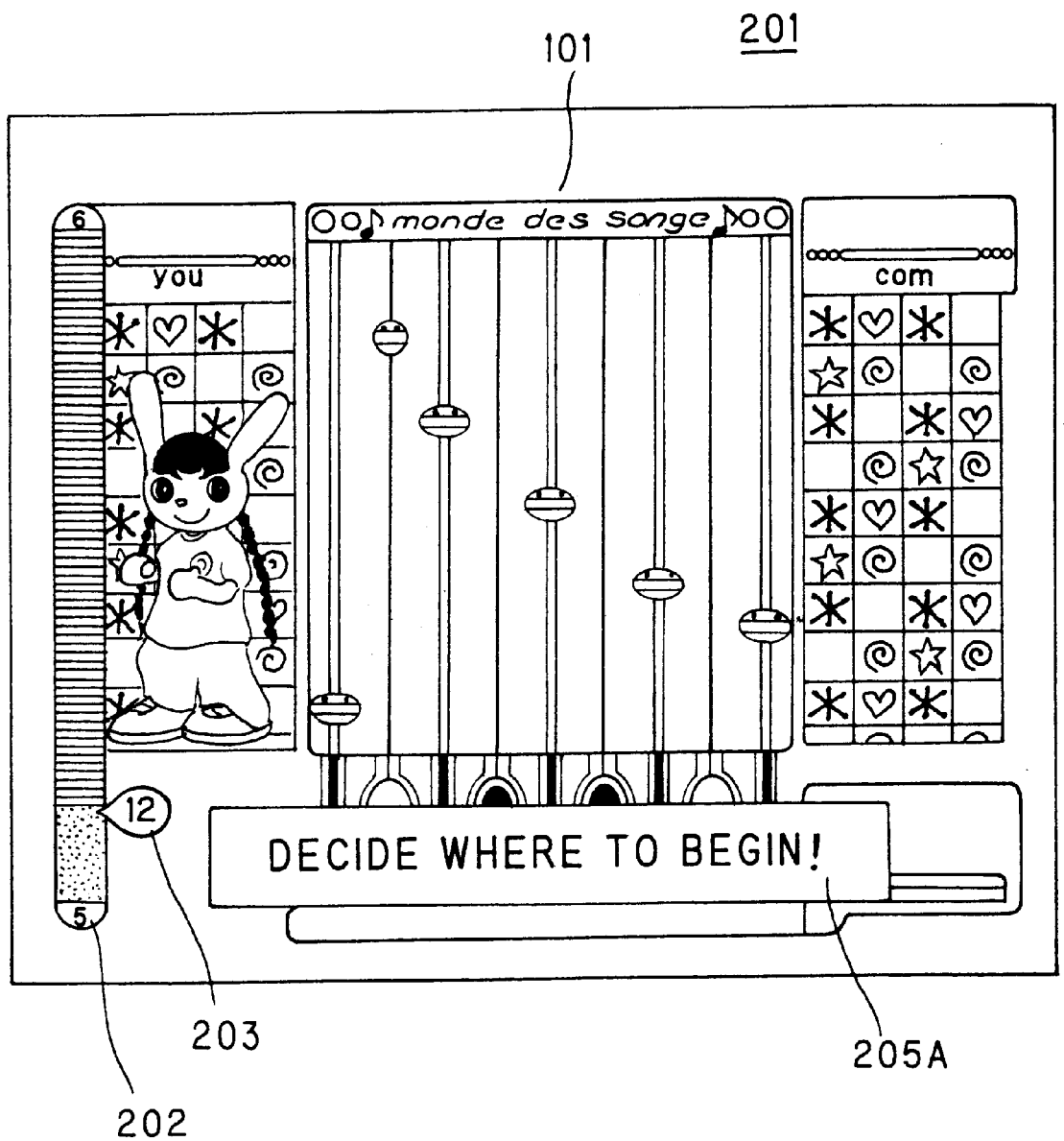
FIG. 17 is a view of an image displayed when "PHRASE" is selected in the image shown in FIG. 16 and a start-of-practice position is established.

When the game player selects "PHRASE" in the image 201 shown in FIG. 16 and then effects a certain action on the manual controller 24, the CPU 10 displays an indicator 101 in the image 201 as shown in FIG. 17. The CPU 10 also displays a message 205A to prompt the game player to determine a start-of-practice position. When the game player effects a certain scrolling action on the manual controller 24, the CPU 10 moves a start-of-practice position displayed in the music gage 202 upwardly or downwardly depending on the direction of the scrolling action. The balloon 203 also ascends or descends with the start-of-practice position, while displaying the phrase number of the start-of-practice position therein. The CPU 10 displays timing marks 103 corresponding to control member operation timing within a certain range from the start-of-practice position. When the game player effects a certain action on the manual controller 24, the phrase number displayed in the balloon 24 at the time is established as the start-of-practice position and stored in the RAM 15.

Figure 18:
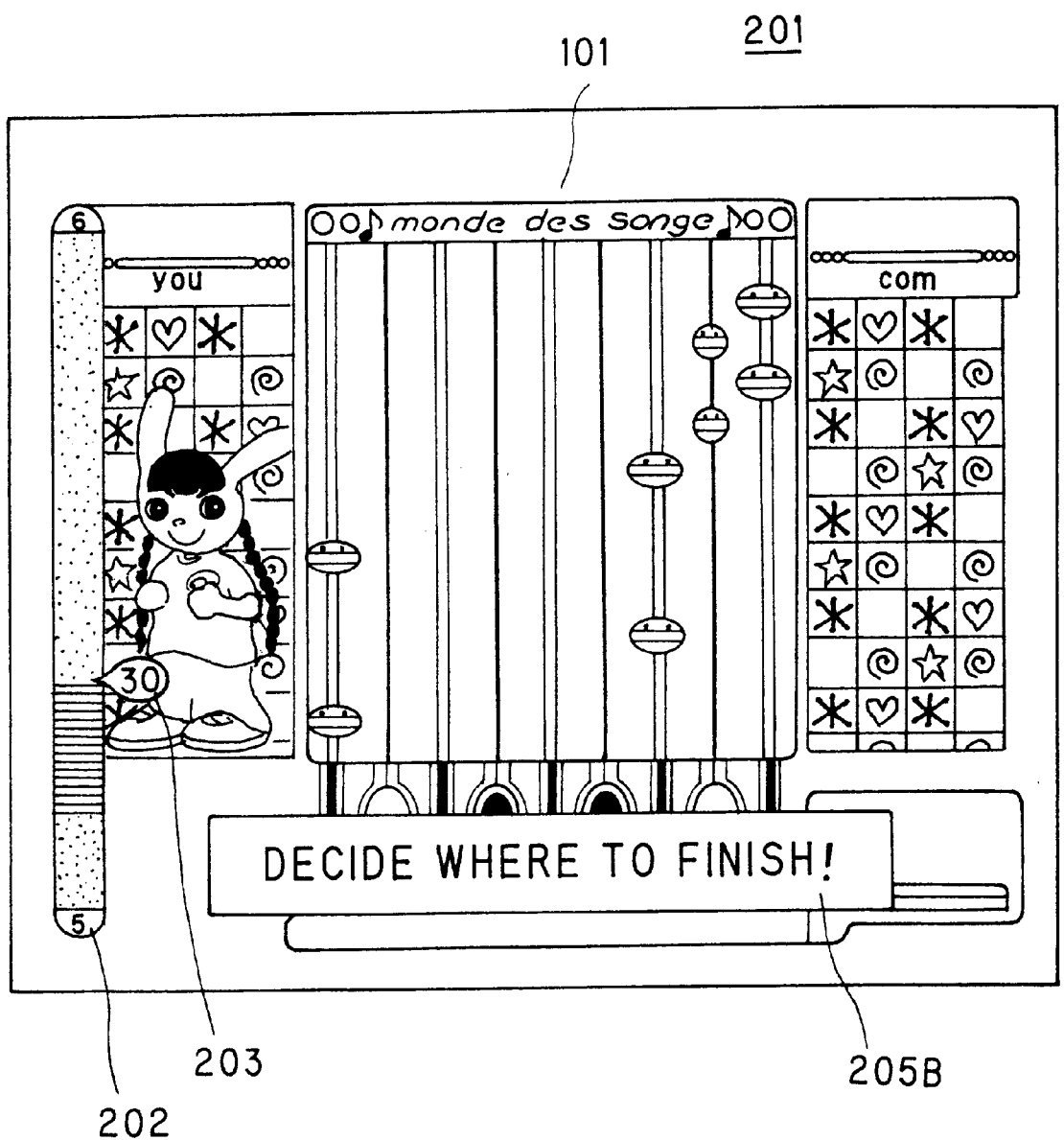
FIG. 18 is a view of an image displayed when "PHRASE" is selected in the image shown in FIG. 16 and an end-of-practice position is established.

When the start-of-practice position is then established, the CPU 10 displays a message 205B to prompt the game player to determine an end-of-practice position as shown in FIG. 18. When the game player effects a certain scrolling action on the manual controller 24, the CPU 10 moves an end-of-practice position displayed in the music gage 202 upwardly or downwardly depending on the direction of the scrolling action. The balloon 203 also ascends or descends with the end-of-practice position, while displaying the phrase number of the end-of-practice position therein. The CPU 10 displays timing marks 103 corresponding to control member operation timing within a certain range from the end-of-practice position. When the game player effects a certain action on the manual controller 24, the phrase number displayed in the balloon 24 at the time is established as the end-of-practice position and stored in the RAM 15. After the end-of-practice position is thus established, the image 201 shown in FIG. 18 changes to the image 201 shown in FIG. 16. In the above process of establishing a practice range, the CPU 10 functions as a practice range setting means.

Figure 19:
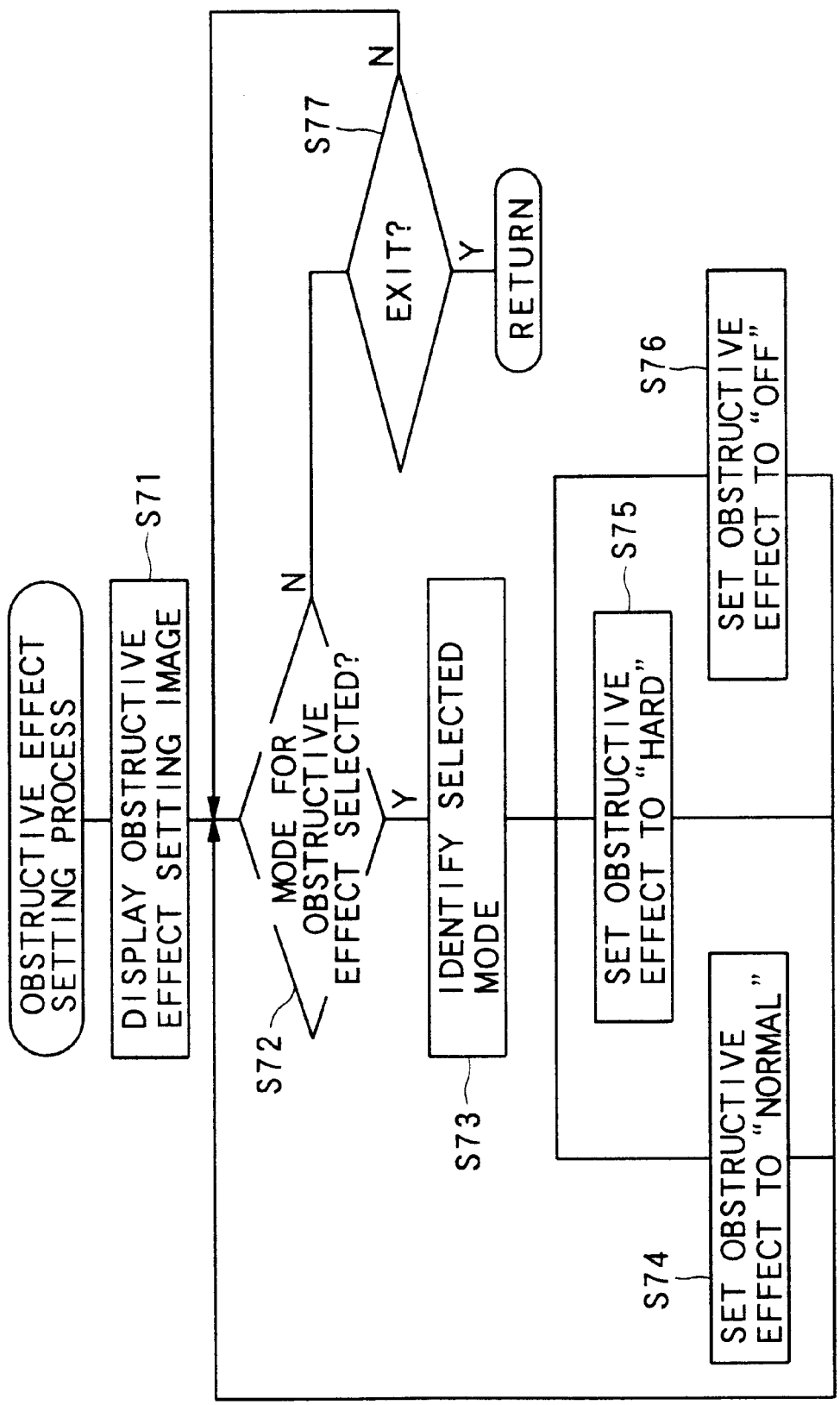
FIG. 19 is a flowchart of the sequence of an obstructive effect setting process executed by the CPU when "OBSTRUCT" is selected in the image shown in FIG. 16.

When the game player selects "OBSTRUCT" in the image 201 shown in FIG. 16 and then effects a certain action on the manual controller 24, the CPU 10 starts an obstructive effect setting process shown in FIG. 19. The obstructive effect setting process is a process for selecting one of three modes "NORMAL", "HARD", and "OFF" for the obstructive effect (see FIG. 4, for example) in the training mode. When the CPU 10 carries out the obstructive effect setting process, the CPU 10 functions as an obstructive effect setting means. If the game player selects the mode "OFF", then no obstructive effect appears in the indicator 101. If the game player selects the mode "NORMAL", then an obstructive effect hiding a portion of the indicator 101 is displayed as shown in FIG. 4. If the game player selects the mode "HARD", then an obstructive effect having a higher level of difficulty than the obstructive effect in the normal mode appears in the indicator 101. For example, one of the obstructive effects shown in FIGS. 11(a), 11(b), and 11(e), which involve timing mark shifts across tracks, is displayed when the game player selects the mode "HARD".

When the CPU 10 starts carrying out the obstructive effect setting process shown in FIG. 19, the CPU 10 displays an obstructive effect setting image in step S71, and then decides whether the game player has operated the manual controller 24 to select a mode for the obstructive effect or not in step S72. If the game player has selected a mode for the obstructive effect, then the CPU 10 identifies the selected mode in step S73, and sets the obstructive effect to the selected mode "NORMAL", "HARD", or "OFF" in step S74, S75, or S76. Thereafter, control returns to step S71. If the game player has not selected a mode for the obstructive effect in step S72, then the CPU 10 decides whether the game player has operated the manual controller 24 to exit the obstructive effect setting process in step S77. If the game player has not operated the manual controller 24 to exit the obstructive effect setting process, then control returns to step S72. If the game player has operated the manual controller 24 to exit the obstructive effect setting process, then the obstructive effect setting process comes to an end.

Figure 20:
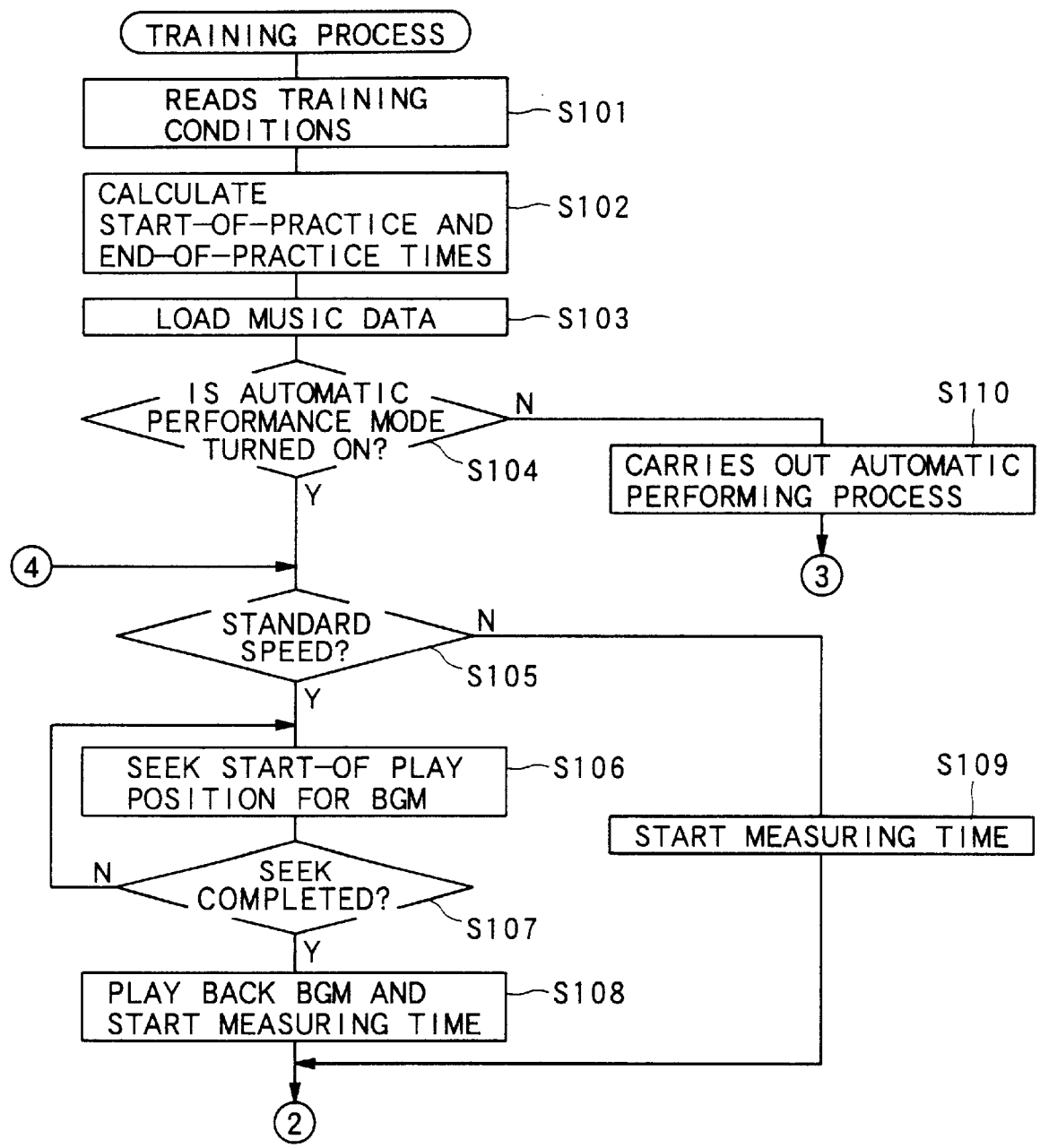
FIGS. 20 and 21 are a flowchart of the sequence of a training process executed by the CPU when training execution is selected in the training mode process shown in FIG. 15.
Figure 21:
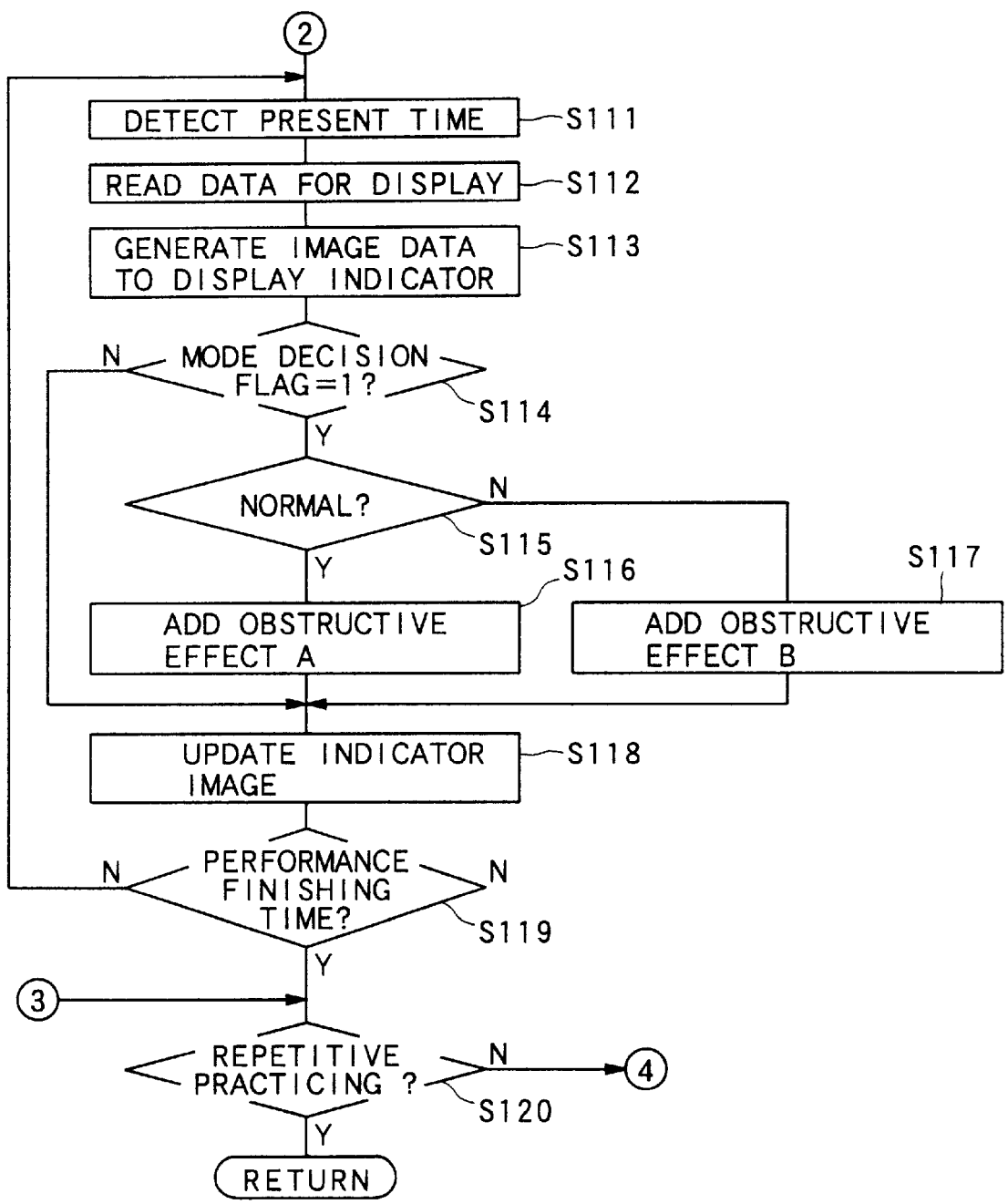

If control goes to the training execution in step S68 in the training mode process shown in FIG. 15, then the CPU 10 executes a training process shown in FIGS. 20 and 21. The training process shown in FIGS. 20 and 21 will be described below. As shown in FIG. 20, the CPU 10 reads data of training conditions from the RAM 15 in step S101. Then, the CPU 10 calculates times corresponding to phrase numbers established as the start-of-practice position and the end-of-practice position as measured from the performance starting time of BGM in step S102. Thereafter, the CPU 10 loads data corresponding to the presently selected music piece (BGM) from the CD-ROM 20 into the RAM 15 in step S103. The CPU 10 refers to the training conditions stored in the RAM 15 to decide whether the automatic performance mode is turned on or not in step S104.

If the automatic performance mode is turned off, then control proceeds to step S105 in which the CPU 10 decides whether the BGM playback speed is set to the standard speed or not. If the BGM playback speed is set to the standard speed, then the CPU 10 instructs the CD-ROM reader 21 to seek a start-of-play position for the BGM in the CD-ROM 20 in step S106. Specifically, the CPU 10 specifies a data storage position corresponding to a start-of-practice time (a time corresponding to the phrase number established as the start-of-practice position) based on the time information included in the BGM data (see FIG. 6(b)). The CPU 10 then instructs the CD-ROM reader 21 to move a disk readout optical pickup to the data storage position.

In step S107, the CPU 10 decides whether a seek completion signal has been outputted from the CD-ROM reader 21. If a seek completion signal has been received from the CD-ROM reader 21, then the CPU 10 instructs the CD-ROM reader 21 to play back the BGM in step S108. At the same time, the CPU 10 starts measuring time that has elapsed in the game. While the CPU 10 may start measuring time from the start of the game which is set to "0", the CPU 10 may also start measuring time from the time corresponding to the phrase number of the start-of-practice position. After the CPU 10 has started measuring time in step S108, the time measurement proceeds at the same rate as actual time. The time to start measuring time should preferably be adjusted in view of a time lag that may occur after the CPU 10 instructs the CD-ROM reader 21 to play back the BGM until the BGM actually starts being played back. After step S108, control goes to step S111 shown in FIG. 21.

If the BGM playback speed is not set to the standard speed in step S105, then the CPU 10 starts measuring time in step S109, after which control goes to step S111. The time measurement in step S109 proceeds at a rate depending on the playback speed established in the item "SPEED" shown in FIG. 16. For example, if the playback speed is set to a speed lower than the standard speed, then the rate of the time measurement is adjusted such that the time measurement proceeds more slowly than actual time as the deviation of the playback speed from the standard speed is greater. If control goes from step S105 to step S109, no BGM is played back. This is because the CPU 10 cannot adjust the playback speed since the BGM data is sent from the CD-ROM reader 21 directly to the sound controller 12 for playback. However, if the RAM 15 has an extra storage area, then the data in the practice range may be read into the extra storage area of the RAM 15, and the CPU 10 may supply the BGM data to the sound controller 12 while adjusting the playback speed, so that the BGM will be played back at the adjusted playback speed.

In step S111 shown in FIG. 21, the CPU 10 detects the time that has elapsed from the start of the time measurement in step S108 or step S109, as a present time. Thereafter, the CPU 10 reads the control button operation timing data corresponding to the detected present time from the CD-ROM 20 in step S112, and generates image data to display the indicator 101 based on the read control button operation timing data in step S113. In step S114, the CPU 10 decides whether the mode decision flag is presently set to "1" or not. If the mode decision flag is set to "1", then the CPU 10 decides whether the mode "NORMAL" has been selected for the obstructive effect or not in step S115. The CPU 10 processes the image data of the indicator 101, which has been generated in step S113, such that an obstructive effect A will be created in step S116 if the mode "NORMAL" has been selected or an obstructive effect B will be created in step S117 if the mode "NORMAL" has not been selected. The obstructive effect A corresponds to the mode "NORMAL", and hides a portion of the indicator 101 (see FIG. 4). The obstructive effect B has a higher difficulty level than the obstructive effect A, and involves timing mark shifts across tracks as shown in FIGS. 11(a), 11(b), and 11(e).

If the mode decision flag is not set to "1" in step S114, then control skips steps S115–S117. Instep S118, the CPU 10 supplies the generated image data of the indicator 101 to the graphic display controller 11 to update the image of the indicator 101. Thereafter, the CPU 10 decides whether an end-of-performance time is reached or not, i.e., whether the performance of the phrase established as the start-of-practice position is finished or not, in step S119. If the end-of-performance time is reached, then control returns to step S111.

If the end-of-performance time is not reached in step S119, then control proceeds to step S120 in which the CPU 10 decides whether the turning on of repetitive practicing (corresponding to "REPEAT" shown in FIG. 16) is selected on or not. If the turning on of repetitive practicing is not selected, then the training process shown in FIGS. 20 and 21 is finished, and control goes back to step S61 shown in FIG. 15. If the turning on of repetitive practicing is selected in step S120, then control returns to step S105 shown in FIG. 20 to repeat the practicing. If the game player effects a given canceling action on the manual controller 24, then the repetitive practicing is canceled, and control goes back to step S61 shown in FIG. 15. If the automatic performance mode is turned on in step S104 shown in FIG. 20, control goes to step S110 in which the CPU 10 carries out an automatic performing process. In the automatic performing process, the CPU 10 reads control button operation timing data with respect to the practice range, regards the manual controller 24 as being operated according to the read control button operation timing data even if the manual controller 24 has not been operated by the game player, and automatically produces sound effects corresponding to control button operation timing in the range from the start-of-practice position to the end-of-practice position. The display of the indicator 101 is controlled in the same manner as in ordinary sessions of the game, and obstructive effects are added according to predetermined conditions. When the automatic performing process is over, control goes to step S120.

Figure 22:
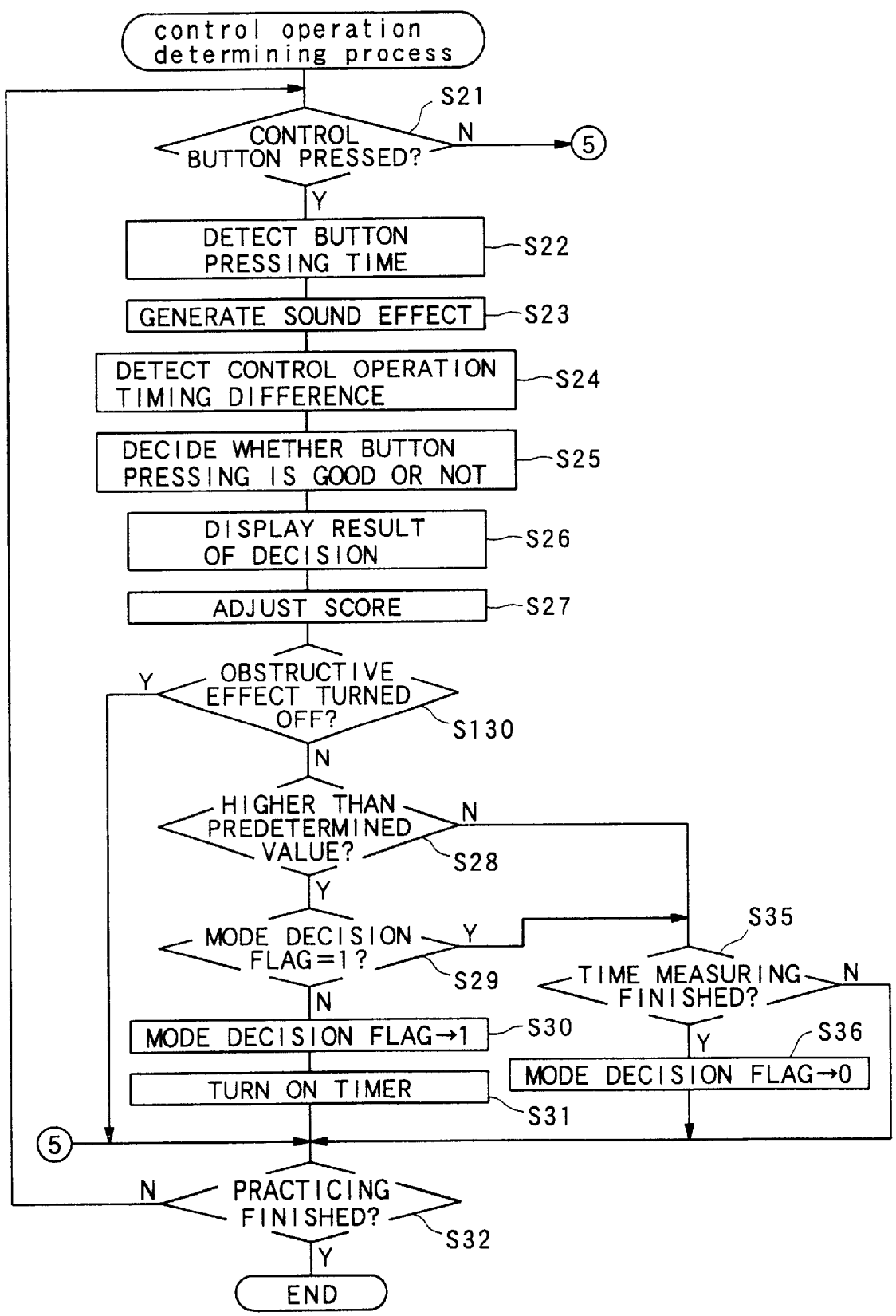
FIG. 22 is a flowchart of the sequence of a control operation determining process which is executed by the CPU concurrent with the training process shown in FIGS. 20 and 21.

FIG. 22 shows the sequence of a control operation determining process which is executed by the CPU 10 concurrent with the training process shown in FIGS. 20 and 21. The control operation determining process shown in FIG. 22 is substantially the same as the control operation determining process shown in FIG. 10. Those steps shown in FIG. 22 which are identical to those shown in FIG. 10 are denoted by identical step numbers. The control operation determining process shown in FIG. 22 differs from the control operation determining process shown in FIG. 10 in that after having adjusted the score in step S27, the CPU 10 refers to the training conditions stored in the RAM 15 to decide whether the mode "OFF" has been selected for the obstructive effect or not in step S130, and if the mode "OFF" has been selected for the obstructive effect, then the CPU 10 sets the mode decision flag to "0", after which control goes to step S32. In step S32, the CPU 10 decides whether the performance has been finished up to the end-of-practice position or not, but not whether the performance of the music piece has been finished or not.

According to the control operation determining process shown in FIG. 22, if the mode "OFF" has been selected for the obstructive effect, then the mode decision flag is set to "0" at all times. Therefore, no obstructive effect is produced while the game player is practicing a desired music piece. If the "NORMAL" or "HARD" mode has been selected for the obstructive mode, then when the score reaches a predetermined level or higher, the mode decision flag is set to "1", and an obstructive effect appears in the indicator 101 according to the processing in steps S114–S117 shown in FIG. 21. Consequently, the game player can decide whether an obstructive effect is to be added or not in the training mode, according to their preference.

In the second embodiment described above, the CPU 10 and the software or game program are combined to realize a control operation indicating means, an obstructing means, a mode selecting means, an obstructive effect setting means, a control operation indication control means, an obstructive effect control means, a decision means, an evaluating means, a control operation procedure presenting means, and a display control means. Specifically, the CPU 10 operates as a control operation indicating means and a control operation procedure presenting means when it executes step S118 shown in FIG. 21. The CPU 10 operates as an obstructing means when it executes steps S116, S117, and as a mode selecting means when it executes step S53 shown in FIG. 13. The CPU 10 operates as an obstructive effect setting means when it executes the obstructive effect setting process shown in FIG. 19. The CPU 10 operates as a control operation indication control means and a display control means when it repeatedly executes steps S111–S113 and step S119 shown in FIG. 21. The CPU 10 operates as an obstructive effect control means when it executes steps S130, steps S29–S31 S35, S36 shown in FIG. 22 and steps S114–S117 shown in FIG. 21. The CPU 10 operates as a decision means and an evaluating means when it executes steps S24, S25, S26, S27, S28 shown in FIG. 22. However, some or all of the above means may be implemented by a logic circuit comprising a combination of ICs and LSI circuits. The control members are not limited to the control buttons 7, but may comprise control levers or rotatable members.

3rd Embodiment

A game system according to a third embodiment of the present invention will be described below with reference to FIGS. 23 through 31. According to the third embodiment, the game system is constructed as an arcade video game machine. In the game system according to the third embodiment, other obstructive effects in place of those in the game system according to the first embodiment occur as events. The game system according to the third embodiment will be described below mainly with respect to details which are different from those of the game system according to the first embodiment. Those parts of the game system according to the third embodiment which are identical to those of the game system according to the first embodiment are denoted by identical reference characters, and will not be described in detail below.

The game system according to the third embodiment has an appearance and a control system which are identical to those of the game system according to the first embodiment shown in FIGS. 1 and 2.

Figure 23:
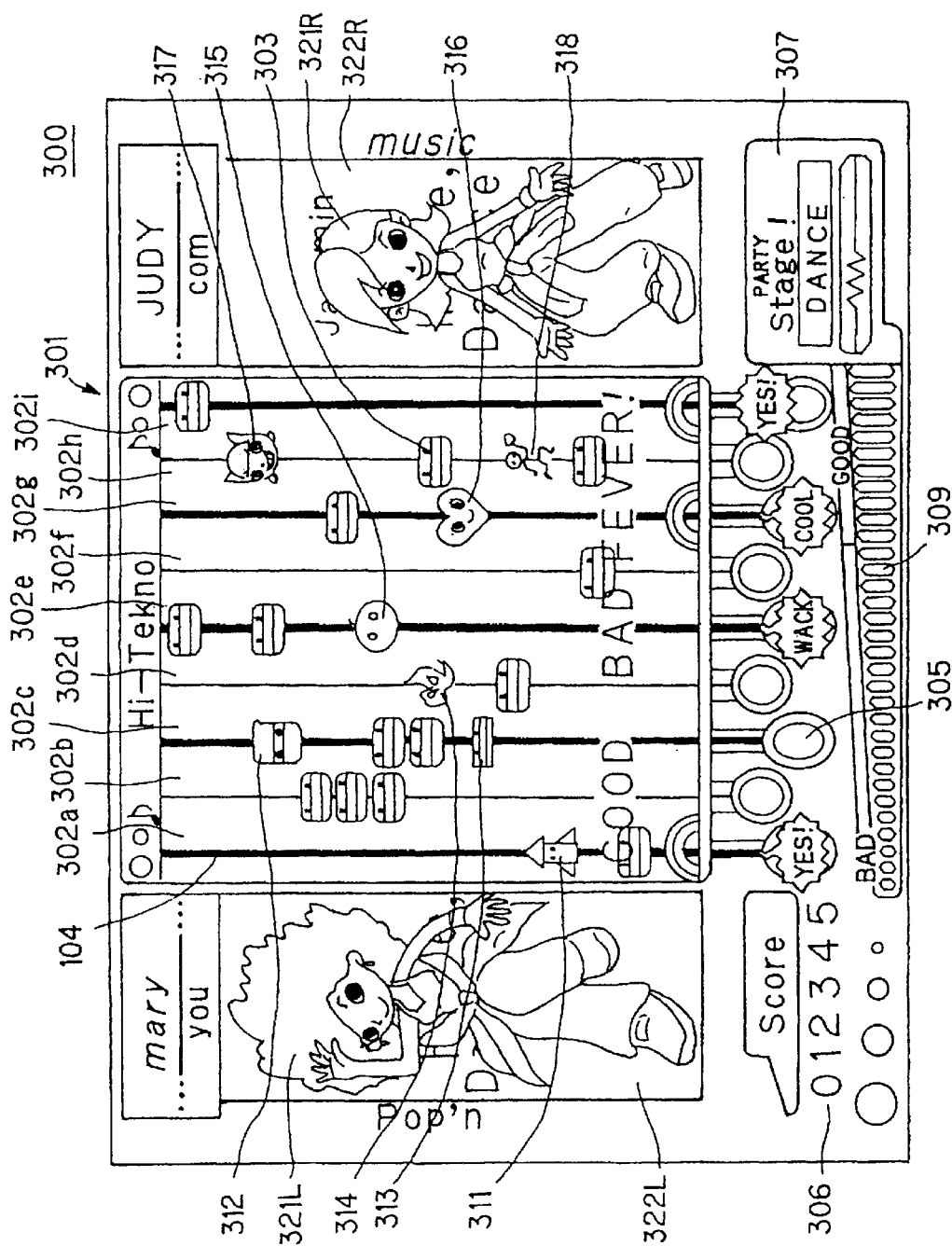
FIG. 23 is a view of a basic game image displayed according to a third embodiment of the present invention.

FIG. 23 shows a basic game image 300 displayed on the display monitor 3 while the game is being executed by a game program stored in the hard disk memory 17. The game image 300 contains, substantially in its central area, an indicator 301 for indicating the timing to operate the control buttons 7 to the game player. The indicator 301 is divided into as many (nine) vertical tracks 302a–302i as the number of the control buttons 7, with timing marks 303 and event timing marks 311–318 displayed on the tracks 302a–302i. The timing marks 303 correspond to the timing marks 103 according to the first embodiment. Different events are assigned beforehand respectively to the event timing marks 311–318, and different characters are assigned respectively to the event timing marks 311–318. During the game, the association between the types of the events and the characters remains unchanged. As described later on, when the game player hits either one of the event timing marks 311–318, one of the events associated with the event timing marks 311–318 occurs under the control of the CPU 10.

Figure 24:
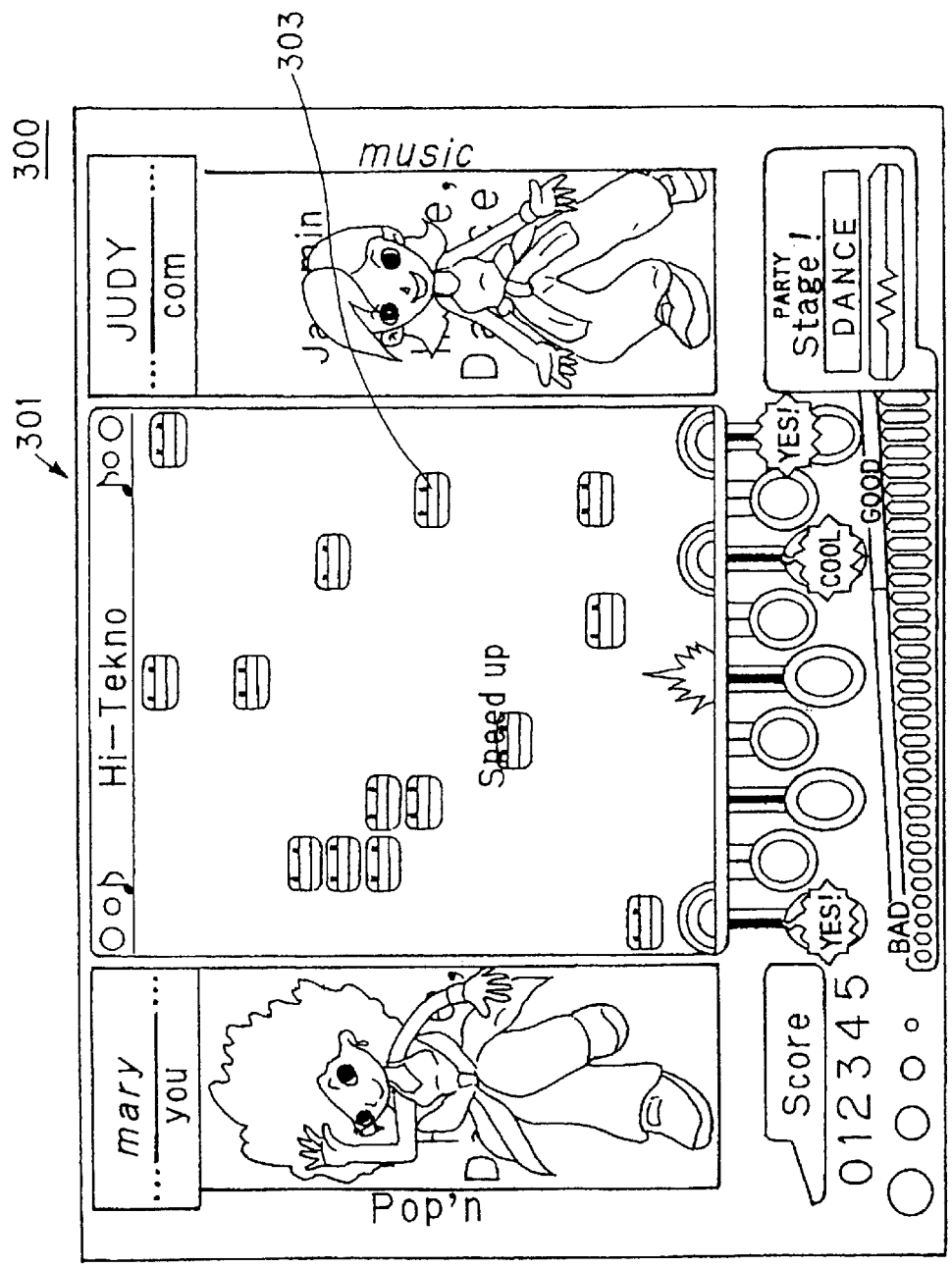
FIG. 24 is a view of a game image displayed when an event A occurs.

Although vertical lines 304 are displayed in the tracks 302a–302i, these vertical lines 304 may be omitted (see FIG. 24).

While the game is being played, the tracks 302a–302i in its lateral sequence are associated with the respective control buttons 7 in one-to-one correspondence in the same manner as with the first embodiment. To clearly indicate the association between the control buttons 7 and the tracks 302a–302i, the control buttons 7 are colored in respective different hues and the tracks 302a–302i include respective portions which are colored in the same hues as the corresponding control buttons 7.

When the game begins, the timing marks 303 and the event timing marks 311–318 gradually descend under the control of the CPU 10. When the timing marks 303 reach the lower ends of the tracks 302a–302i, the timing to operate the control buttons 7 corresponding to the tracks 302a–302i arrives. If the game player presses one of the control buttons 7 in view of the control button operation timing, the CPU 10 decides whether the pressing of the control button 7 is good or not based on the time difference between the control button operation timing indicated by the corresponding timing mark 303 and the timing at which the control button 7 is actually pressed, and displays an expression "COOL", "YES!", or "WACK" based on the result of the decision on a corresponding one of decision display areas 305 that are disposed beneath the lower ends of the tracks 302a–302i. The game image 300 includes a score display area 306 for displaying a score (12345 points FIG. 23), calculated on the basis of the result of the decision, of the game in a lower left corner thereof.

When the descending event timing marks 311–318 reach the lower ends of the tracks 302a–302i, the timing to operate the control buttons 7 corresponding to the tracks 302a–302i arrives. If the game player presses one of the control buttons 7 in view of the control button operation timing, the CPU 10 decides whether either one of the event timing marks 311–318 is hit or not.

For example, the CPU 10 calculates a time difference between the control button operation timing indicated by the corresponding one of the event timing marks 311–318 and the timing at which the control button 7 is actually pressed. If the time difference is smaller than a predetermined value, then the CPU 10 determines that the corresponding event timing mark is hit. If the time difference is greater than the predetermined value, then the CPU 10 determines that the corresponding event timing mark is not hit. In the third embodiment, the score does not change on the basis of whether the event timing marks 311–318 are hit or not. However, the score may change on the basis of whether the event timing marks 311–318 are hit or not.

If one of the event timing marks 311–318 is hit, then the CPU 10 generates an event corresponding to the hit one of the event timing marks 311–318. Details of the events will be described later on.

The game image 300 also includes a title display area 307 for displaying stage contents and a BGM title in a lower right corner thereof. The game image 300 further includes a pair of character display areas 322L, 322R for displaying respective animated game characters 321L, 321R one on each side of the indicator 301. The displayed animated game characters 321L, 321R change depending on the BGM, and details of the animation change depending on the result of the decision produced at each control button operation timing with respect to the timing marks 303. The game image 300 also includes a score gage 309 disposed below the decision display areas 305. The score gage 309 displays a highlighted bar that extends or contracts horizontally depending on the score while the game is being played, the highlighted bar having a left-hand end fixed to the left-hand end of the score gage 309. If the highlighted bar displayed in the score gage 309 extends to the left from a predetermined position when the game is over, the game is cleared.

Examples of the events associated with the event timing marks 311–318 will be described below. Each of the events is executed when necessary image data is generated on the basis of a command from the CPU 10 and the game image 300 is updated by the generated image data. The speed of the BGM and the control button operation timing for the control buttons 7 with respect to the timing marks 303 are not affected by the occurrence of the events. The events may be of such a nature as to increase the difficulty level of the game by way of obstructive effects as with the first embodiment, to obstruct an increase in the score, or to give the game player an advantage, e.g., by leading to an increase in the score (see an event E described later on). Events A through G will be described below as examples of the events.

<Event A>

FIG. 24 shows a game image 300 displayed when an event A occurs. When the event A occurs, the speed of the timing marks 303 increases, e.g., is doubled. If one of the event timing marks 311–318 which is associated with the event A is hit, then until the timing marks 303 in the region which is displayed in the indicator 301 the instant the event timing mark is hit fully disappear from the lower end of the indicator 301, the timing marks 303 continue to move at an ordinary speed prior to the occurrence of the event A. From the instant the timing marks 303 in the region fully disappear from the lower end of the indicator 301, the speed of the timing marks 303 increases, e.g., is doubled. Specifically, if as much image as two measures of music is displayed between the upper and lower ends of the indicator 301 when the timing marks 303 move at an ordinary speed, then until the period of time corresponding to the two measures of music elapses from the instant one of the event timing marks 311–318 which is associated with the event A is hit, the timing marks 303 keep moving at the ordinary speed. The speed of the timing marks 303 increases upon elapse of the period of time corresponding to the two measures of music. After the speed of the timing marks 303 has increased, as much image as one measure of music is displayed between the upper and lower ends of the indicator 301.

The event A ceases after elapse of a predetermined period of time from the time when the speed of the timing marks 303 has increased, after which the game image 300 shown in FIG. 23 is displayed.

Immediately after one of the event timing marks 311–318 which is associated with the event A is hit, all the event timing marks 311–318 disappear as shown in FIG. 24, and will not appear until the event A ceases. While the event timing marks 311–318 disappear, they cannot be hit. When either one of the other events B–G is hit, all the event timing marks 311–318 also disappear and cannot be hit until that event ceases.

<Event B>

Figure 25:
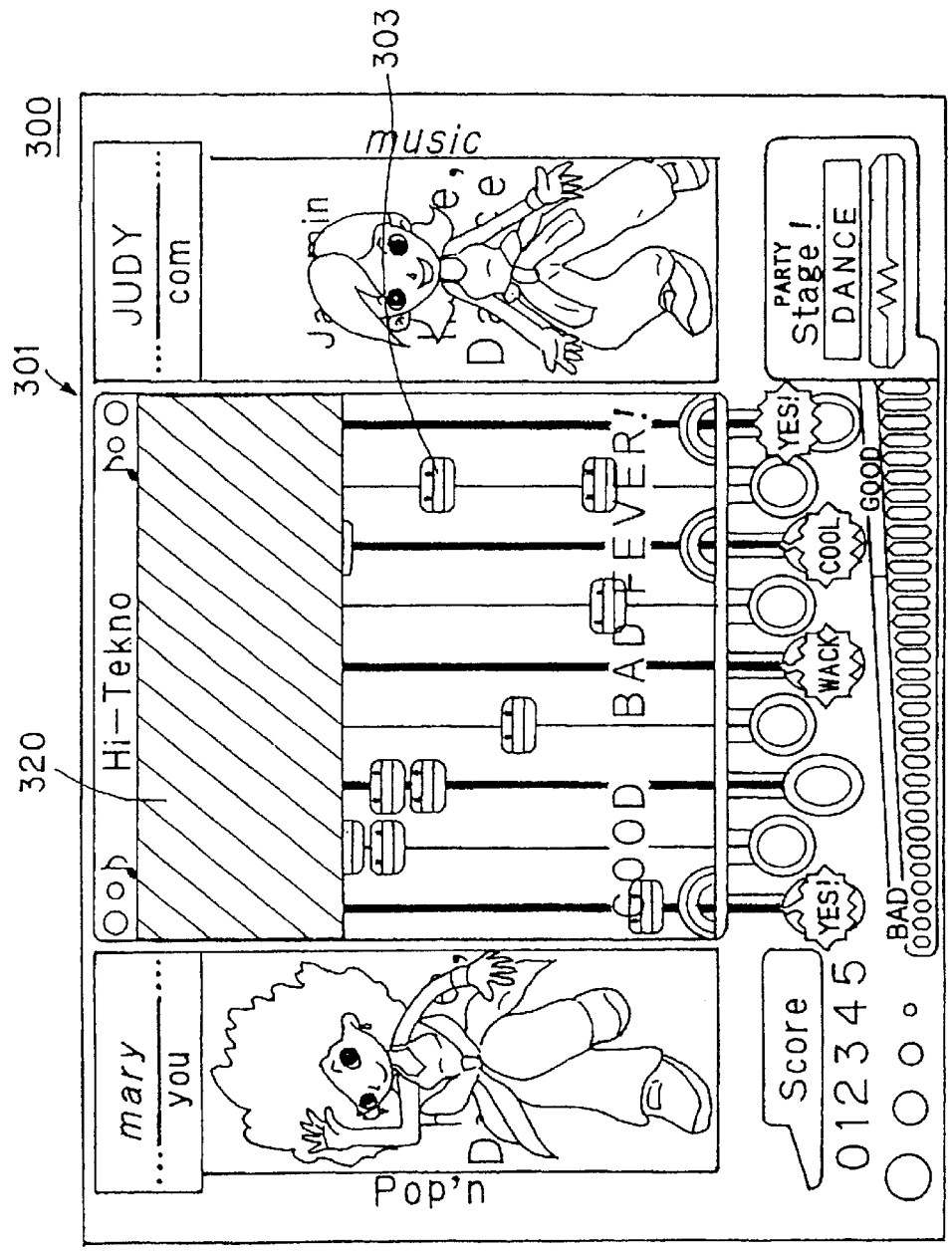
FIG. 25 is a view of a game image displayed when an event B occurs.

FIG. 25 shows a game image 300 displayed when an event B occurs. When the event B occurs, an upper area of the indicator 301, which is about one-third of the entire area of the indicator 301, is masked by a masking region 320 for a predetermined period of time. Therefore, since the period of time after the timing marks 303 appear in the indicator 301 until their control button operation timing arrives is reduced, the game player finds it difficult to grasp the control button operation timing, resulting in an increase in the difficulty level of the game.

<Event C>

Figure 26:
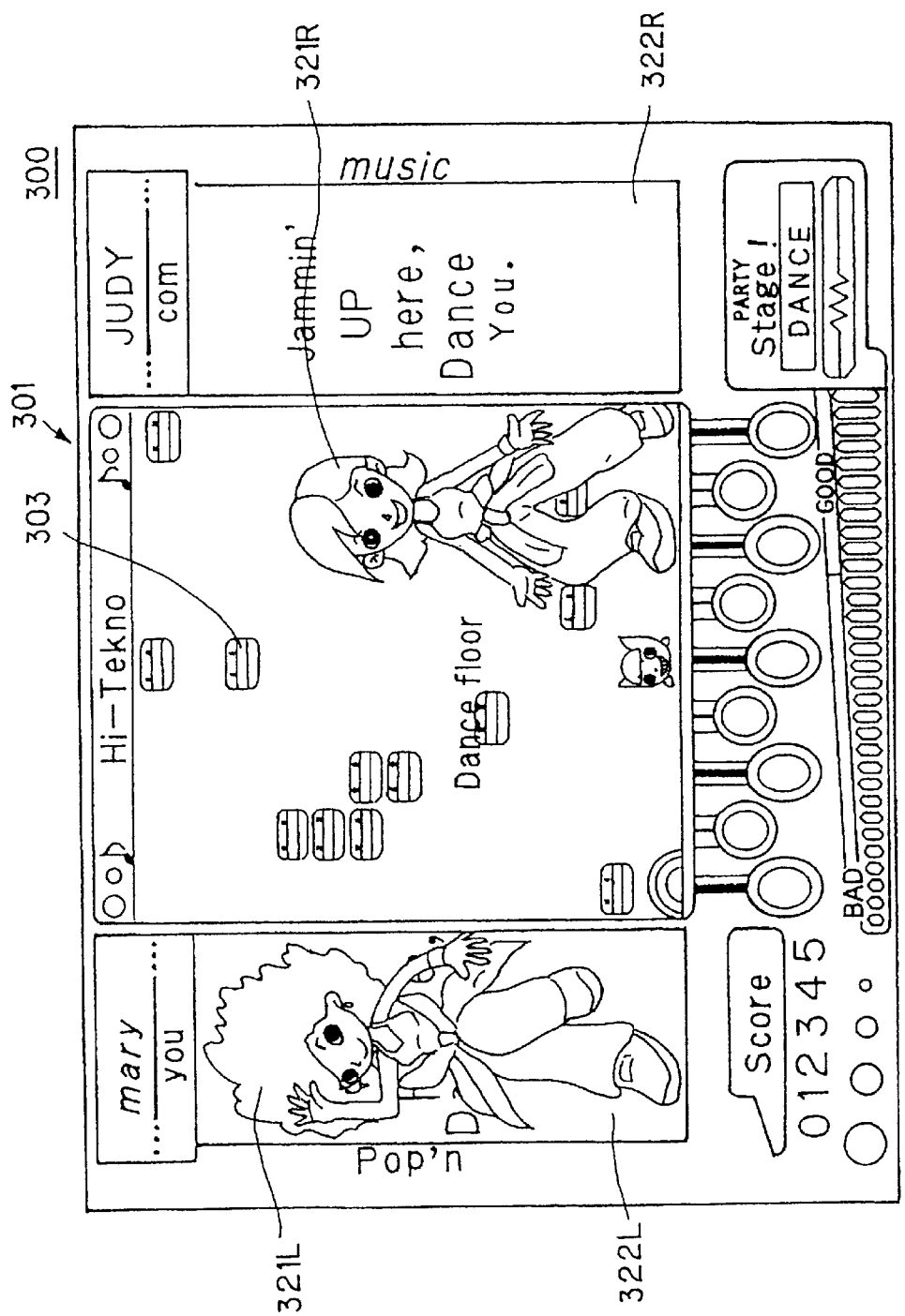
FIG. 26 is a view of a game image displayed when an event C occurs.

FIG. 26 shows a game image 300 displayed when an event C occurs. When the event C occurs, the game characters 321L, 321R displayed respectively in the character display areas 322L, 322R appear in the indicator 301. For example, if one of the event timing marks 311–318 which is associated with the event C is hit, then the game characters 321L, 321R face out of the character display areas 322L, 322R and into respective positions in the indicator 301 where the game characters 321L, 321R will remain displayed as if dancing.

In FIG. 26, the game character 321R displayed in the character display area 322R in the right-hand side of the game image 300 is shown as having moved to a right-hand position in the indicator 301. The position where the game characters 321L, 321R appear in the indicator 301 varies depending on which one of the control buttons 7 is used to hit one of the event timing marks 311–318 which is associated with the event C. More specifically, if the control button 7 used to hit one of the event timing marks 311–318 which is associated with the event C is in a left-hand position as viewed from the game player facing the housing 2, then the game characters 321L, 321R appear in a right-hand position in the indicator 301. If the control button 7 used to hit one of the event timing marks 311–318 which is associated with the event C is in a right-hand position as viewed from the game player facing the housing 2, then the game characters 321L, 321R appear in a left-hand position in the indicator 301. If the control button 7 used to hit one of the event timing marks 311–318 which is associated with the event C is in a central position as viewed from the game player facing the housing 2, then the game characters 321L, 321R appear in a central position in the indicator 301. Since the game characters 321L, 321R that appear in the indicator 301 hide some of the timing marks 303, the game player finds it difficult to grasp control button operation timing for the control buttons 7 corresponding to those of the tracks 302a–302i which underlie the game characters 321L, 321R.

If a plurality of game players, e.g., two game players, compete for a higher score on the video game machine, then the control buttons 7 are divided into left and right groups assigned to the respective game players, and when one of the game players uses the assigned control buttons 7 to produce the event C, the game playing of the other game player can be obstructed. Accordingly, the game played by those game players can be more exciting.

<Event D>

When an event D occurs, the game image 300 is instantaneously masked in its entirety by a white mask as if an explosion occurred therein. Subsequently, the timing marks 303 fade in, recovering the game image 300 shown in FIG. 23.

<Event E>

When an event E occurs, the indicator 301 remains displayed, and a gage quantity in the score gage 308 is slightly increased, i.e., the highlighted bar in the score gage 308 is slightly extended. Alternatively, a gage quantity in the score gage 308 may be slightly reduced, i.e., the highlighted bar in the score gage 308 may be slightly contracted.

<Event F>

When an event F occurs, the game image 300 is instantaneously masked in its entirety by a white mask as if an explosion occurred therein. Subsequently, the timing marks 303 fade in. At this time, in an upper region of the indicator 301, e.g., about an upper half region of the indicator 301, the timing marks 303 are laterally switched around. Specifically, the timing marks 303 in the upper half region of the indicator 301 are switched around between the tracks 302a, 302i, between the tracks 302b, 302h, between the tracks 302c, 302g, and between the tracks 302d, 302f, and the timing marks 303 in the lower half region of the indicator 301 are displayed in their normal positions. Consequently, the instant the timing marks 303 move from the upper half region of the indicator 301 into the lower half region thereof, they appear as if jumping to the normal tracks 302a–302i. When the event F occurs, therefore, the period of time in which the timing marks 303 move down the normal tracks 302a–302i is shortened, making it for the game player to grasp control button operation timing.

<Event G>

Figure 27:
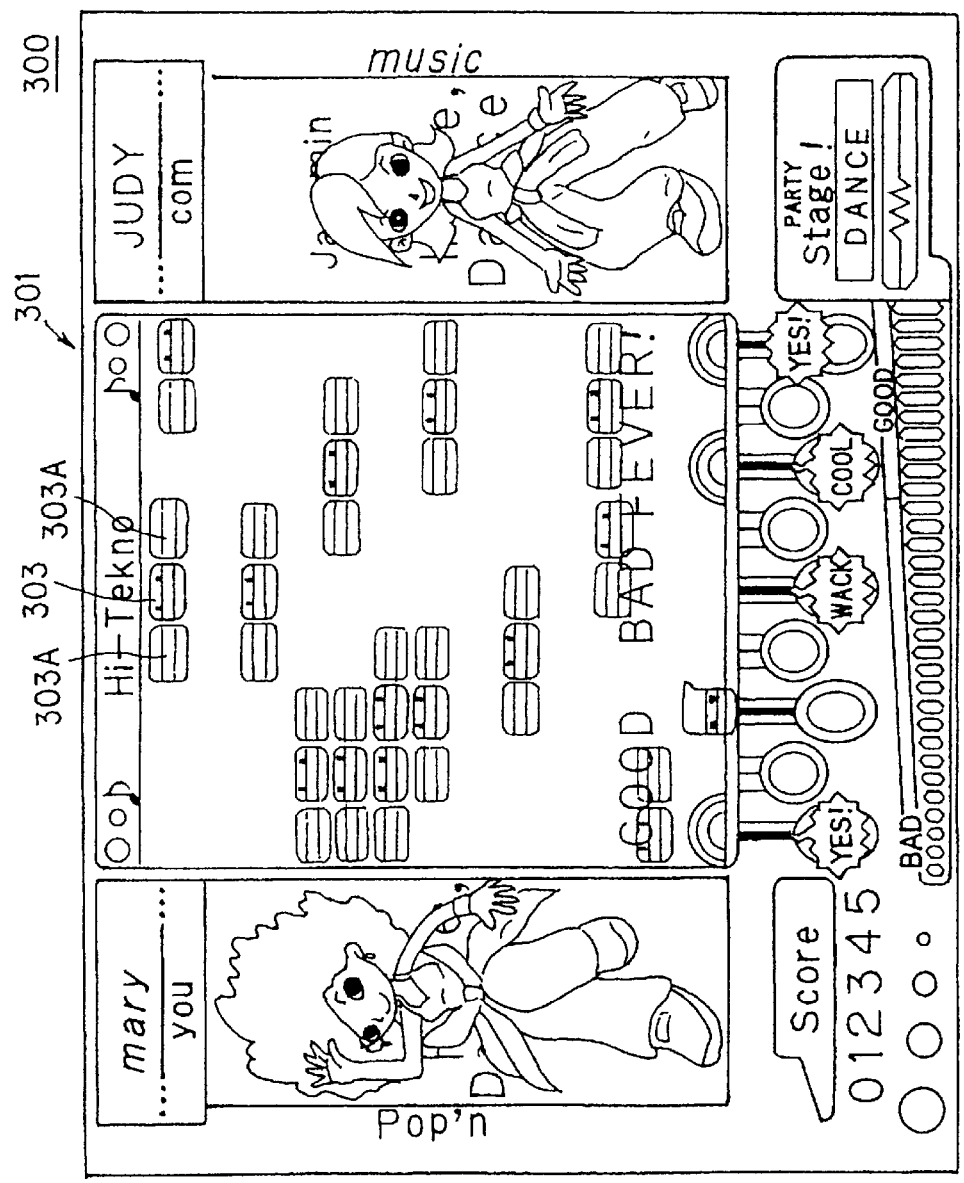
FIG. 27 is a view of a game image displayed when an event G occurs.
Figure 28:
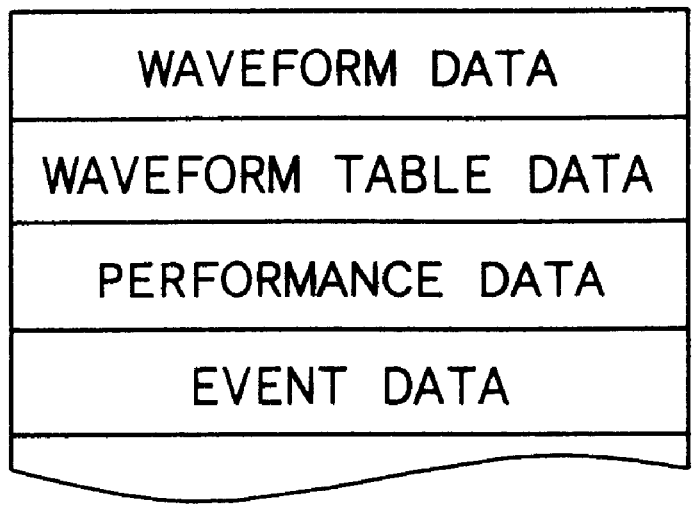
FIG. 28(*a*) is a diagram showing the data structure of one music piece.
Figure 28:
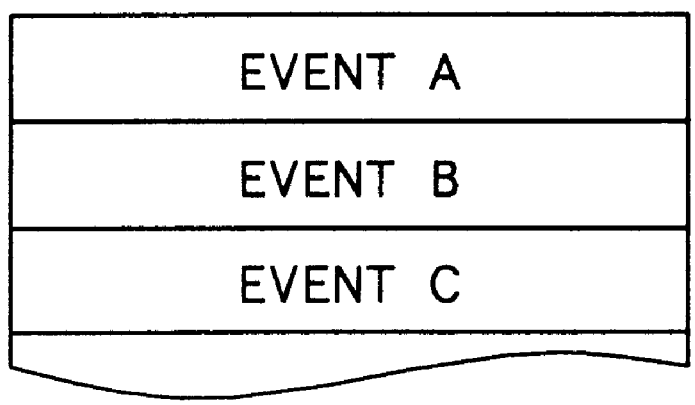

FIG. 27 shows a game image 300 displayed when an event G occurs. When the event G occurs, flickering dummy timing marks 303A are displayed laterally of the timing marks 303, i.e., on tracks adjacent to the tracks 302a–302i on which the timing marks 303 are positioned. The timing marks 303A are added by changing objects.

The added dummy timing marks 303A tend to blind the game player, who find it difficult to grasp control buttons 7 to be operated. Therefore, the difficulty level of the game is increased. While at the same time the dummy timing marks 303A are flickering, the timing marks 303 in the normal positions may also be caused to flicker.

FIGS. 28(a) and 28(b) show data relative to the playback of BGM and the display of the indicator 301, among the data stored in the hard disk memory 17 (see FIG. 2). In the arcade video game machine, a plurality of music pieces are prepared as the BGM for use in the game. Data shown in FIG. 28(a) are generated for each of the music pieces and stored in the hard disk memory 17. The data of a music piece X includes waveform data, waveform table data, and performance data, which are identical to those according to the first embodiment and hence will not be described in detail below (see FIGS. 6(a)–6(c)).

As shown in FIG. 28(a), the data of the music piece X further includes event data representing the number of event timing marks 311–318 displayed in the indicator 301 while the music piece X is being performed, for each of the event types. As shown in FIG. 28(b), the event data comprises data representing the numbers of event timing marks 311–318, defined in association with the respective events A, B, . . . . For example, the event data may represent two event timing marks for the event A, one event timing mark for the event B, . . . .

The event data does not include data defining the control buttons 7 corresponding to the event timing marks 311–318 and data defining control button operation timing thereof. These data are determined randomly before the game starts being played. These data, which are required to display the event timing marks 311–318, are rewritten into a given area of the RAM 15 (see FIG. 2) when the game starts being played.

These data stored in the RAM 15 are successively read into a prefetching buffer area thereof for the event timing marks under the control of the CPU 10 while the game is being played. The prefetching buffer area for the event timing marks corresponds to the prefetching buffer area for prefetching control button operation timing data according to the first embodiment. The data read into the prefetching buffer area for the event timing marks are then read into a display buffer area of the RAM 15, and converted into image data. Based on the image data, the graphic display controller 11 updates the game image 300 to display the event timing data 311–318 in the indicator 301.

If either one of the events occurs, then the image data is corrected as required under the control of the CPU 10, and the game image 300 is updated on the basis of the corrected image data.

Procedures for reading data into the prefetching buffer area for the event timing marks and the display buffer area are the same as those for reading control button operation timing data according to the first embodiment, and will not be described in detail below.

Figure 29:
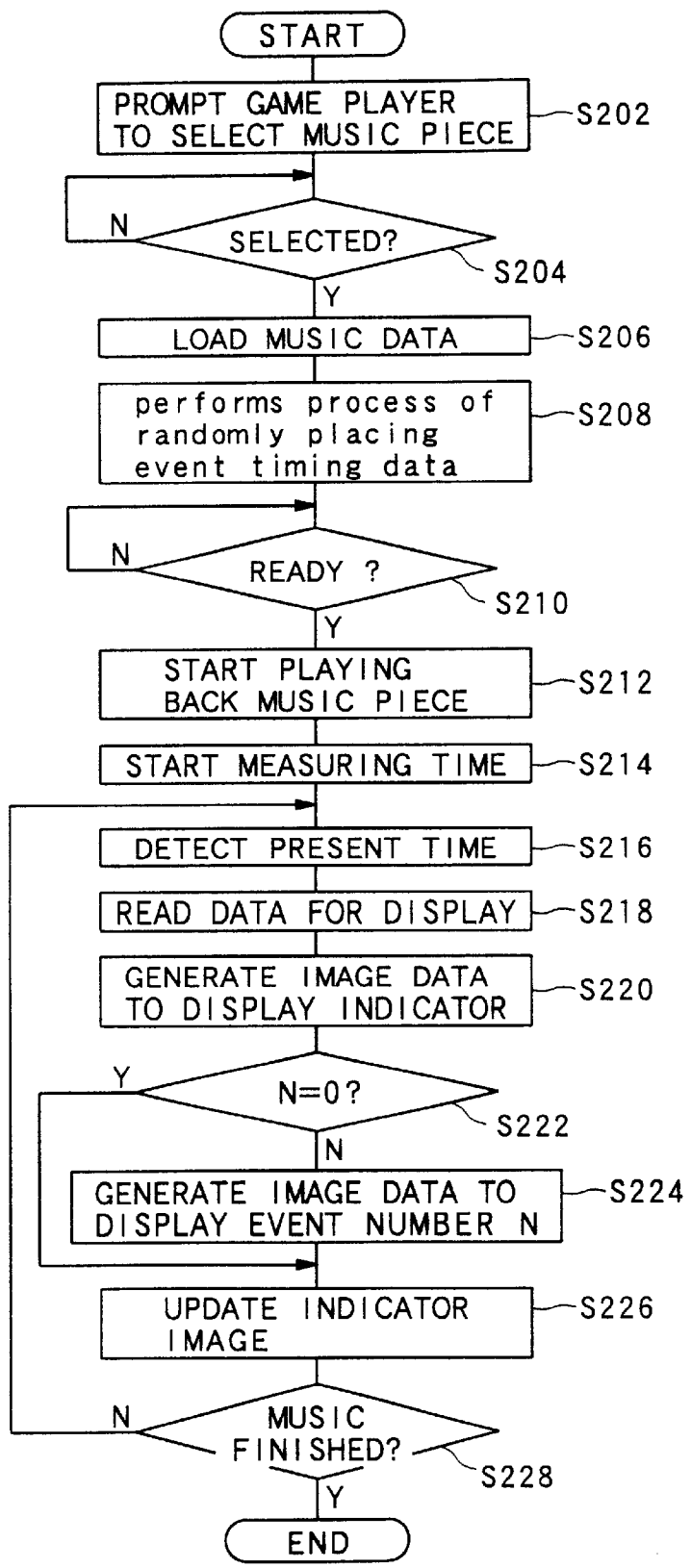
FIG. 29 is a flowchart of the sequence of a game playing process according to the third embodiment of the present invention.

FIG. 29 shows the sequence of a game playing process executed by the CPU 10 when the coin manager 18 outputs a signal indicative of an inserted coin required to start the game. First, the CPU 10 prompts the game player to select a music piece to be performed as BGM on the display monitor 3 in step S202, and then decides whether BGM is selected or not in step S204. If the game player selects a music piece, then the CPU 10 reads the data of the selected music piece (see FIG. 28(a)) into the RAM 15 in step S206, and thereafter performs a process of randomly placing event timing data in step S208.

According to the process in step S208, control button operation timing for the control buttons 7 with respect to the individual event timing marks 311–318 is randomly established arbitrarily in the music piece X as BGM, and then one of the tracks 302a–302i where the established control button operation timing does not interfere with the control button operation timing for the timing marks 303 is randomly selected. Whether the established control button operation timing interferes with the control button operation timing for the timing marks 303 or not is determined on the basis of whether there is maintained a predetermined period of time or longer between the control button operation timing for the event timing marks 311–318 and the control button operation timing for the timing marks 303 or not.

The above process in step S208 allows the control button operation timing for the individual event timing marks 311–318 to be established out of interference with the control button operation timing for the timing marks 303. Consequently, the timing marks 303 and the event timing marks 311–318 are prevented from overlapping each other in the indicator 301 and hence the timing marks 303 or the event timing marks 311–318 are prevented from being visually unrecognizable in the indicator 301.

The control button operation timing for the control buttons 7 with respect to the individual event timing marks 311–318 and the tracks 302a–302i where the event timing marks 311–318 are written in a given area of the RAM 15.

If there are no tracks where the randomly established control button operation timing would not interfere with the control button operation timing for the timing marks 303, then control button operation timing with respect to the event timing marks will not be established. In this case, the number of actually displayed event timing marks 311–318 becomes smaller than the number stored in the hard disk memory 17.

Since control button operation timing for the control buttons 7 with respect to the individual event timing marks 311–318 is randomly established, game players who repeatedly play the game, also known as repeaters, will not find the game boring.

After the above process has been finished with respect to all the timing marks 303, the CPU 10 decides whether the game has been readied or not in step S210. If the game has been readied, then the CPU 10 supplies the waveform data of the music piece to the sound controller 12 to start playing back the music piece in step S212. Thereafter, the CPU 10 starts measuring time to grasp a period of time that has elapsed from the start of the performance of the music piece in step S214.

In step S216, the CPU 10 detects the present time tx. In step S218, the CPU 10 reads the control button operation timing data, stored in the given area of the RAM 15, with respect to the event timing marks 311–318 from the present time tx to the time ty (see FIG. 8) into the prefetching buffer area, and then reads the control button operation timing data of two measures from the present time tx into the display buffer area. In step S220, the CPU 10 generates image data to display the indicator 101 based on the control button operation timing data stored in the display buffer area.

In step S222, the CPU 10 reads the value of an event number N. If the read value is not "0", then the CPU 10 generates image data to display an event (the event A, B, ...) corresponding to the event number N in the game image 300 in step S224. For example, if the event number N is a number corresponding to the event A, then the CPU 10 generates image data representing the game image shown in FIG. 24, and if the event number N is a number corresponding to the event B, then the CPU 10 generates image data representing the game image shown in FIG. 25. Thereafter, control proceeds to step S226. In step S224, the CPU 10 generates image data for an event to occur by correcting the image data generated in step S220 or replacing the image data generated in step S220 with newly generated image data.

Figure 31:
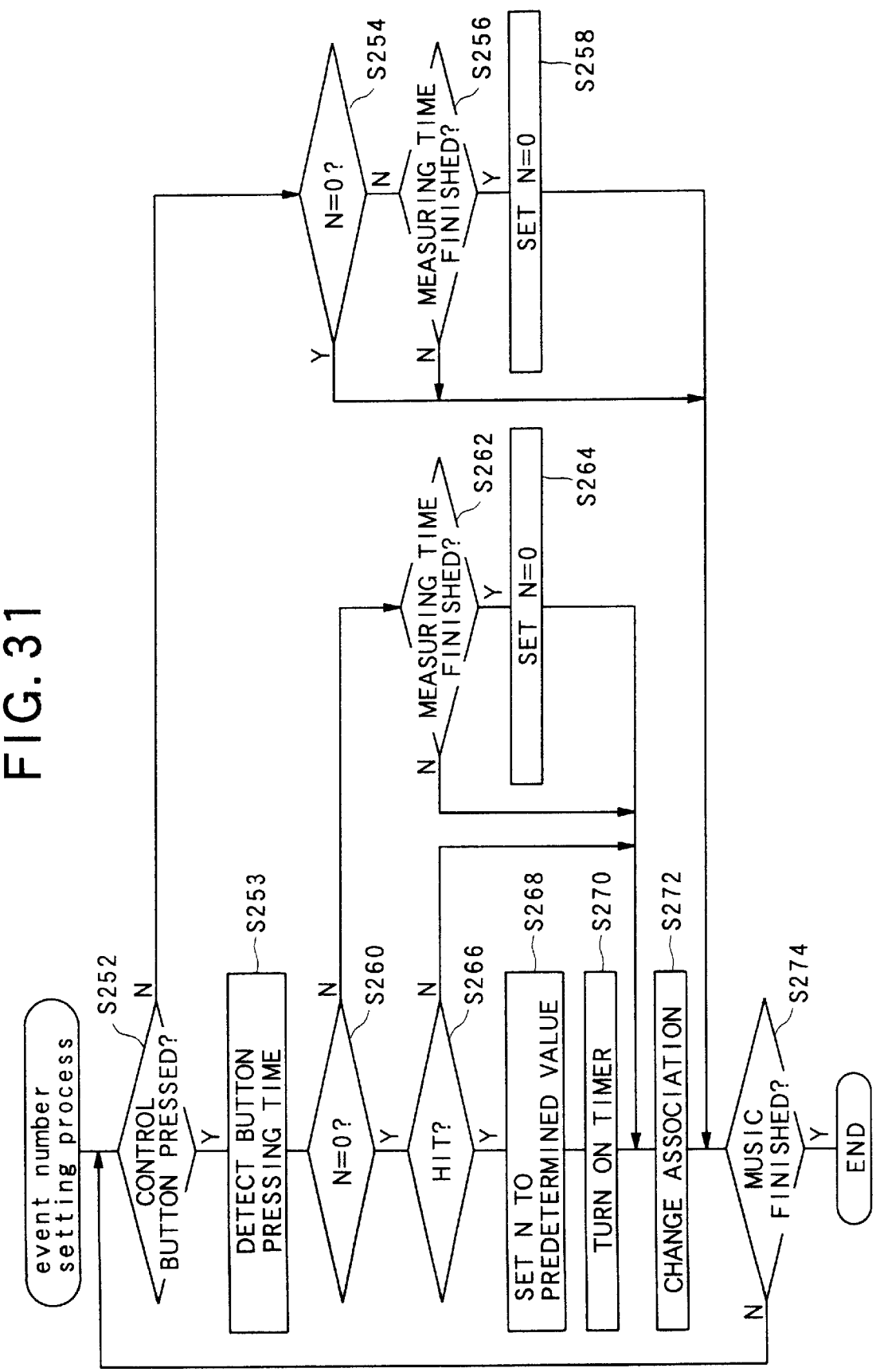
FIG. 31 is a flowchart of the sequence of a event number setting process.

The event number N is established in an event number setting process shown in FIG. 31. If the event number N is "0", then it means that no event is occurring. If the event number N is a positive number, then it means that an event (the event A, B, ...) corresponding to the event number N is occurring. The association between events (the events A, B, ...) and the event numbers N is determined according to a given table. The event number N is fixedly established for each of the positions of the event timing marks 311–318 that are determined by the control button operation timing for the control buttons 7 and the tracks 302a–302i. The event number N thus fixedly established for each of the positions of the event timing marks 311–318 remains unchanged during the game.

If the read value of the event number N is "0" in step S222, then control skips step S224 and goes to step S226.

In step S226, the CPU 10 controls the graphic display controller 11 to update the existing image of the indicator 101. Thereafter, the CPU 10 decides whether the performance of the music piece is finished or not in step S228. If the performance of the music piece is not finished, then control goes back to step S216. If the performance of the music piece is finished, then the game playing process shown in FIG. 29 comes to an end.

Figure 30:
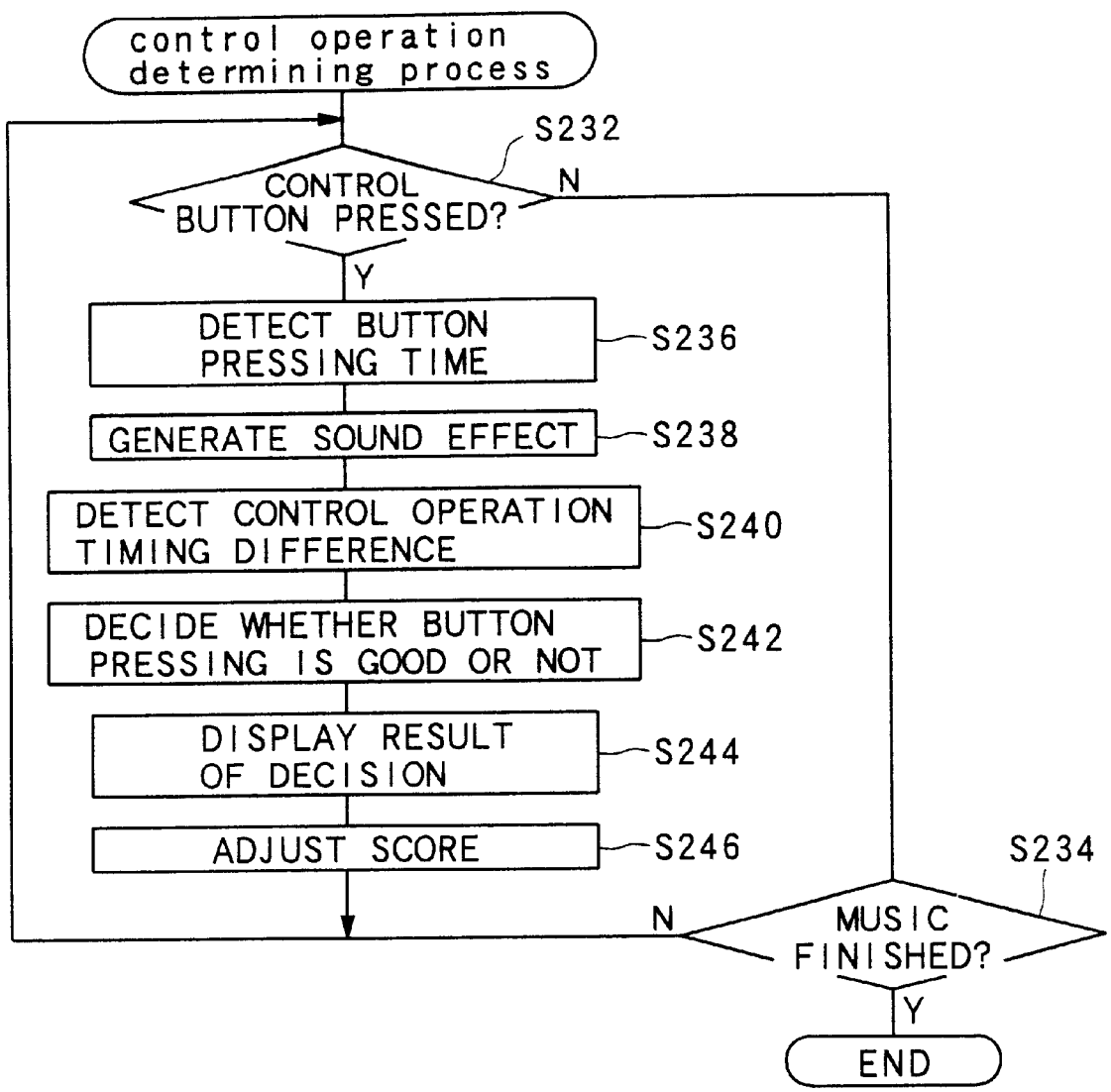
FIG. 30 is a flowchart of the sequence of a control operation determining process.

FIG. 30 shows the sequence of a control operation determining process which is executed by the CPU 10 while steps S216–S228 of the game playing process shown in FIG. 29 are being executed. The control operation determining process shown in FIG. 30 is the same as steps S21–S26 of the control operation determining process shown in FIG. 10 according to the first embodiment, and will briefly be described below.

In the control operation determining process shown in FIG. 30, the CPU 10 responds to a pressing by the game player of one of the control buttons 7 in step S232, and detects the time when the game player has pressed the control button 7 in step S236. Thereafter, the CPU 10 generates sound effects in step S238. In step S240, the CPU 10 detects a time difference between the control button operation timing with respect to the timing marks 303 as indicated by the control button operation timing data and the time when the game player has pressed the control button 7. Based on the detected time difference, the CPU 10 decides whether the pressing of the control button 7 is good or not in step S242. In step S244, the CPU 10 displays the result of the decision. The CPU 10 calculates a score from the start of the performance up to the present time based on the result of the decision in step S246. Thereafter, control returns to step S232.

If no control button pressing is decided in step S232, then the CPU 10 decides whether the performance of the music piece has been finished or not in step S234. If the performance of the music piece has not been finished, then control returns to step S232. If the performance of the music piece is finished in step S234, then the control operation determining process shown in FIG. 30 comes to an end.

FIG. 31 shows the sequence of an event number setting process which is executed by the CPU 10 while steps S216–S228 of the game playing process shown in FIG. 29 are being executed.

In the event number setting process shown in FIG. 31, the CPU 10 decides whether the game player has pressed either one of the control buttons 7 or not in step S252. If the game player has pressed either one of the control buttons 7, then the CPU 10 detects the time when the game player has pressed the control button 7 in step S253. The CPU 10 then decides whether the value of the event number N is "0" or not in step S260. If the value of the event number N is "0", then control proceeds to step S266. If the value of the event number N is not "0", then control goes to step S262.

In step S266, the CPU 10 decides whether the game player hits either one of the event timing marks 311–318 or not, based on the time difference between the time when the game player has pressed the control button 7, as detected in step S253, and one of the control button operation timings with respect to the event timing marks 311–318, which is closest to the time when the game player has pressed the control button 7. If the game player hits either one of the event timing marks 311–318, then control proceeds to step S268. If the game player does not hit any one of the event timing marks 311–318, then control jumps to step S272. In step S268, the CPU 10 sets the value of the event number N to the value which has been associated with the event timing mark which has been hit by the game player. In step S270, the CPU 10 turns on a timer to start measuring a period of time in which to generate an event.

In step S272, the CPU 10 rewrites the table which represents the association between the event numbers N and the events (the events A, B, ...) to change the display positions of the event timing marks 311–318. For example, the CPU 10 may rewrite the table to circulate the display positions of the event timing marks 311–318 in one direction such that the event timing mark 312 will be displayed in the display position of the event timing mark 311, the event timing mark 313 in the display position of the event timing mark 312, the event timing mark 314 in the display position of the event timing mark 313, the event timing mark 315 in the display position of the event timing mark 314, the event timing mark 316 in the display position of the event timing mark 315, the event timing mark 317 in the display position of the event timing mark 316, and the event timing mark 318 in the display position of the event timing mark 317.

Alternately, the CPU 10 may change the display positions of the event timing marks 311–318 either according to another rule or randomly, or may change only the display positions of some of the event timing marks 311–318. The characters displayed as the event timing marks 311–318 are associated respectively with the event timing marks 311–318, and the association between the characters and the events (the events A, B, . . . ) remains unchanged.

As described above, each time the game player presses either one of the control buttons 7, the display positions of the event timing marks 311–318 are changed. Therefore, the game player finds it difficult to hit any one of the event timing marks 311–318 of the events (the events A, B, . . . ) which the game player has been aiming at, and an unexpected element is introduced into the game. If the control buttons 7 are assigned to a plurality of game players to play the game, then each of the game players can operate the allocated control button 7 to prevent the other game players from hitting their desired event timing marks 311–318. In addition, each of the game players can operate the assigned control button 7 until a desired event is associated with the assigned control button 7. Therefore, the game player finds the game to be more fun as a competition game.

If the value of the event number N is not "0" in step S260, then the CPU 10 decides whether the timer which has been turned on in step S270 has finished measuring the period of time. If the timer has finished measuring the period of time, then control proceeds to step S264 in which the CPU 10 sets the value of the event number N to "0". If the timer has not finished measuring the period of time, then control does to step S272.

If no control button pressing is decided in step S252, then control goes to step S254. If the value of the event number N is not "0" in step S254, then control goes to step S256. If the timer which has been turned on in step S270 has finished measuring the period of time in step S256, then the CPU 10 sets the value of the event number N to "0" in step S258, after which control proceeds to step S274. If the value of the event number N is "0" in step S254, or if the timer has not finished measuring the period of time in step S256, then control proceeds to step S274.

In step S274, the CPU 10 decides whether the performance of the music piece has been finished or not in step S274. If the performance of the music piece has not been finished, then control returns to step S252. If the performance of the music piece is finished in step S274, then the event number setting process shown in FIG. 31 comes to an end.

In the processes shown in FIGS. 29, 30, and 31, the event timing marks are displayed immediately after the game starts being played, giving a possibility that an event can occur from the start of the music. However, an additional condition for the occurrence of an event may be employed. For example, the event timing marks may be displayed when the highlighted bar displayed by the score gage 309 reaches a certain level, and an event may occur when one of the event timing marks is hit.

The game system according to the third embodiment may be arranged so as to be implemented by the same hardware structure as the game system according to the first embodiment, and switching between the game systems according to the first and third embodiments may be achieved by a mode selecting operation performed by the game player.

The game system according to the third embodiment may also be implemented as a game machine for home use.

4th Embodiment

A game system according to a fourth embodiment of the present invention will be described below with reference to FIGS. 32 and 33. The game system according to the fourth embodiment is constructed as an arcade video game machine, and is arranged in order to be able to evaluate and display game player's achievements with respect to the respective control buttons of the game system according to the first embodiment. Only those portions of the game system according to the fourth embodiment which are different from the game system according to the first embodiment will be described below.

Figure 32:
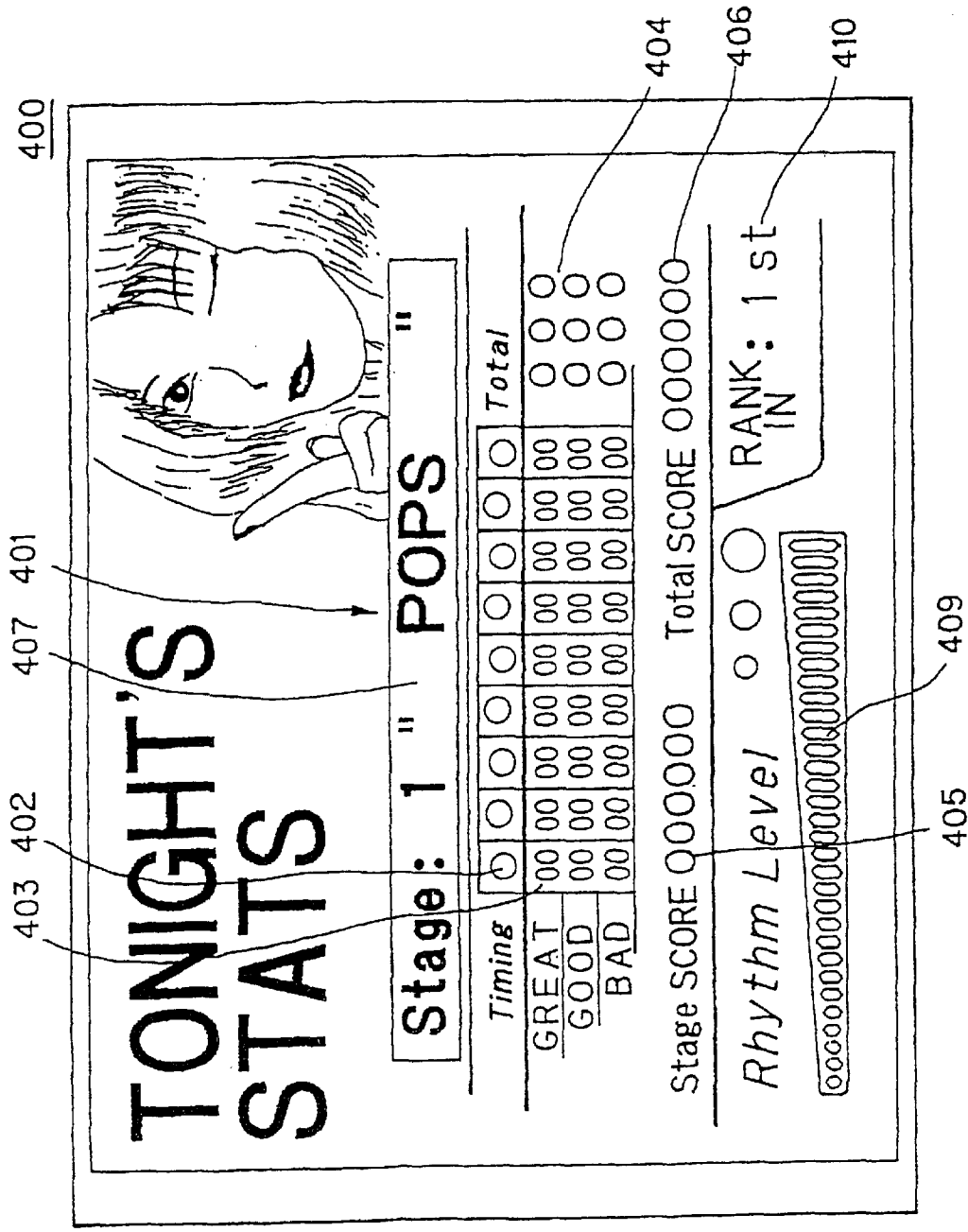
FIG. 32 is a view of a game image displayed by a game system according to a fourth embodiment of the present invention.

FIG. 32 shows a game image 400 displayed by the game system according to the fourth embodiment. The game image 400, which is displayed when the game is over, contains information about game player's achievements. As shown in FIG. 32, the game image 400 includes a table 401 of the numbers of evaluations "GREAT", "GOOD", and "BAD" with respect to how the game player has operated the nine control buttons 7. The table 401 contains a horizontal row of button display areas 402 which are colored in the respective hues of the control buttons 7 and represent the control buttons 7, respectively, a horizontal array of columns positioned beneath and corresponding to the respective control buttons 7, each of the columns comprising three number display areas 403 for displaying the numbers of evaluations "GREAT", "GOOD", and "BAD" for one of the control buttons 7, and a vertical array of total number display areas 404 positioned in a right side of the table 401 for displaying the total numbers of evaluations "GREAT", "GOOD", and "BAD", respectively, for all the control buttons 7.

In order for the game player to be able to recognize easily the control button 7 which has earned the maximum number of the evaluation "GREAT", the button display area 402 corresponding to such control button 7 is displayed in a manner, e.g., a color, different from the other button display areas 402.

The game image 400 also includes a score display area 405 positioned below the table 401, for displaying a score in a present stage of the game, and a total score display area 406 positioned below the table 401 adjacent to the score display area 405, for displaying a total score which represents the total of the scores of all the stages which have been played so far. The game image 400 further includes a title display area 407 positioned above the table 401, for displaying stage contents and a BGM title, a score gage 409 positioned below the score display area 405, for displaying a highlighted bar 409*a* that extends or contracts horizontally depending on the score while the game is being played, the highlighted bar 409*a* having a left-hand end fixed to the left-hand end of the score gage 409, and a ranking display area 410 positioned beneath the total score display area 406, for displaying the ranking of the total score displayed in the total score display area 406. Although points "0" are displayed in all the number display areas 403, the total number display areas 404, and the other display areas in FIG. 32, these display areas actually display numbers as they are counted up while the game is in progress.

Figure 33:
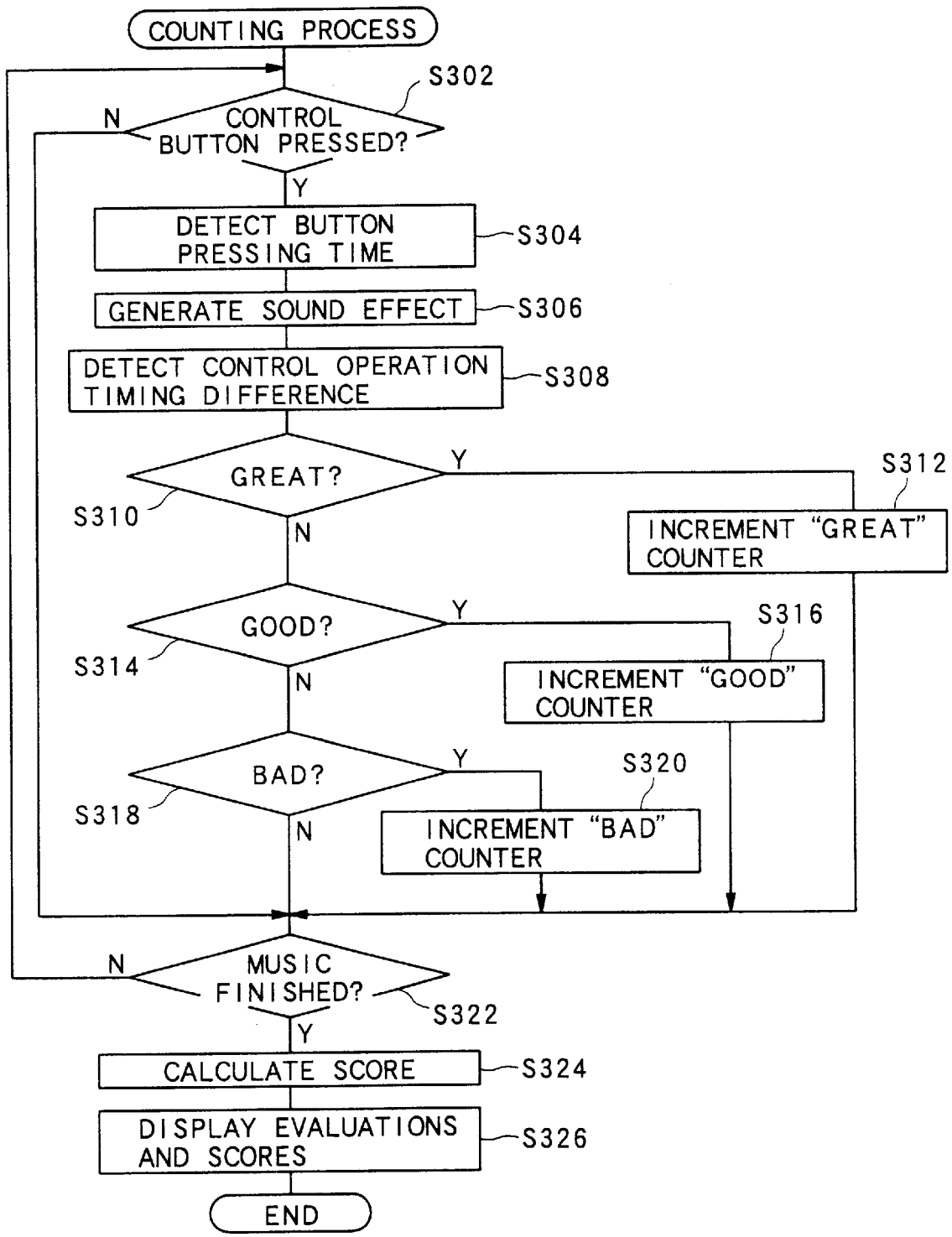
FIG. 33 is a flowchart of the sequence of a counting process performed by the game system according to the fourth embodiment of the present invention.

FIG. 33 shows the sequence of a counting process performed by the game system according to the fourth embodiment, for evaluating game player's achievements with respect to the respective control buttons 7 and counting up numbers to be displayed in the game image 400 shown in FIG. 32. The counting process is executed by the CPU 10 (see FIG. 2) while the game is being played on the game system.

The CPU 10 decides whether the game player has pressed either one of the control buttons 7 or not in step S302. If the game player has pressed either one of the control buttons 7, then the CPU 10 detects the time when the game player has pressed the control button 7 in step S304. Thereafter, the CPU 10 generates sound effects assigned to the pressed control button 7 from the speaker units 4, 5 (see FIG. 2) in step S306.

In step S308, the CPU 10 detects a time difference between the time when the game player has pressed the control button 7 as detected in step S304 and control button operation timing (which is limited to control button operation timing relative to the actually operated control button 7) closest to the present time tx among the control button operation timing data. Then, the CPU 10 evaluates the control button operation as one of a plurality of levels based on the detected time difference. In step S310, the CPU 10 decides whether the evaluated level is in a range of the evaluation "GREAT" or not. If the evaluated level is in the range of the evaluation "GREAT", then control goes to step S312. If the evaluated level is not in the range of the evaluation "GREAT", then control proceeds to step S314. In step S314, the CPU 10 decides whether the evaluated level is in a range of the evaluation "GOOD" or not. If the evaluated level is in the range of the evaluation "GOOD", then control goes to step S316. If the evaluated level is not in the range of the evaluation "GOOD", then control proceeds to step S318. In step S318, the CPU 10 decides whether the evaluated level is in a range of the evaluation "BAD" or not. If the evaluated level is in the range of the evaluation "BAD", then control goes to step S320. If the evaluated level is not in the range of the evaluation "BAD", then control proceeds to step S322.

The CPU 10 is associated with a total of 27 counters for counting evaluations "GREAT", "GOOD", and "BAD" with respect to operations of the control buttons 7. These counters are referred to as "GREAT", "GOOD", and "BAD" counters. These counters are reset to "0" when the counting process shown in FIG. 33 starts to be executed. In step S312, the CPU 10 adds "1" to the count of the "GREAT" counter with respect to the control button 7 whose pressing has been detected in step S302. Thereafter, control goes to step S322. In step S316, the CPU 10 adds "1" to the count of the "GOOD" counter with respect to the control button 7 whose pressing has been detected in step S302. Thereafter, control goes to step S322. In step S320, the CPU 10 adds "1" to the count of the "BAD" counter with respect to the control button 7 whose pressing has been detected in step S302. Thereafter, control goes to step S322.

In step S322, the CPU 10 decides whether the performance of the music piece has been finished or not. If the performance of the music piece has been finished, then control proceeds to step S324. If the performance of the music piece has not been finished, then control returns to step S302. In step S324, the CPU 10 calculates a score to be displayed in the score display area 405, a total score to be displayed in the total score display area 406, and total numbers of evaluations to be displayed in the total number display areas 404. In step S326, the CPU 10 displays the game image 400 based on the counts of the "GREAT", "GOOD", and "BAD" counters which have been calculated in steps S312, S316, S320 and the scores and numbers which have been calculated in step S324.

In the fourth embodiment, as described above, the operations of the respective control buttons 7 are evaluated, and the evaluations are displayed in the game image 400. Therefore, if the game is played by a plurality of game players, and the control buttons 7 are assigned to the game players, then the game players can be evaluated with respect to their operations of the control buttons 7 in the game. If the game is played by a single game player, then the game player can be evaluated with respect to its operations of the control buttons 7 in the game, and hence can be aware of the positions of those control buttons 7 which the game player is less dexterous with operating than the other control buttons 7.

The game system according to the fourth embodiment may also be implemented as a game machine for home use.

According to the present invention, as described above, an obstructive effect is added to the image which indicates operation timing for control members to the game player. Such an added obstructive effect is effective to blind the game player, introduces an unexpected element into the game, and makes the game more fun. If an obstructive effect is generated when the game player has become accustomed to the game and able to operate the control members with a certain level of skill, then the obstructive effect can make the game complex and prevents the game player from being bored with the game. If the game system allows the game player to select a first mode or a second mode in which the game player can practice the first mode, and can establish whether an obstructive effect is to be added in the second mode based on a command from the game player, then different practicing methods can be made available in the second mode, and hence the second mode can effectively be utilized. If an obstructive effect is generated depending on the operation of control members, then when the game is played by a plurality of game players, one of the game players may obstruct the game playing of the other game players. As a result, the game players find the game to be more fun as a competition game. If an evaluating means is provided for evaluating the operation of each of the control members, then a plurality of game players assigned to the control members can be evaluated with respect to their operations of the control members, or a single game player can be aware of the positions of those control members which the game player is less dexterous with operating than the other control members.

Although certain preferred embodiments of the present invention have been shown and described in detail, it should be understood that various changes and modifications may be made therein without departing from the scope of the appended claims.

What is claimed is:

1. A game system comprising:
   a display unit for displaying a game image;
   control means for being manually operable by a game player;
   a memory for storing data representing a timing to operate the control means while a game is being played;
   control operation indicating means for displaying in said game image an image for indicating the timing to operate the control means based on the data stored in said memory; and
   obstructing means for generating an obstructive effect in said image for indicating the timing to operate the control means, to obstruct an attempt of the game player to grasp said timing to operate the control means.

2. A game system according to claim 1, wherein said control operation indicating means comprises means for displaying as said image a mark for indicating the timing to operate the control means, so as to be movable in said game image when the game is in process such that when said mark reaches a predetermined position in said game image, the timing to operate the control means arrives.

3. A game system according to claim 2, wherein said obstructing means comprises means for concealing said mark while the mark is moving in said game image, as said obstructive effect.

4. A game system according to claim 2, wherein said obstructing means comprises means for changing the length of said mark while the mark is moving in said game image, as said obstructive effect.

5. A game system according to claim 2, wherein said obstructing means comprises means for generating a mark indicative of an erroneous timing, as said obstructive effect.

6. A game system according to claim 2, further comprising:
    means for inhibiting said obstructive effect in a predetermined range in said game image which extends away from said predetermined position in a direction which is opposite to the direction in which said mark is movable.

7. A game system according to claim 2, wherein said obstructing means comprises means for changing the speed at which said mark moves, as said obstructive effect.

8. A game system according to claim 2, wherein said obstructing means comprises means for reducing the time required until said mark reaches said predetermined position, as said obstructive effect.

9. A game system according to claim 2, wherein said obstructing means comprises means for interrupting the displaying of said mark for a predetermined time, as said obstructive effect.

10. A game system according to claim 1, wherein said control means comprises a plurality of control members, said control operation indicating means comprising means for displaying as said image a plurality of marks distinguishably associated with said control members, respectively, for indicating the timings to operate the control members, respectively, said marks being movable in said game image as the game proceeds such that when said marks reach a predetermined position in said game image, the timings to operate the control members arrive.

11. A game system according to claim 4, wherein said obstructing means comprises means for changing the manner in which said marks are distinguishably associated with said control members, while the mark is moving in said game image, as said obstructive effect.

12. A game system according to claim 4, wherein said game image includes an area for displaying said marks, said area being divided into a plurality of parallel tracks associated respectively with said control members, said marks being movable along said tracks, respectively, said obstructing means comprising means for moving at least one of said marks to another one of said tracks while the marks are moving in said game image, as said obstructive effect.

13. A game system according to claim 1, further comprising:
    sound outputting means for playing music when the game is in progress, and outputting sound effects in addition to the music depending on an operation of the control means when said control means is operated by the game player according to the timing indicated by said control operation indicating means while the music is being played.

14. A game system, comprising:
    a display unit for displaying a game image;
    control means for being manually operable by a game player;
    a memory for storing data representing a timing to operate the control means while a game is being played;
    control operation indicating means for displaying in said game image an image for indicating the timing to operate the control means based on the data stored in said memory;
    obstructing means for generating an obstructive effect in said image for indicating the timing to operate the control means, to obstruct an attempt of the game player to grasp said timing to operate the control means;
    evaluating means for evaluating a game player's achievement by comparing an operation by the game player of said control means with said timing to operate the control means while the game is in progress; and
    obstructive effect control means for controlling said obstructing means to generate said obstructive effect when the game player's achievement evaluated by said evaluating means is higher than a predetermined reference level, and to inhibit said obstructive effect from being produced when the game player's achievement evaluated by said evaluating means is lower than said predetermined reference level.

15. A game system according to claim 14, further comprising:
    sound outputting means for playing music when the game is in progress, and outputting sound effects in addition to the music depending on an operation of the control means when said control means is operated by the game player according to the timing indicated by said control operation indicating means while the music is being played.

16. A game system according to claim 14, wherein said control operation indicating means comprises means for displaying as said image a mark for indicating the timing to operate the control means, so as to be movable in said game image when the game is in process such that when said mark reaches a predetermined position in said game image, the timing to operate the control means arrives.

17. A game system according to claim 16, wherein said obstructing means comprises means for changing the length of said mark while the mark is moving in said game image, as said obstructive effect.

18. A game system according to claim 16, wherein said obstructing means comprises means for generating a mark indicative of an erroneous timing, as said obstructive effect.

19. A game system according to claim 16, further comprising:
    means for inhibiting said obstructive effect in a predetermined range in said game image which extends away from said predetermined position in a direction which is opposite to the direction in which said mark is movable.

20. A game system according to claim 16, wherein said obstructing means comprises means for changing the speed at which said mark moves, as said obstructive effect.

21. A game system according to claim 16, wherein said obstructing means comprises means for reducing the time required until said mark reaches said predetermined position, as said obstructive effect.

22. A game system according to claim 16, wherein said obstructing means comprises means for interrupting the displaying of said mark for a predetermined time, as said obstructive effect.

23. A game system according to claim 14, wherein said control means comprises a plurality of control members, said control operation indicating means comprising means for displaying as said image a plurality of marks distinguishably associated with said control members, respectively, for indicating the timings to operate the control members, respectively, said marks being movable in said game image as the game proceeds such that when said marks reach a predetermined position in said game image, the timings to operate the control members arrive.

24. A game system according to claim 14, wherein said obstructing means comprises means for concealing said mark while the mark is moving in said game image, as said obstructive effect.

25. A game system according to claim 23, wherein said obstructing means comprises means for changing the manner in which said marks are distinguishably associated with said control members, while the mark is moving in said game image, as said obstructive effect.

26. A game system according to claim 23, wherein said game image includes an area for displaying said marks, said area being divided into a plurality of parallel tracks associated respectively with said control members, said marks being movable along said tracks, respectively, said obstructing means comprising means for moving at least one of said marks to another one of said tracks while the marks are moving in said game image, as said obstructive effect.

27. A game system, comprising:
a display unit for displaying a game image;
control means for being manually operable by a game player;
a memory for storing data representing a timing to operate the control means while a game is being played;
control operation indicating means for displaying in said game image an image for indicating the timing to operate the control means based on the data stored in said memory;
obstructing means for generating an obstructive effect in said image for indicating the timing to operate the control means, to obstruct an attempt of the game player to grasp said timing to operate the control means;
mode selecting means for selecting, according to a command from the game player, either a first mode in the game for instructing the game player via said control operation indicating means to operate said control means according to a predetermined control operation procedure based on the data representing the timing to operate the control means, or a second mode in the game for indicating to, the game player via said control operation indicating means, a control operation procedure contained in a practice range which is established in said predetermined control operation procedure in said first mode;
obstructive effect setting means for establishing, according to a command from the game player, whether said obstructing means is allowed to generate said obstructive effect, as a condition in said second mode in the game;
control operation indication control means for controlling said control operation indicating means to indicate said predetermined control operation procedure to the game player through said image for indicating the timing to operate the control means, when said first mode is selected, or to indicate said control operation procedure contained in said practice range to the game player through said image for indicating the timing to operate the control means, when said second mode is selected; and obstructive effect control means for controlling said obstructing means to generate said obstructive effect when said first mode is selected, to generate said obstructive effect if said obstructing means is allowed to generate said obstructive effect by said obstructive effect setting means when said second mode is selected, and to inhibit said obstructive effect from being produced if said obstructing means is inhibited to generate said obstructive effect by said obstructive effect setting means when said second mode is selected.

28. A game system according to claim 27, further comprising:
practice range setting means for establishing said practice range according to a command from the game player when said second mode is selected.

29. A game system according to claim 27, wherein said obstructive effect setting means comprises means for establishing a difficulty level of said obstructive effect according to a command from the game player if said obstructing means is allowed to generate said obstructive effect, and said obstructive effect control means comprises means for controlling said obstructing means to generate said obstructive effect in the difficulty level established by said obstructive effect setting means while the game is being played in said second mode if said obstructing means is allowed to generate said obstructive effect.

30. A game system according to claim 27, further comprising:
decision means for deciding whether a condition for generating said obstructive effect is satisfied or not while the game is in process in said first mode and said second mode;
said obstructive effect control means comprising means for controlling said obstructing means to generate said obstructive effect when said condition is satisfied as decided by said decision means when the game is played in said first mode, to generate said obstructive effect when said obstructing means is allowed to generate said obstructive effect by said obstructive effect setting means and also when said condition is satisfied as decided by said decision means when the game is played in said second mode, and to inhibit said obstructive effect from being produced when said obstructing means is inhibited from generating said obstructive effect by said obstructive effect setting means or when said condition is not satisfied as decided by said decision means when the game is played in said second mode.

31. A game system according to claim 27, further comprising:
evaluating means for evaluating a game player's achievement by comparing an operation by the game player of said control means with said timing to operate the control means while the game is in progress in said second mode;
said obstructive effect control means comprising means for controlling said obstructing means to generate said obstructive effect when said obstructing means is allowed to generate said obstructive effect by said obstructive effect setting means and the game player's achievement evaluated by said evaluating means is higher than a predetermined reference level, and to inhibit said obstructive effect from being produced when said obstructing means is inhibited from generating said obstructive effect by said obstructive effect setting means or the game player's achievement evaluated by said evaluating means is lower than said predetermined reference level.

32. A game system according to claim 27, wherein said control operation indicating means comprises means for displaying as said image a mark for indicating the timing to operate the control means, so as to be movable in said game image when the game is in process such that when said mark reaches a predetermined position in said game image, the timing to operate the control means arrives.

33. A game system according to claim 32, further comprising: means for inhibiting said obstructive effect in a predetermined range in said game image which extends away from said predetermined position in a direction which is opposite to the direction in which said mark is movable.

34. A game system according to claim 32, wherein said obstructing means comprises means for generating a mark indicative of an erroneous timing, as said obstructive effect.

35. A game system according to claim 32, wherein said obstructing means comprises means for changing the length of said mark while the mark is moving in said game image, as said obstructive effect.

36. A game system according to claim 32, wherein said obstructing means comprises means for changing the speed at which said mark moves, as said obstructive effect.

37. A game system according to claim 32, wherein said obstructing means comprises means for reducing the time required until said mark reaches said predetermined position, as said obstructive effect.

38. A game system according to claim 32 wherein said obstructing means comprises means for interrupting the displaying of said mark for a predetermined time, as said obstructive effect.

39. A game system according to claim 27, wherein said control means comprises a plurality of control members, said control operation indicating means comprising means for displaying as said image a plurality of marks distinguishably associated with said control members, respectively, for indicating the timings to operate the control members, respectively, said marks being movable in said game image as the game proceeds such that when said marks reach a predetermined position in said game image, the timings to operate the control members arrive.

40. A game system according to claim 39, wherein said obstructing means comprises means for concealing said mark while the mark is moving in said game image, as said obstructive effect.

41. A game system according to claim 39, wherein said obstructing means comprises means for changing the manner in which said marks are distinguishably associated with said control members, while the mark is moving in said game image, as said obstructive effect.

42. A game system according to claim 39, wherein said game image includes an area for displaying said marks, said area being divided into a plurality of parallel tracks associated respectively with said control members, said marks being movable along said tracks, respectively, said obstructing means comprising means for moving at least one of said marks to another one of said tracks while the marks are moving in said game image, as said obstructive effect.

43. A game system according to claim 27, further comprising:
sound outputting means for playing music when the game is in progress, and outputting sound effects in addition to the music depending on an operation of the control means when said control means is operated by the game player according to the timing indicated by said control operation indicating means while the music is being played.

44. A game system comprising:
a display unit for displaying a game image;
control means for being manually operable by a game player;
first memory means for storing data representing a timing to operate the control means while a game is being played;
first control operation indicating means for displaying in said game image an image for indicating the timing to operate the control means when the game is in progress based on the data stored in said first memory means;
a plurality of obstructing means for generating obstructive effects to obstruct an attempt of the game player to grasp the timing to operate the control means, in image for indicating the timing to operate the control means; and
obstructive effect generation control means for controlling said plurality of obstructing means to select one of the obstructing means and generating the obstructive effect from the selected one of the obstructing means, in response to an operation by the game player of the control means while the game is in progress.

45. A game system according to claim 44, further comprising:
second memory means for storing data representing timings to operate the control members, respectively, while a game is being played;
allocating means for allocating said control members to the timings represented by the data stored in said second memory means; and
second control operation indicating means for displaying in said game image an image for indicating the timings to operate the control members when the game is in progress based on the association between the timings represented by the data stored in said second memory means and said control members allocated by said allocating means;
said obstructive effect generation control means comprising means for, when said control means is operated according to the timing represented by the data stored in said second memory means, for selecting one of said obstructing means associated with the operated control means according to said association, and generating said obstructive effect from said selected one of the obstructing means.

46. A game system according to claim 45, further comprising allocation changing means for changing said association depending on the operation by the game player of said control means.

47. A game system comprising:
a display unit for displaying a game image;
a plurality of control members for being manually operable by a game player;
memory means for storing data representing timings to operate the control members while a game is being played;
first control operation indicating means for displaying in said game image an image for indicating the timings to operate the control members such that respective ones of the timings are separately associated with corresponding respective ones of the control members when the game is in progress based on the data stored in said memory means;
evaluating means for evaluating individual operations by the game player of said control members, respectively, and assigning corresponding ones of a predetermined set of levels to each of said individual operations of said control members by comparing the timings at which the control members are actually operated by the game player with said timings stored in said memory means to operate the control members; and evaluation display means for displaying, for each of said control members, total numbers of occurrences of each one of said predetermined set of levels respectively assigned to each of said control members based on said individual operations thereof.

48. A game system according to claim 47, further comprising evaluation display means for displaying evaluations produced by said evaluating means distinguishably among the control members in said game image.

49. A recording medium readable by a computer and storing:

data representing a timing to operate control means in a game system while a game is being played; and a program for controlling the computer to execute a procedure to display on a display unit in the game system an image for indicating the timing to operate the control means based on the stored data while the game is in progress, and a procedure to generate an obstructive effect in said image to obstruct an attempt of the game player to grasp said timing to operate the control means, in response to an operation by the game player of the control means when the game is in progress.

50. A recording medium readable by a computer and storing:

data representing timings to operate a plurality of respective control members in a game system while a game is being played;

a program for controlling the computer to execute a procedure to display on a display unit in the game system an image for indicating the timings to operate the control members based on the stored data such that respective ones of the timings are separately associated with corresponding respective ones of the control members while the game is in progress;

a procedure to evaluate individual operations by the game player of said control members, respectively, and assign corresponding ones of a predetermined set of levels to each of said individual operations of said control members by comparing the timings at which the control members are actually operated by the game player with said timings represented by the stored data;

a procedure for displaying, for each of said control members, total numbers of occurrences of each one of said predetermined set of levels respectively assigned to each of said control members based on said individual operations thereof.

51. A recording medium, readable by a computer, storing data and executable program instructions comprising:

stored data representing a timing to operate control means in a game system while a game is being played;

a program for displaying on a display unit in the game system an image for indicating the timing to operate the control means based on the stored data while the game is in progress, said program being arranged to cause said computer to function as obstructing means for generating an obstructive effect in said image for indicating the timing to operate the control means, to obstruct an attempt of the game player to grasp said timing to operate the control means;

evaluating means for evaluating a game player's achievement by comparing an operation by the game player of said control means with said timing to operate the control means while the game is in progress; and obstructive effect control means for controlling said obstructing means to generate said obstructive effect when the game player's achievement evaluated by said evaluating means is higher than a predetermined reference level, and to inhibit said obstructive effect from being produced when the game player s achievement evaluated by said evaluating means is lower than said predetermined reference level.

52. A recording medium, readable by a computer, storing data and executable program instructions comprising:

stored data representing a timing to operate control means in a game system while a game is being played;

a program for displaying on a display unit in the game system an image for indicating the timing to operate the control means based on the stored data while the game is in progress, said program being arranged to cause said computer to function as obstructing means for generating an obstructive effect in said image for indicating the timing to operate the control means, to obstruct an attempt of the game player to grasp said timing to operate the control means;

decision means for deciding whether a condition for generating said obstructive effect is satisfied or not while the game is in process; and obstructive effect control means for controlling said obstructing means to generate said obstructive effect when said condition is satisfied as decided by said decision means, and to inhibit said obstructive effect from being produced when said condition is not satisfied as decided by said decision means.

53. A recording medium, readable by a computer, storing data and executable program instructions comprising:

stored data representing a timing to operate control means in a game system while a game is being played;

a program for displaying on a display unit in the game system an image for indicating the timing to operate the control means based on the stored data while the game is in progress, said program being arranged to cause said computer to function as obstructing means for generating an obstructive effect in said image for indicating the timing to operate the control means, to obstruct an attempt of the game player to grasp said timing to operate the control means;

mode selecting means for selecting, according to a command from the game player, either a first mode in the game for instructing the game player via said control operation indicating means to operate said control means according to a predetermined control operation procedure based on the data representing the timing to operate the control means, or a second mode in the game for indicating to, the game player via said control operation indicating means, a control operation procedure contained in a practice range which is established in said predetermined control operation procedure in said first mode;

obstructive effect setting means for establishing, according to a command from the game player, whether said obstructing means is allowed to generate said obstructive effect, as a condition in said second mode in the game;

control operation indication control means for controlling said control operation indicating means to indicate said predetermined control operation procedure to the game player through said image for indicating the timing to operate the control means, when said first mode is selected, or to indicate said control operation procedure contained in said practice range to the game player through said image for indicating the timing to operate the control means, when said second mode is selected; and obstructive effect control means for controlling said obstructing means to generate said obstructive effect when said first mode is selected, to generate said obstructive effect if said obstructing means is allowed to generate said obstructive effect by said obstructive effect setting means when said second mode is selected, and to inhibit said obstructive effect from being produced if said obstructing means is inhibited to generate said obstructive effect by said obstructive effect setting means when said second mode is selected.

54. A game system comprising:

a display unit for displaying a game image;

a plurality of control members for being manually operable by a game player;

a memory for storing data representing a control operation procedure of the control members which is established in time to a predetermined music piece;

mode selecting means for selecting, according to a command from the game player, a first mode in a game playable by the game player to play the music piece from the beginning to the last thereof, and a second mode in the game to play a practice range established in at least a portion of said music;

control operation procedure presenting means for displaying an image presenting said control operation procedure on said display unit based on the data representing the control operation procedure;

obstructing means for generating an obstructive effect in said image presenting said control operation procedure to obstruct an attempt of the game player to grasp said control operation procedure;

obstructive effect setting means for establishing, according to a command from the game player, whether said obstructing means is allowed to generate said obstructive effect when the game is played in said second mode;

display control means for controlling said control operation procedure presenting means to display said control operation procedure from the beginning to the last of said music piece on said display unit when the game is played in said first mode, and to display said control operation procedure from the beginning to the last of said practice range when the game is played in said second mode; and obstructive effect control means for controlling said obstructing means to generate said obstructive effect when the game is played in said first mode, to generate said obstructive effect if said obstructing means is allowed to generate said obstructive effect by obstructive effect setting means when the game is played in said second mode, and to inhibit said obstructive effect from being produced if said obstructing means is inhibited from generating said obstructive effect by obstructive effect setting means when the game is played in said second mode.

55. A game system comprising:

a display unit for displaying a game image;

control means for being manually operable by a game player;

first memory means for storing data representing a timing to operate the control means while a game is being played;

first control operation indicating means for displaying in said game image an image for indicating the timing to operate the control means when the game is in progress based on the data stored in said first memory means;

obstructing means for generating an obstructive effect in said image for indicating the timing to operate the control means, to obstruct an attempt of the game player to grasp said timing to operate the control means; and obstructive effect generation control means for controlling said obstructing means to generate said obstructive effect depending on an operation by the game player of said control means while the game is in progress.

56. A game system according to claim 55, wherein said first control operation indicating means comprises means for displaying in said game image a first mark for indicating an operation of said control means, as said image for indicating the timing to operate the control means, and moving said first mark in said game image when the game is in process such that when said first mark reaches a predetermined position in said game image, the timing to operate the control means associated with said first mark arrives.

57. A game system according to claim 55, further comprising:

second memory means for storing data representing a timing to operate the control means while a game is being played; and second control operation indicating means for displaying in said game image an image for indicating the timing to operate the control means when the game is in progress based on the data stored in said second memory means;

said obstructive effect generation control means comprising means for controlling said obstructing means to generate said obstructive effect when said control means is operated by the game player at the timing to operate the control means based on the data stored in said second memory means.

58. A game system according to claim 57, wherein said second control operation indicating means comprises means for displaying in said game image a second mark to indicate an operation of the control means, as said image for indicating the timing to operate the control means based on the data stored in said second memory means, and moving said second mark in said game image when the game is in process such that when said second mark reaches a predetermined position in said game image, the timing to operate the control means associated with said second mark arrives.

59. A game system according to claim 57, wherein said control means comprises a plurality of control members, said second control operation indicating means comprising means for displaying, as said image for indicating the timings to operate the control members based on the data stored in said second memory means, a plurality of second marks distinguishably associated with said control members, respectively, for indicating the timings to operate the control members, respectively, said second marks being movable in said game image as the game proceeds such that when said second marks reach a predetermined position in said game image, the timings to operate the control members associated with said second marks arrive.

60. A game system according to claim 59, wherein said obstructive effect generation control means comprises means for generating an obstructive effect to obstruct an attempt of the game player to grasp the timing to operate one of said control members in response to an operation of another one of said control members when the game is in progress.

61. A game system according to claim 57, further comprising control operation timing setting means for randomly establishing timings to operate the control members to be stored in said second memory means, for each game to be played.

* * * * *